United States Patent [19]

Tsuzuki et al.

[11] Patent Number: 5,220,559
[45] Date of Patent: Jun. 15, 1993

[54] NEURON ARCHITECTURE

[75] Inventors: Hiroyuki Tsuzuki; Hideichi Endo; Takashi Kawasaki; Toshiharu Matsuda; Kazuo Asakawa, all of Kawasaki; Hideki Kato, Tokyo; Hideki Yoshizawa, Tokyo; Hiroki Iciki, Tokyo; Hiromu Iwamoto, Yokohama; Chikara Tsuchiya, Tokyo; Katsuya Ishikawa, Kawasaki; Yoshihide Sugiura, Tokyo, all of Japan

[73] Assignee: Fujitsu Limited, Kawasaki, Japan

[21] Appl. No.: 400,826

[22] Filed: Aug. 30, 1989

[30] Foreign Application Priority Data

| Aug. 31, 1988 | [JP] | Japan | 63-215102 |
| Aug. 31, 1988 | [JP] | Japan | 63-215103 |
| Aug. 31, 1988 | [JP] | Japan | 63-215104 |
| Aug. 31, 1988 | [JP] | Japan | 63-215105 |
| Aug. 31, 1988 | [JP] | Japan | 63-218041 |
| Jan. 31, 1989 | [JP] | Japan | 1-019879 |

[51] Int. Cl.$^5$ .......................... H04J 3/02; G06G 7/12
[52] U.S. Cl. ..................... 370/60; 370/94.1; 370/94.3; 395/26
[58] Field of Search ........... 370/60, 94.1, 85.1, 370/94.3; 307/201; 364/513, 807; 340/825.02; 395/24, 25, 26, 27, 21

[56] References Cited

U.S. PATENT DOCUMENTS

| 4,366,349 | 12/1982 | Adelman . | |
| 4,419,544 | 12/1983 | Adelman . | |
| 4,518,866 | 5/1985 | Clymer | 307/201 |
| 4,637,402 | 1/1987 | Adelman . | |
| 4,660,166 | 4/1987 | Hopfield . | |
| 4,697,094 | 9/1987 | Palazzetti | 370/85.15 |
| 4,782,460 | 11/1988 | Spencer . | |
| 4,801,934 | 1/1989 | Herkert | 340/825.02 |
| 4,807,168 | 2/1989 | Moopenn et al. . | |
| 4,809,193 | 2/1989 | Jourjine . | |
| 4,811,338 | 3/1989 | Haruyama et al. | 370/85.2 |
| 4,858,147 | 8/1989 | Conwell | 395/27 |
| 4,906,865 | 3/1990 | Holler | 307/353 |
| 4,947,482 | 8/1990 | Brown | 364/807 |
| 4,951,239 | 8/1990 | Andes et al. | 364/807 |
| 4,972,363 | 11/1990 | Nguyen et al. | 364/807 |
| 4,974,169 | 11/1990 | Engel | 364/513 |
| 5,129,039 | 7/1992 | Hiraiwa | 395/24 |

OTHER PUBLICATIONS

Paul W. Hollis and John J. Paulos, "Artificial Neurons Using Analog Multipliers", Department of Electrical and Computer Engineering, North Carolina State University.

Robert Hecht-Nielsen, "Neurocomputing: picking the human brain", IEEE Spectrum, Mar. 1988, pp. 36–41.

(List continued on next page.)

*Primary Examiner*—Douglas W. Olms
*Assistant Examiner*—Min Jung
*Attorney, Agent, or Firm*—Staas & Halsey

[57] ABSTRACT

An input analog data is applied to a plurality of neuron units in a time division manner. The analog input data is multiplied by digital weight data which can be changed in accordance with the data of the interconnection between units. The products of the time division analog input data and the digital weight data are added in an integrator. While the present sum of the products is output, the previous sum of the products is output simultaneously with the present data, thereby providing outputs in a pipe-line manner. When the output of the first neuron is produced, the second neuron in the same layer produces an output such that the output of the first layer is produced on the output analog bus in a time division manner. This analog neuron unit constitutes an intermediate layer and an output layer. One layer of neuron units can be repeatedly used by feeding back the output of one layer to the input of another layer, then the neuron system operates as a layered structure.

33 Claims, 48 Drawing Sheets

OTHER PUBLICATIONS

F. J. Kub, I. A. Mack, K. K. Moon, C. T. Yao and J. A. Modolo, "Programmable Analog Synapses for Microelectronic Neural Networks Using a Hybrid Digital-Analog Approach", Submitted to IEEE International Conference on Neural Networks, Jul. 24–27, 1988.

Jacques J. Vidal, *IEEE Transactions On Acoustics Speech, and Signal Processing, "Implementing Neural Nets with Programmable Logic", Jul. 1988, pp. 1180–1190, vol. 36, No. 7.*

Tony R. Martinez, Digital Neural Networks, pp. 681–684.

Holler et al., "An Electrically Trainable Artificial Neural Network (ETANN) with 10240 'Floating Game' Synapses", *Proc. Int. Ann. Conf. on Neural Networks*, pp. II-191–196 (Jun. 18–12, 1989).

Eberhardt et al., "Design of Parallel Hardware Neural Network Systems from Custom Analog VLSI 'Building Block' Chips", *Int. Joint Conf. on Neural Networks*, vol. 2, pp. 183–190 (Jun. 18–22, 1989).

Lippman, "An Introduction to Computing With Neural Nets", *IEEE ASSP* Magazine, pp. 4–22 (Apr. 1987).

Houselander et al., "Time-Multiplexed Analogue Circuit for Implementing Artificial Neural Networks", *Electronics Letters*, vol. 24, No. 23, pp. 1413–1414 (Nov. 10, 1988).

Yasunaga et al., "A Water-Scale Integration Neural Network Utilizing Completely Digital Circuits", *Proc. Int. Joint Conf. on Neural Networks*, vol. 2, pp. 213–217 (Jun. 18–22, 1989).

Hansen, "A Time-Multiplexed Switched Capacitor Circuit for Neural Network Applications", *IEEE Internal Symposium on Circuits and Systems*, vol. 3, pp. 2177–2180 (May 8–11, 1989).

Schwartz, "A Neural Chips System", *AI Expert*, pp. 34–39 (Dec. 1990).

| yh  | : | OUTPUT OF UNIT H |
| --- | --- | --- |
| wih | : | WEIGHT OF LINK BETWEEN UNIT I AND H |
| xi  | : | INTERNAL ACTIVE LEVEL |
| f   | : | NON-LINEAR FUNCTION |
| yi  | : | OUTPUT OF UNIT |

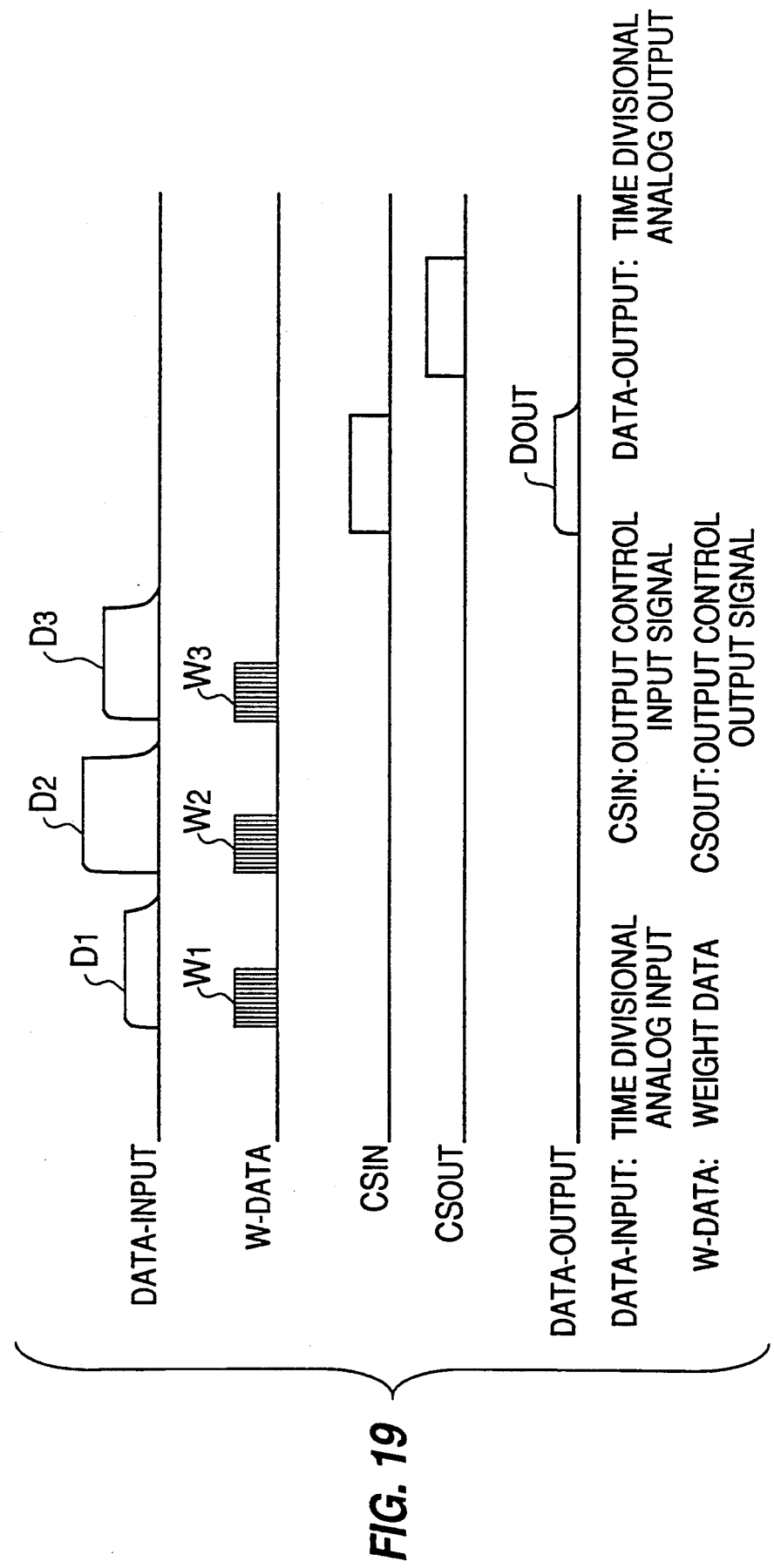

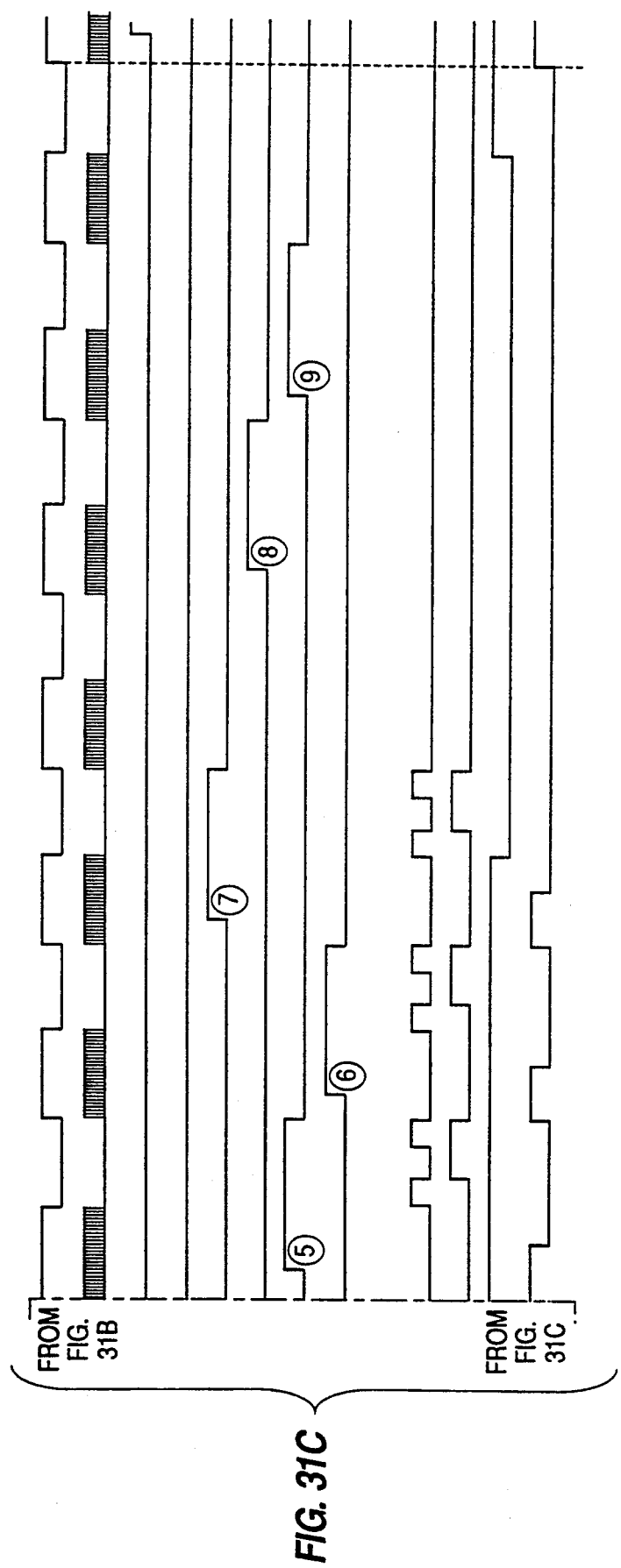

NEURON ARCHITECTURE

CROSS REFERENCE TO RELATED APPLICATION

This application is related to U.S. application Ser. No. 07/474,055, filed Apr. 30, 1990, which is assigned to the assignee of the subject application.

BACKGROUND OF THE INVENTION

The present invention relates to neuron architecture for processing signal information, and more particularly, to neuron networks which process multiple signals on common busses.

A neuron or neural network includes a plurality of neuron units or neurons which are interconnected to process signal information. Each neuron unit is a processor which combines multiple inputs to which the processor applies different weights or connection strengths. The weights may be stored in a memory and adjusted in a desired manner.

A neural network can be utilized for pattern recognition of a character image, a voice pattern recognition, control of a robot in a machine control, applications for expert systems in knowledge processing, compression and decompression of images in signal processing and so forth. By connecting the neuron units in the network, the neuron units can perform superparallel processing and data processing with a technology in which a learning function can be achieved. Therefore, the neural network is expected to be used widely. At present, neural networks are executed by simulation software, using personal computers. However, as the size of the network increases, the software becomes more complex and the processing time increases. It is foreseeable that the neuron units could be made of hardware, but as the number of inputs and the size of the memory increase, the cost and complexity of such hardware increases significantly.

When a neural network is realized in the form of an integrated circuit, it becomes important to consider providing a system for interconnecting or linking respective neuron units or respective processing units with other units, providing a system for determining weights producing a large scale highly accurate circuit and with high speed processing. The problems in developing such integrated circuitry will be discussed in the following brief description of known neural networks.

FIG. 1 shows a conventional layer-type neural network. A unit 1A of the neuron units is connected by a connection or arc for a synapse connection. Units I1 to I5 are the input layer, units H1 to H10 are the hidden layer, and units O1 to O4 are the output layer. Each of the units I1 to I5 in the input layer are connected in common to each of the units H1 to H10. For example, unit I1 is connected to all units H1 to H10. As stated here, the neural network circuit is generally formed of several layers. A neural network learns through an error back propagation algorithm by changing the weights of the connections from the output layer to the input layer so that the error between the teacher signal and the output signal at the output layer is minimized. During learning, an appropriate value is provided as a weight in the connection, for example, and if the output value produced by the network is not the desired value of the object, the weight value is changed so as to decrease the error.

In the neural network, all the units in one layer are connected to each unit in the next layer and the strength of the connection is determined by changing the weights between the connected units. It is practically difficult to realize a large-scale neural network which requires a lot of units and many connections between units.

When a neuron unit is constructed using an operational amplifier in the respective processing block, it requires an offset voltage for proper operation when zero input voltage is applied, a small voltage $\Delta V$ is produced as an output voltage. Therefore, a large-scale highly accurate neural network cannot be constructed. In the learning process using the neural network, it is necessary to change the weight of the synaptic connection. Therefore, a highly accurate neural network cannot be constructed using a voltage-control-type resistor. Considering this and the other discussed problems, learning and problem solving by a neural network has been often executed by simulation using a sequential computer. Thus, a large-scale neural network made by using hardware alone has not been realized.

SUMMARY OF THE INVENTION

An object of the present invention is to execute a time division analog input and output process by using an analog neuron circuit with an offset-cancellation function, which can decrease the number of connections of respective units as well as change the weights.

Another object of the present invention is to provide a neuron network including a plurality of neuron units which are operated sequentially within a layer, so that they produce outputs to a bus connected to the layer in a time division multiplexed manner.

A further object of the present invention is to perform an input operation for a neuron unit which performs a sum of the products of input signals with weights, simultaneously with an output operation from the neuron unit, thereby providing a pipeline operation.

A further object of the present invention is to provide a neuron network of a layered type, or a feedback type, by using a neuron architecture.

A further object of the present invention is to increase the operation speed of a neuron network.

A feature of the present invention is to provide a neuron architecture comprising a plurality of first neuron units arranged sequentially, for producing respective output signals in a time division manner, a common bus, connected to said first plurality of neuron units, for sequentially transferring said respective output signals of said first neuron units in a time division manner and a second neuron unit, connected to said common bus, for receiving the output signals from said first neuron units in a time division manner.

Another feature of the present invention is to provide a daisy chain control apparatus for use in a system having a plurality of processing blocks comprising means for receiving a chain control input signal from a previous block and outputting a chain control output signal to the next block, and a control block for transmitting a first chain control input signal CSo to a first processing block and receiving a last chain control output signal CSn from a last processing block, whereby a chain control input signal is input to a processing block and after an output operation from the processing block is completed, the block produces a chain control output signal.

A further feature of the present invention is to provide a neural architecture comprising a layered structure neural network including a plurality of analog neuron units comprising a multiplying unit for providing products of the input values and weight data corresponding to the input, adding means for summing the output of said multiplying unit, nonlinear function operating means for performing a threshold value calculation function corresponding to the output from said adding means, first storing means connected to the adding means for storing a first intermediate value of an input pattern from the previous stage circuit, and second storing means connected to the non-linear operating means for storing a second intermediate value to be transmitted to the following stage circuit, whereby during the time period when the result of the calculation of the second intermediate value is inputted to and calculated in the following stage, the first intermediate value is simultaneously inputted to and calculated in the previous stage, thereby to provide pipeline processing.

A further feature of the present invention is to provide a neural network of a layer structure for connecting a plurality of neuron units to each other, comprising a single layer unit set means for forming a unit set of a single layer by providing a plurality of neuron units for providing the product of time division analog signals and digital weight data, means for performing an integration by adding the products into a capacitor in a time division manner, thereby providing an output voltage through a non linear output function in a time division manner, feedback means for feeding back the output of the single layer unit set means to the input block of the same single unit set means, control means for performing a time division multiplexing of an analog signal from respective units output from the single layer unit set means and executing control for using the single layer unit set means through the feedback means in a time division multiplexing manner, whereby the single layer unit set means used in a time division multiplexing manner equivalently provides a layer-structure neural network.

A further feature of the present invention is to provide a neuron network for connecting a plurality of neuron units to each other comprising unit set means for producing a product of an input analog signal and digital weight data, and for performing an integration by adding the product to a capacitor in a time division manner and producing a voltage through a non-linear output function, feedback means for feeding back an output of the unit set means to the input part of the same unit set means, and control means for providing the analog signal outputted from respective units of the unit set means in a time division multiplexing manner and controlling the unit set means to be used in a time division multiplexing manner, through the feedback means.

A further feature of the present invention is to provide an apparatus for speeding up a continuous multiplication, comprising D/A converter means for multiplying time division analog data having an irregular positive and negative value by time division serial digital data having irregular positive and negative values, sign operating means for performing a sign operation to selectively invert or non-invert the sign of the analog data to enable the operation result to be output at the reference voltage terminal of the D/A converter, and control means for first applying an input sign bit of the digital data to the sign operation means and then applying the digital data to the data terminal of said D/A converter.

BRIEF DESCRIPTION OF THE DRAWINGS

FIG. 19 is a timing chart of a connection of the neuron units of FIG. 16.

DETAILED DESCRIPTION OF THE PREFERRED EMBODIMENT

Figure 1:
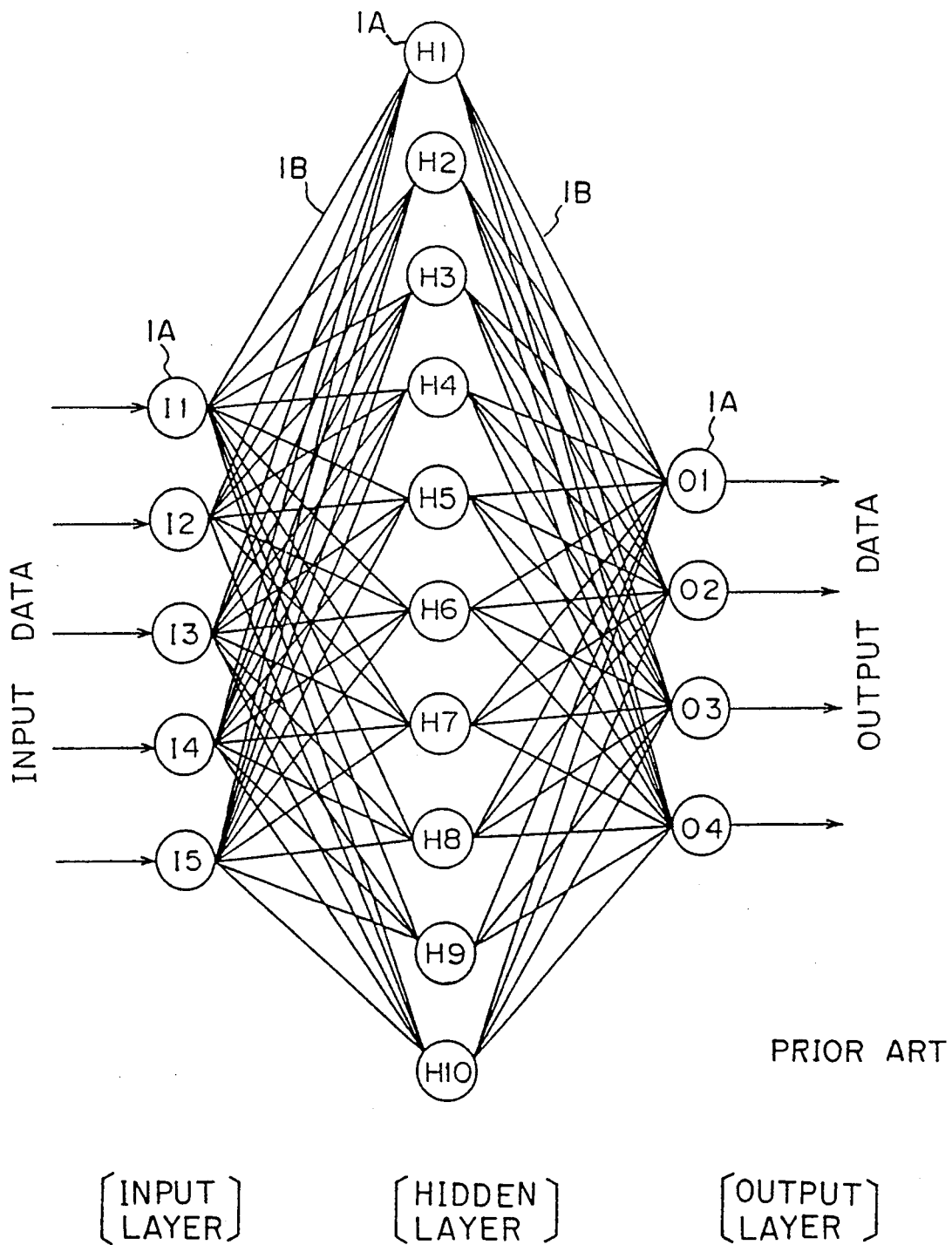
FIG. 1 is a diagram showing a prior art neural network of a layered type.
Figure 2:
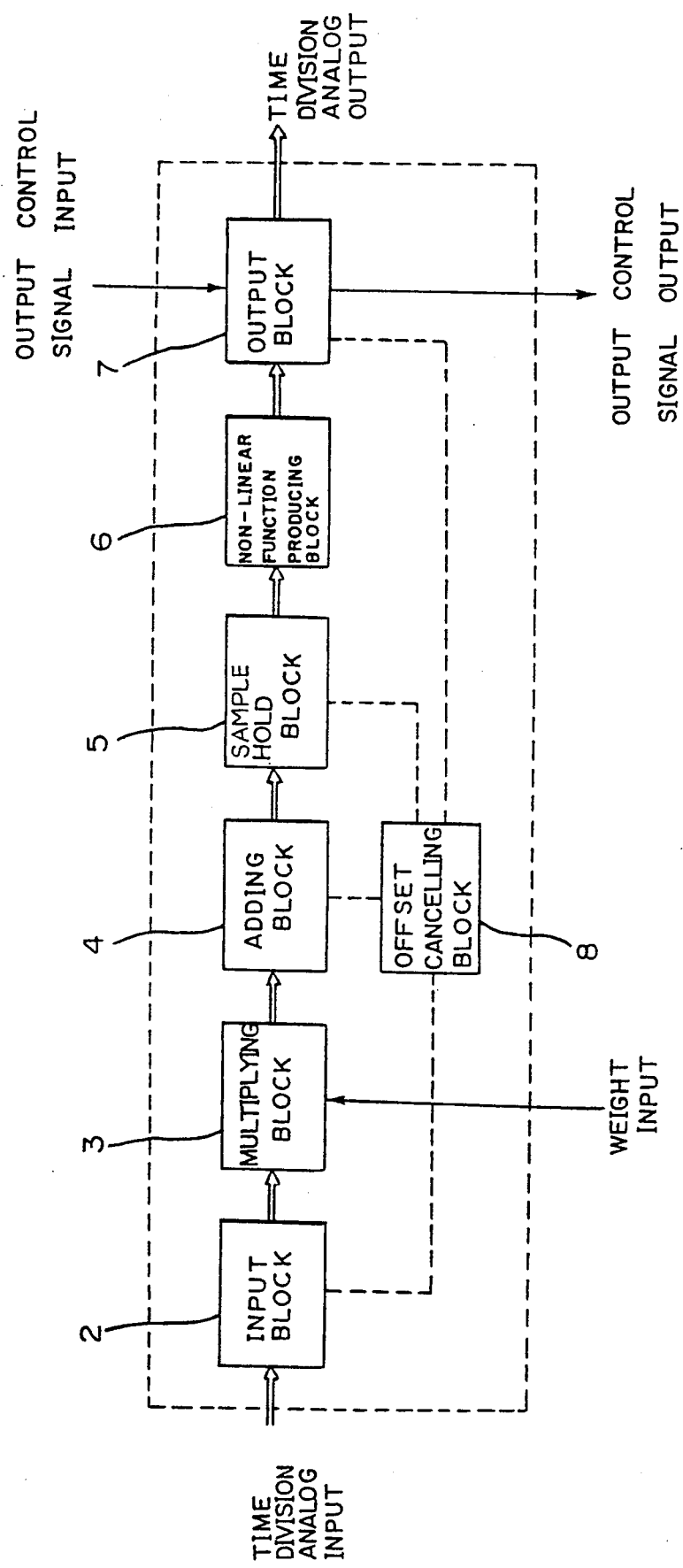
FIG. 2 is a block diagram of a neuron unit according to the present invention.

FIG. 2 shows a block diagram of the present invention and the structure of the respective neuron units in a neural network formed by interconnecting neuron units.

FIG. 2 shows input block 2, which receives an analog voltage which is outputted from a plurality of neuron units in a previous stage (not shown in FIG. 2) in a time division multiplexed manner. Multiplying block 3 executes a switching of the kind of multiplexed time division analog input signal by using a sign bit (weighted input) of digital weight data supplied from an external circuit. Multiplying block 3 then selects the path of the weighted current converted from the voltage value of the time division multiplexed analog signal by selecting the numeral bits of the digital weight data. Thus, it provides the products of the voltage value of the time division multiplexed analog signal and digital weight data. Adding block 4 performs an integration operation by supplying a product of the time division multiplexed analog signal and the digital weight data to a capacitor.

Sample and hold, block 5 samples the output of the adding block 4 and holds the output from the neuron unit. Nonlinear function producing block 6 forms a non-linear output which approximates a desired relationship. Output block 7 produces an analog output voltage to be supplied to the next stage, in a time division manner and at an appropriate timing. Offset canceling block 8 cancels an offset voltage of operational amplifiers included in circuits constituting the above respective blocks 2, 3, 4, 5, 6 and 7, by detecting the offset voltage when the input signal is made zero.

The neural network of the present invention performs a time division multiplexing of the outputs from the neuron units in the previous stage. The number of neuron units in the previous stage corresponds to the number of pulses in a unit of time. The outputs constitute the product of the analog signal and digital weight data using the multiplying block 3. The neural network of the present invention also performs an offset canceling operation, changes the weights with ease, and can be made in a large scale circuit with high accuracy.

Figure 3A:
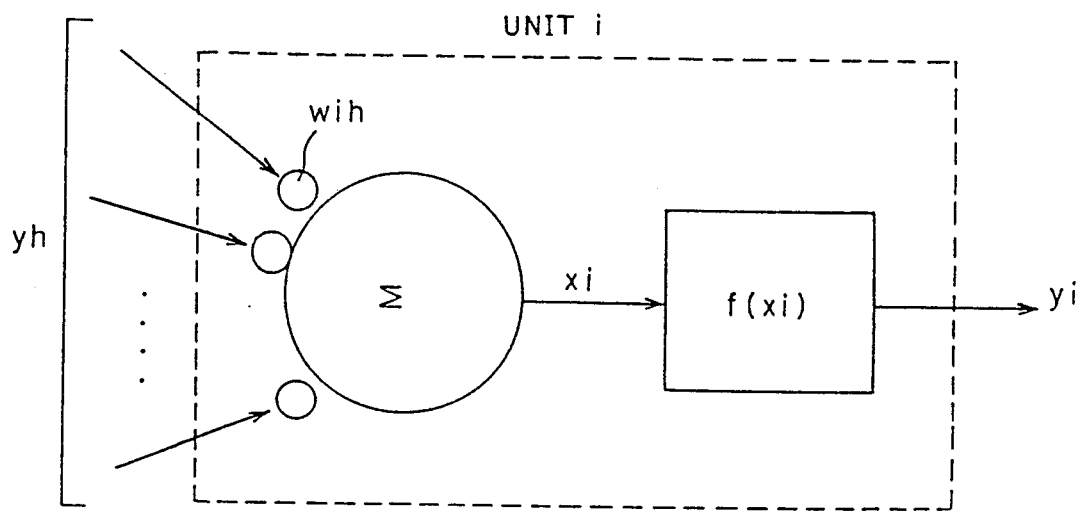
FIGS. 3A and 3B explanatory views of a general neuron unit.

FIG. 3A is a block diagram of a neuron unit in the present invention. The neuron unit is an element for processing an element corresponding to the respective nodes of the neural network. The quantity which holds a weight is added to the respective connections. This weight is a parameter representing the strength of mutual connection between units, and the weight wih designates a connection from the unit h to the unit i, or, the weight of the connection. The learning of the network is usually realized by changing this weight. The internal state of all the units in the neural network is called a state of the network. xi designates an internal state called an internal active level within respective units.

Respective units receive the weighted input from the unit in the previous stage and calculate the sum of the products, and the appropriate non-linear function f is applied to the sum. As shown in FIG. 3A, the neuron unit applies the following processing to the output yh from the other neuron units, $$xi = \Sigma_h \, yh \cdot wih + \theta \quad (1)$$

$$yi = f(xi) \quad (2)$$

where yh is the output of unit h, yi is the output of unit i, Wih is the weight of the link between unit i and unit h, f is a sigmoid or a nonlinear function and $\theta$ is the threshold value.

The neural network is formed by connecting these units in a network. When respective units determine the next new state, namely, the output based on the sum of the inputs, it follows a sigmoid function. The sigmoid function provides the output yi when the total sum xi of the inputs is obtained as shown in the following equation.

$$yi = 1/(1 + exp(-xi)) \quad (3)$$

Figure 3B:
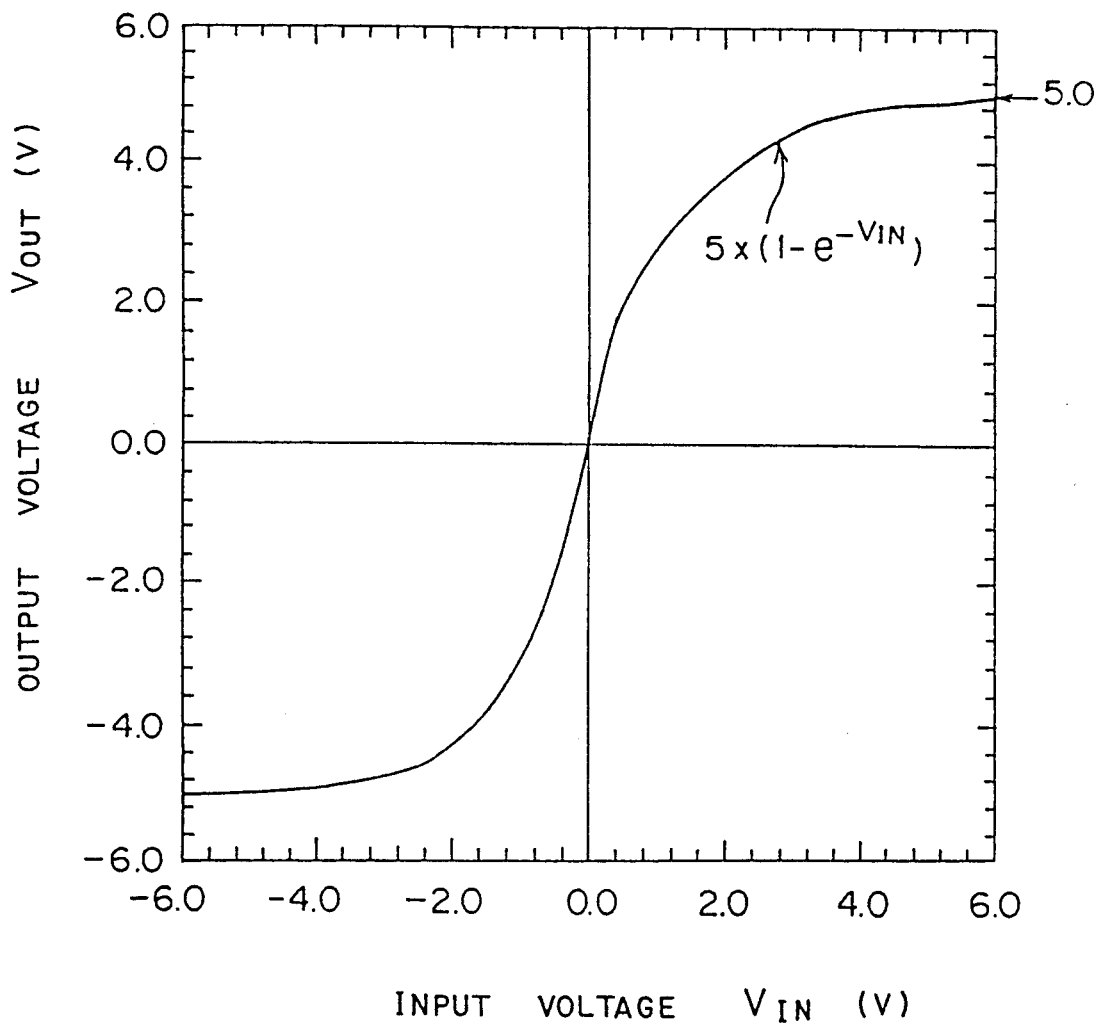

The sigmoid function becomes closer to 1 as shown in FIG. 3B when the input becomes larger and the form of the function graph changes in accordance with $\theta$.

There are various learning methods used by neural networks, for example, error correcting methods. According to these methods, a certain weight pattern corresponding to a connection is applied to the network, and when the error is large the weight of the connection is corrected. Repetition of this process finally provides the correct weight data.

When the pattern at timing T is input, the weight wih is changed so that the error becomes small if the solution of the unit at the final output layer is not the desired one. Thus, a learning process is performed. When the network outputs the same result as the correct solution in the learning process, the connection is not changed. If the network produces 0 when the correct solution is "1", the connection of the unit is increased by, for example, "1" and the output of the network is corrected so that the output becomes 1. Thus, it is very important to the learning process that the weight Wih can be changed with discretion. The weight of the connection is corrected such that the difference between the output from the network and the correct solution becomes small. In a neural network comprising a complete graph in which all the units in the network are connected to other units, or in a neural network comprising a graph of the complete connection type in which respective units in one layer are connected to all the units in the layer in the next stage, the number of interconnections between the units are very large. This makes a large-scale neural network difficult to construct.

The present invention decreases the amount of interconnections between the units. A single wire, connects a number of units (a layer); and transmits pulses between those units sequentially and in a time division manner. The amplitude of the voltage is transmitted in accordance with a weight, thereby enabling an integrated circuit to be constructed in a form which does not require interconnection of each unit in one layer with every unit in an adjacent layer. Thus many units may be equivalently connected between two adjacent layers without the necessity of a direct physical connection between every unit. The present invention achieves sequential processing within each layer through a time division, processing for the transmission of analog voltage between units within the layer.

The time division processing is explained by referring to the drawing.

Figure 4:
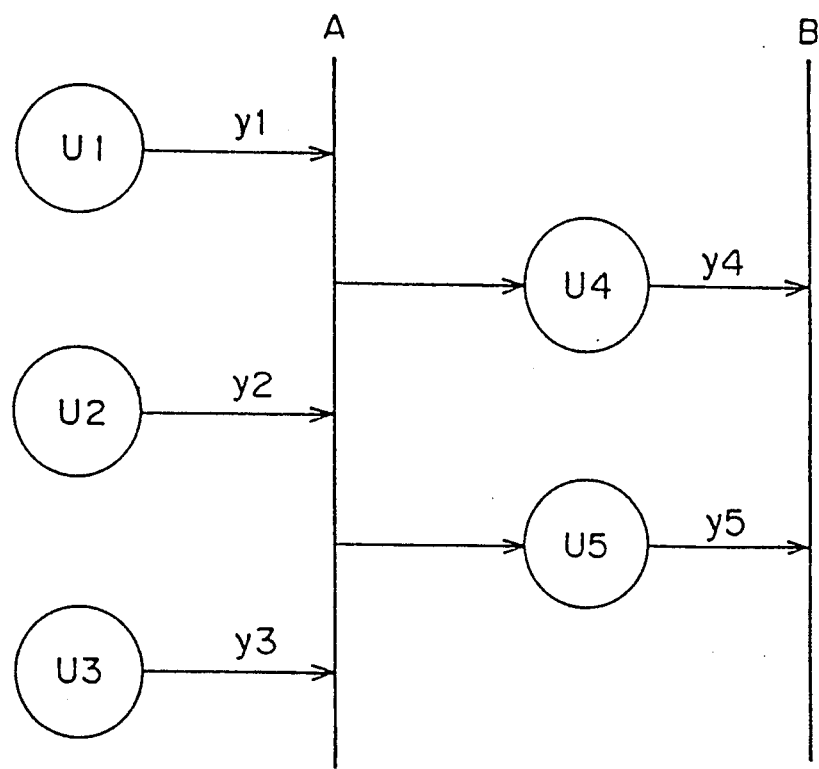
FIG. 4 shows a diagram of a neural network of a layered type according to the present invention.

FIG. 4 shows the structure of the neural network according to the present invention. U1, U2 and U3 are the units in the previous stage, and U4 and U5 are the units in the following stage. The signals y1, y2 and y3 outputted from respective units in the previous stage is connected to bus "A", which is connected to units U4 and U5 in the following stage. Similarly, the signals y4 and y5 outputted from units U4 and U5 in the following stage are commonly connected to bus B. Therefore, the units in one stage are connected to the units in the next stage through bus A only. This greatly decreases the wiring, thus, greatly increasing the possibility of realizing a neural network as a hardware circuit. When the signal is transmitted from the units in one stage to the units in the next stage, analog pulse, voltages each having an amplitude corresponding to a weight, are transmitted in a time division manner.

Figure 5A:
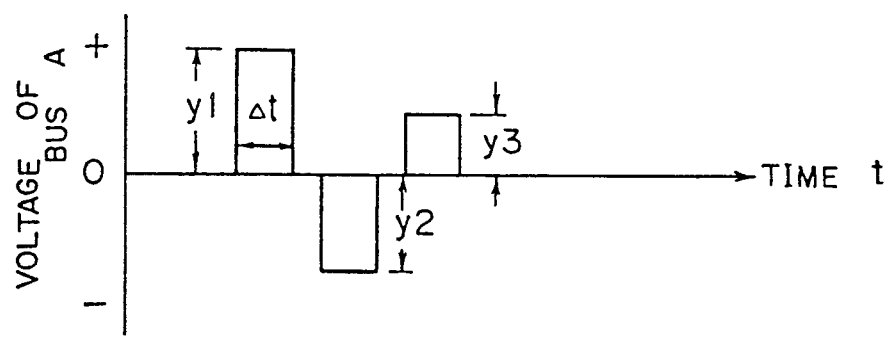
FIGS. 5A and 5B show transmission waveforms of the neural network according to the present invention.
Figure 5B:
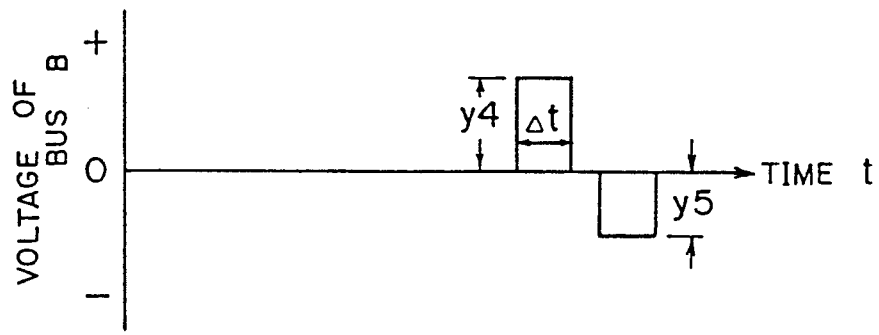

FIG. 5A shows a transmission waveform of the neural network according to the present invention. FIG. 5A shows the signal on bus "A" in the neural network shown in FIG. 4 and FIG. 5B shows the signals on bus "B" of the output line. The voltage output from unit U1 in the previous stage is positive and has a large amplitude. It provides a voltage with an amplitude y1 and a period $\Delta t$. A negative voltage with an amplitude y2 is output from unit U2. The output voltage from unit U3 is y3 and it has a positive pulse value. The positive signal means that the neuron in the neural network is excited and the negative signal means that it is suppressed or inhibited. When these time division signals are supplied to unit U4 in the following stage, unit U4 outputs to bus "B" an excited pulse with an amplitude of y4 and a duration of $\Delta t$. Thereafter, after a small delay and in the next timing, unit U5 in the following stage provides on bus "B" a pulse with an amplitude of y5. Therefore, in the present invention, a transmission between neurons is conducted in the form of a time division multiplexing analog signal.

Figure 6:
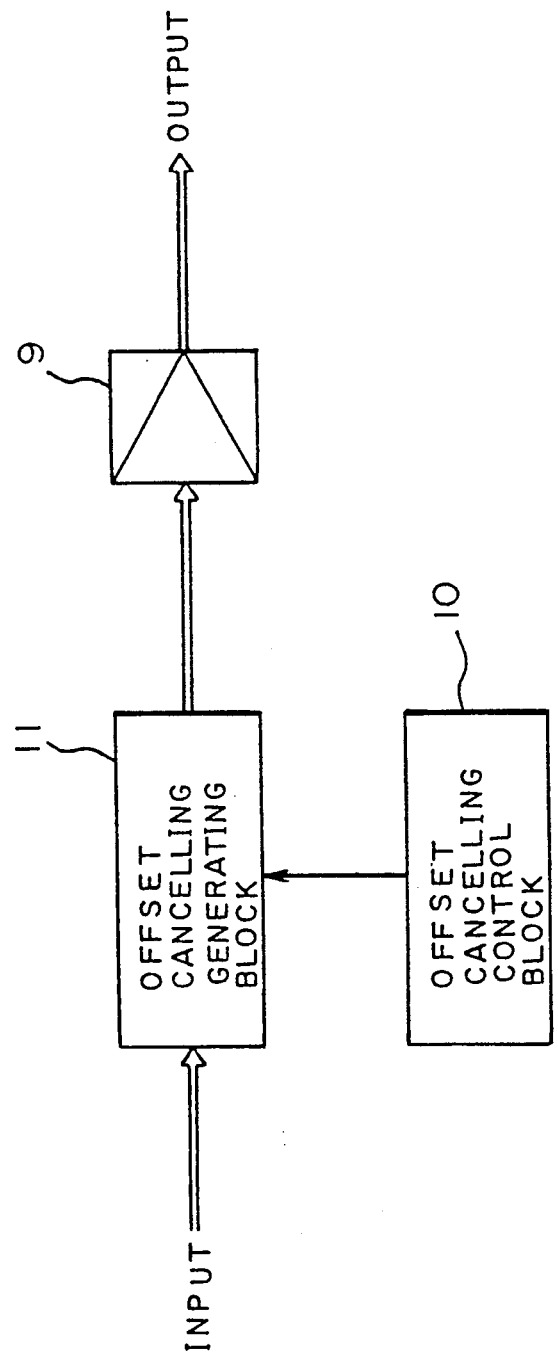
FIG. 6 shows a diagram of an input block of the neuron unit of the present invention.
Figure 7:
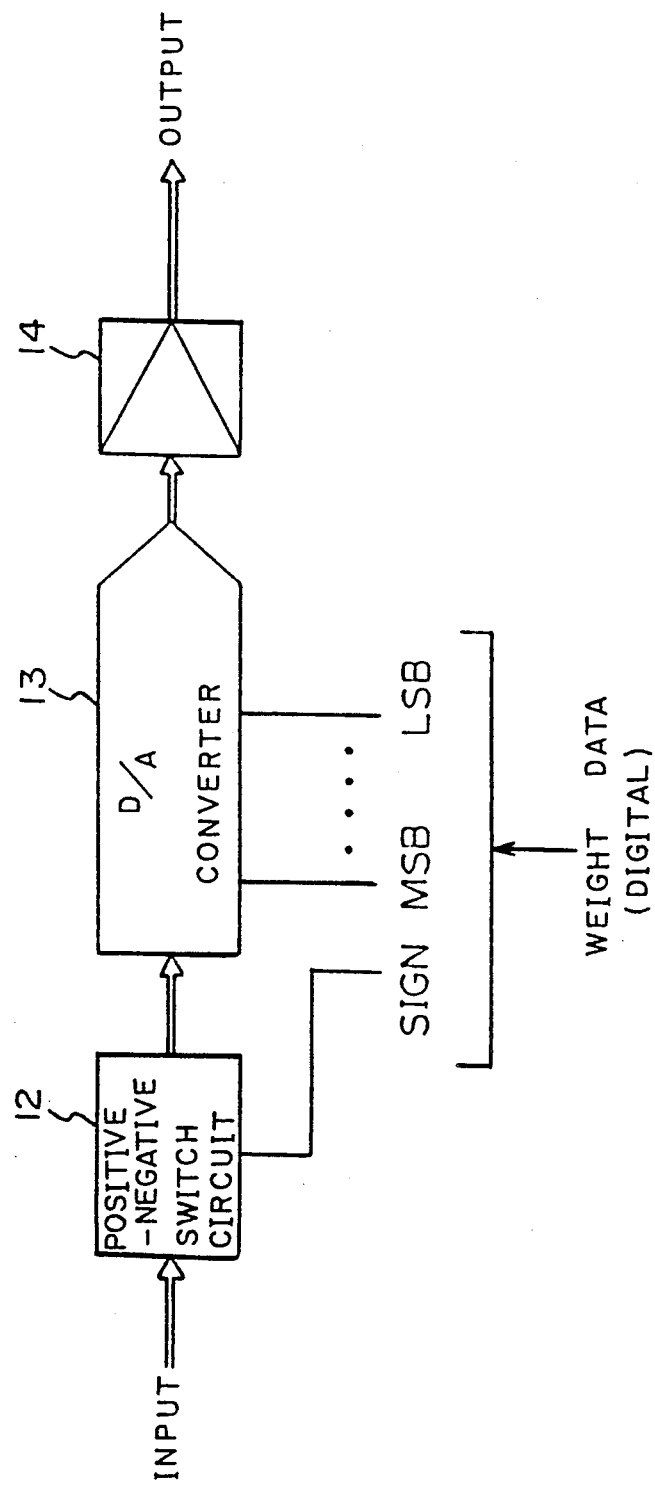
FIG. 7 shows a diagram of a multiplication block of the neuron unit of the present invention.

FIG. 6 is a block diagram of an input block of the neuron unit shown in FIG. 2. The input signal is a time division analog signal outputted from a plurality of units in the previous stage. The input has an infinite input impedance and "0" output impedance enabling it to provide a unity gain amplifier, namely, buffer 9. In the present invention, this input block has a path of an offset canceling function. When an offset control signal is supplied by offset canceling control block 10, "0" voltage is compulsorily input to buffer 9 through offset canceling generation block 11 and an offset voltage is produced as the output from the operational amplifier at various portions connected at the next stage. The offset can be canceled in accordance with a later described function. FIG. 7 is a block diagram of a multiplying block of the neuron unit. Respective time division analog signal pulse voltages outputted from the input block of FIG. 6 are entered into positive-negative switch circuit 12, which switches the positive excited voltage or negative suppressed voltage in accordance with the code bit (sign bit) of the digital weight data to be input to D/A converter 13. From MSB (most significant bit) to LSB (least significant bit) of the numeral value, a bit of digital weight data is input to D/A converter 13 and the voltage output from the positive and negative switching circuit 12 is applied to resistors of the R-2R type provided within D/A converter 13. Therefore, the digital weight bit is transformed to a corresponding weight current which can flow through an R-2R resistor. As a result, the output from D/A converter 13, the product of the analog signal and digital weight data is formed to provide the output produced from buffer 14. According to the function of this multiplying block, the weight between neurons can be changed in this invention and it is possible to dynamically change the characteristic, of a neural network and the neural network can learn something in accordance with external control.

Figure 8:
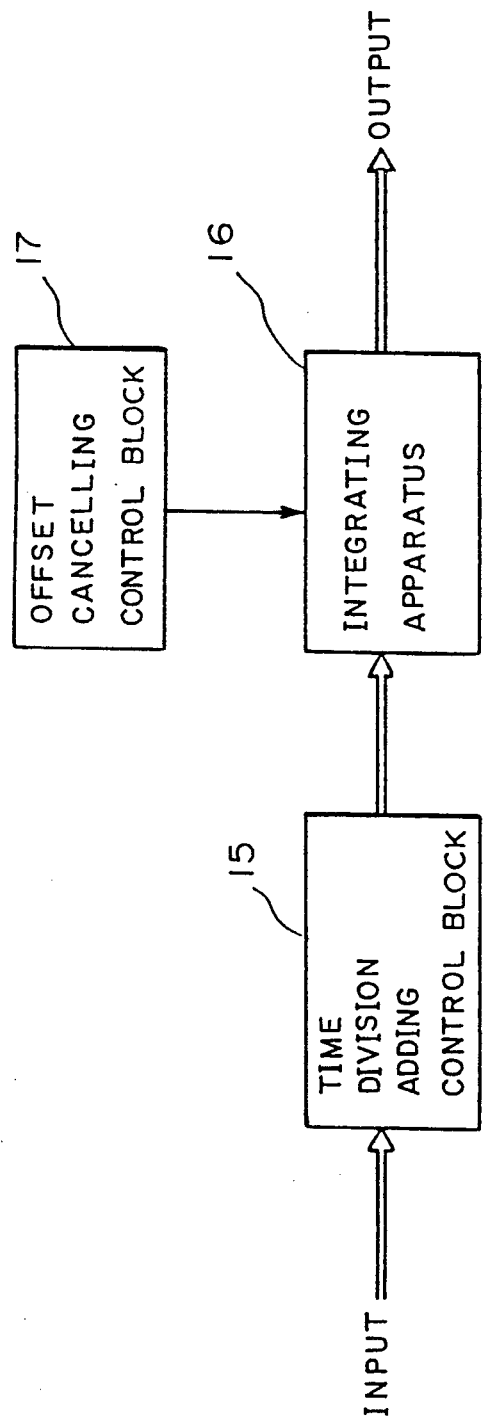
FIG. 8 represents a diagram of an addition block of the neuron unit of the present invention.

FIG. 8 shows a block diagram of an adding block of the neuron unit. The result of the multiplication unit in FIG. 7, namely, the product of the time division multiplexing analog signal and digital weight data, is input to integration apparatus 16. In the present invention the input signals are voltages of different amplitudes and these input signals are supplied in a time division manner. Therefore, in accordance with control by a time division adding control block 15, the product of analog signal and digital weight data is stored as a sum thereof in a capacitor of an integrating apparatus 16 of the next stage. Further, the voltage (polarity) of the capacitor is reversed by a switch in accordance with a command of the offset canceling control block 17. By subtracting an offset voltage produced upon the "0" input voltage from the result of the addition of the actual input, the offset voltage is canceled. This circuit maintains accuracy of the network.

Figure 9:
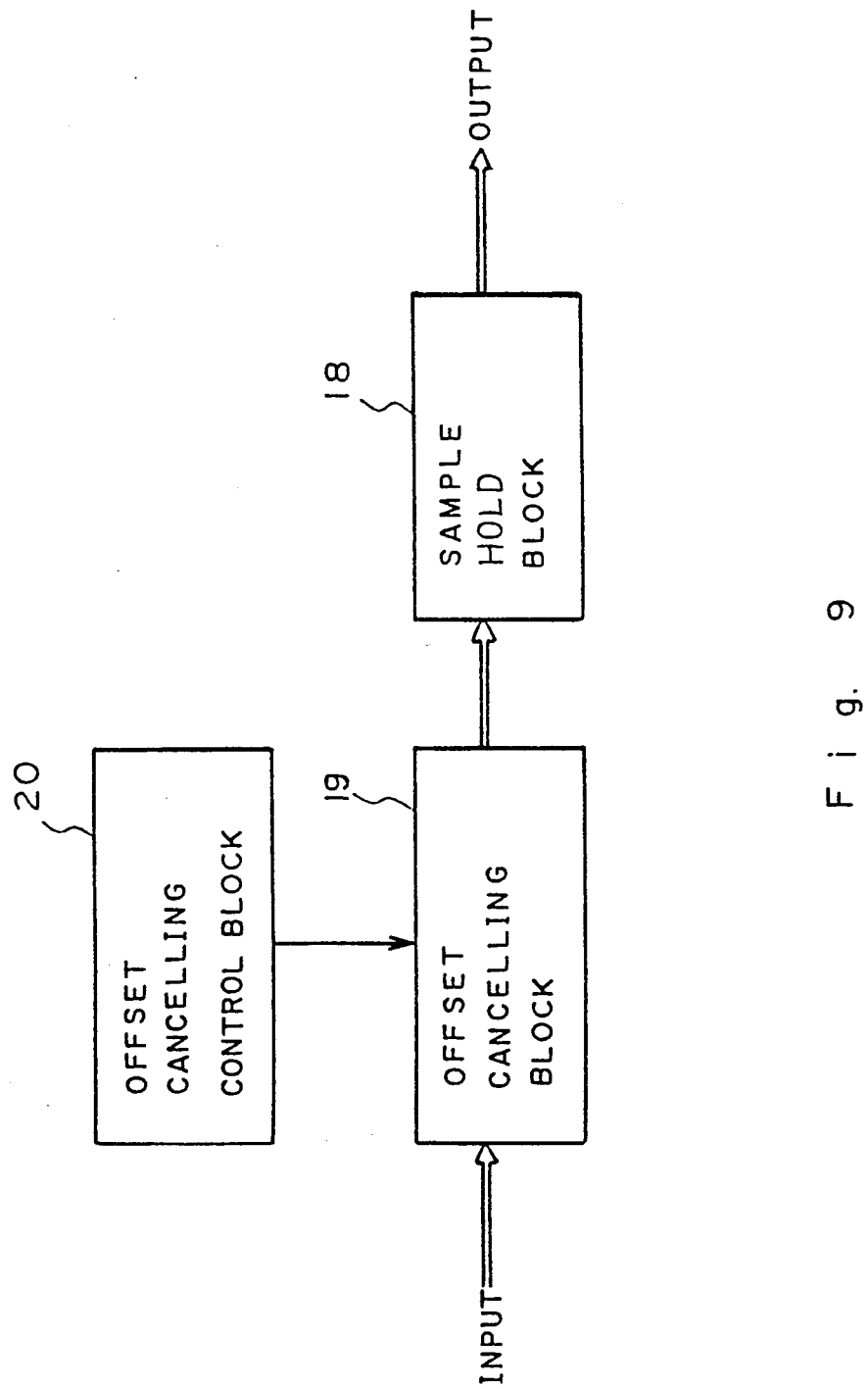
FIG. 9 shows a diagram of a sample/hold block of the neuron unit of the present invention.

FIG. 9 is a block diagram of a sample holding block of the neuron unit according to the present invention. The output of the integrating apparatus shown in FIG. 8 is input to the sample hold block 18 in FIG. 9 and the value of the output of the integrator is held in the capacitor, thereby performing an offset canceling function. In accordance with a control of the offset canceling control block 20, the offset voltage of an operational amplifier produced in the circuit in the next stage is canceled.

Figure 10:
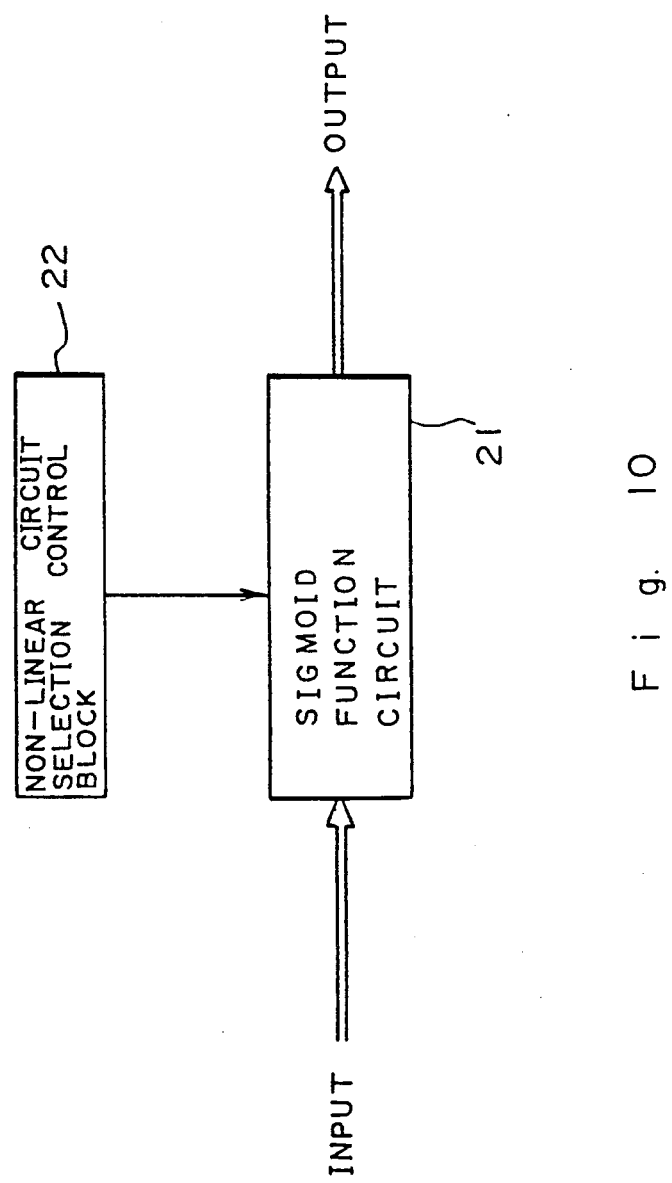
FIG. 10 shows a diagram of a sigmoid function generator of the neuron unit of the present invention, FIG. 11 s a diagram of the output block of the present invention.

FIG. 10 is a block diagram of a sigmoid function generating circuit of the neuron unit according to the present invention. The sum of the products of the analog signals subjected to the sample hold operation in the sample hold block in FIG. 9 and the digital weight data, is input to the sigmoid function circuit 21. The present invention accurately forms the sigmoid function by an approximation operation by the segmented linear function using an analog signal and determines whether or not the signal should be passed through the sigmoid function under the control of the nonlinear circuit selecting control block 22. The present invention can realize a quantizing apparatus which is very close to the sigmoid function, by using an approximating function by a segmented linear function using the analog signal, to provide a high-accuracy and high-capability circuit.

Figure 11:
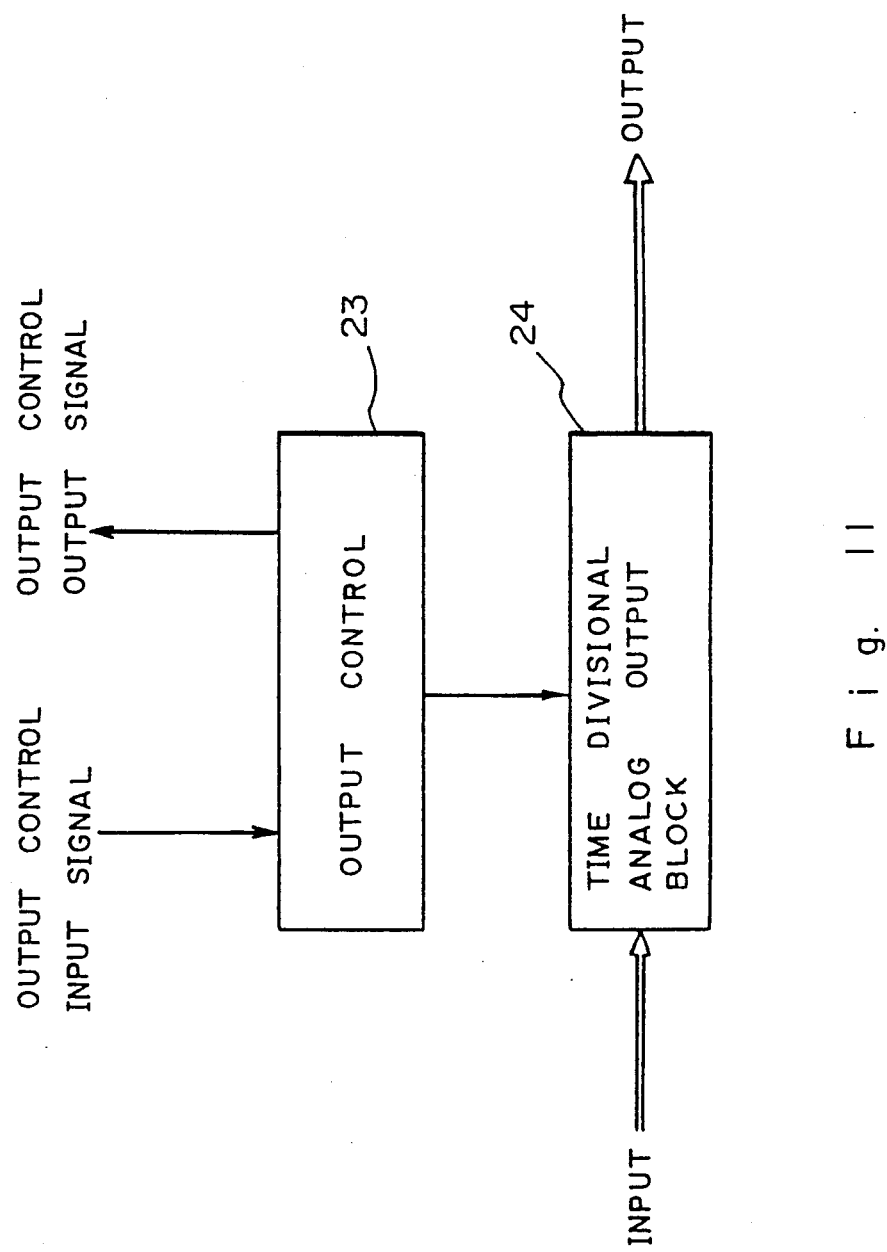

FIG. 11 shows a block diagram of the output block of the neuron unit according to the present invention. In the present invention the analog voltage of the time division analog signal is transmitted between the units of a neural network. Therefore, an output control input signal received by the output control block 23 controls the output voltage produced by the sigmoid function of FIG. 10 such that it is outputted by time division analog output block 24 at an appropriate time. To control the time interval between units, an output control output signal is transmitted next unit. As transmission between units is carried out by the transmission of the time division multiplex analog signal, the neuron network need not form a complete-connection-type graph. Therefore, the system of the neuron network is extremely simple.

Figure 12:
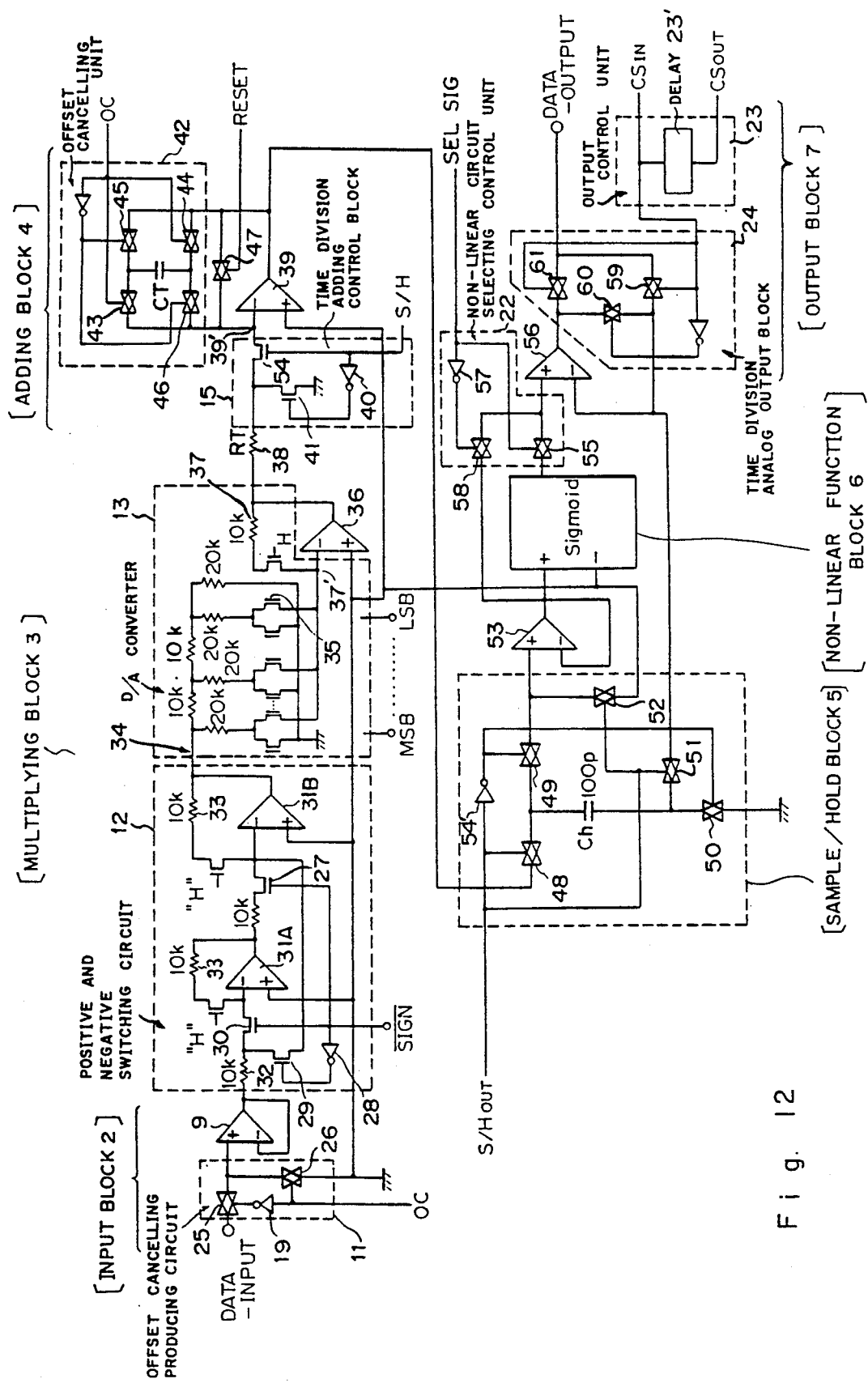
FIG. 12 is a detailed circuit of an embodiment of the neuron unit of the present invention.

FIG. 12 shows a circuit diagram of the neuron unit shown in FIG. 2 in detail. The neuron unit of the present invention comprises input block 2, multiplying block 3, adding block 4, sampling/holding block 5, non-linear function block 6 and output block 7.

The input block 2 comprises offset canceling producing circuit 11 and unity gain buffer 9. Unity gain buffer 9 feeds back the output of an operational amplifier to the minus terminal thereof and input voltage is applied to the plus terminal. The data input DATA-INPUT provides a pulse signal of a time division analog signal from a common bus A shown in FIG. 4. OC represents an offset control signal. When this control signal is "1" the analog switch 26 is turned on and "0" voltage is compulsorily applied to the unity gain buffer 9. On the other hand, when offset control signal OC is "0", the analog switch 26 is turned off and another analog switch 25 is turned on, and the data is inputted to unity gain time buffer 9. Namely, when offset control signal OC is "1", "0" volt one compulsorily applied to the unit of the neuron unit, thereby canceling the offset voltage produced in the output of the operational amplifier of the circuit in the following stage. Analog switches 25 and 26 control a switching of the OC signal in a positive phase or in a negative phase. This phase control prevents the circuits from being turned on simultaneously to each other. Hereinafter, this will be referred to as stating that the "OC" is subjected to phase control. Positive and negative switching circuit 12 is formed by combining an amplifying block in cascade form. The amplifying block comprises an input resistor (10 kΩ) and feedback resistor (10 kΩ) to provide 10/10'=1 times the voltage in a reversed manner. The sign of the analog voltage is determined depending on whether the signal passes through one or two stages of the amplifying block. The control voltage is a sign bit($\overline{SIGN}$) of the digital weight data and this sign bit is connected to the gate of MOS switches 27 and 30. The control signal of sign bit($\overline{SIGN}$) is also subjected to a phase control. When the sign bit($\overline{SIGN}$) is 1, the input voltage from the input block is reversed by the amplifying block including amplifier 31A in the first stage as switch 30 turns on and it passes through the amplifying block including amplifier 31B in the following stage as the switch 27 is turned on, thereby providing a positive phase signal. Where the sign bit($\overline{SIGN}$) is 0, switch 29 is turned on by the reverse circuit 28. Then, as the switches 27 and 30 are turned off, the input signal from the input block is applied to the minus terminal of operational amplifier 31B at the post stage through switch 29. Therefore, an operational amplifier with resistor 32 in the previous stage and resistor 33 for feedback of the operational amplifier constitute an amplifying block which is a unity gain inverter. Namely, the input of the input unit is formed to be negative when the sign bit is negative, and vice versa. This provides a voltage according to whether the synapse connection is excited or suppressed. An output from the positive and negative switching circuit 12 is supplied to a point, namely, a reference voltage terminal 34 of R-2R-resistor circuit network of D/A converter 13.

The D/A converter of the R-2R system will now be explained. The internal switch is turned on or off depending on the digital weight data from MSB to LSB. When the digital value is 1, the current flows through switch 35 into an imaginary ground 37' of operational amplifier 36. The imaginary ground 37' of operational amplifier 36 is controlled to have the same voltage as the plus terminal of the amplifier 36. Thus, the plus terminal of the amplifier 36 is grounded so that the imaginary ground 37' is imaginary 0. In a D/A converter, R represents 10 kΩ and 2R represents 20 kΩ. A current flows through a resistor 2R regardless of the state of the switch. The value of the digital data determines whether or not the weight current flowing through the resistor 2R (20 kΩ) flows toward the imaginary ground 37'. When the current flowing through the right-most resistor 2R is determined to be I, the vertical current flowing through reactor 2R (corresponding to the LSB) located second from the right is provided as (2R×i)/ 2R =I by dividing the voltage applied to the right-most resistor 2R by 2R. Therefore, the current 2i flows to the horizontal right-most resistor R. The voltage 2R×I+R×2I is applied to the vertical resistor third from the right and the voltage is divided by 2R to provide the current 2I. Therefore, similarly the currents through the vertical resistor 2R (20 kΩ) become 4I, 8I, 16I, . . . , and therefore increases at a rate of the second power of I. The data from MSB to LSB determines whether or not the weight current of the second power of I flows into the minus terminal of the operational amplifier 36. Therefore, the current corresponding to the digital weight data flows into the imaginary ground 37 with an amplitude of the second power of I. As the input impedance of the operational amplifier is infinite, and the current flowing toward the imaginary ground 37' flows through a feedback resistor 37 of operational amplifier 36, the output voltage Vout of the D/A converter is as follows, $$V_{out} = -(E_s/2n) \times (D0 + 2 \times D1 + 2^2 \times D2 + \ldots + 2^{n-1} \times Dn - 1)$$

where Es is the input voltage, D0 is the LSB and Dn−1 is the MSB. Namely, the output of the multiplying block 3 is the value obtained by multiplying the input voltage by a weight. The weight coefficient is controlled by the digital value from MSB to LSB.

On the other hand, adding block 4 uses a Miller integrator for respective products of the time division multiplexing analog signal and the digital weight data in a time division manner, to carry out an accumulation and an adding operation. Sampling/holding block 5 performs sampling/holding of the addition result. Adding block 4 is an integrator comprising resistor RT 38 and capacitor CT. The input unit of the adding block 4 has time division adding control block 15 and when the sample/hold signal is 1, the output of the multiplying block 3 is input to an imaginary ground 39' of the operational amplifier. When the S/H signal is 0, the inverter 40 turns on switch 41 and the output of the multiplying block is connected to ground through the resistor RT. Thus, the input is not added to the capacitor CT of adding block 4 when the S/H signal is 1. The output voltage of the multiplying block 3 is input to the minus terminal of operational amplifier 39 through a resistor RT 38. The current obtained by dividing the input voltage by resistor RT 38 is input to capacitor CT through an imaginary ground 39' to perform an integration.

Thereafter, when the S/H signal becomes 0 and multiplying block 3 is disconnected from adding block 4, multiplying block 3 can multiply the next signal by the weight data. The circuit 42 of an integration circuit including capacitor CT is provided with an offset canceling function by using four switches. When the sampling hold signal is 0 and offset control signal OC is 1, the switches 43 and 44 are turned on and switches 45 and 46 are turned off, thereby reversing the voltage stored in the capacitor CT. When the offset control signal OC is 0, an input voltage is applied to the data input terminal of data input block 2 and the corresponding output of multiplying block 3 is applied to capacitor CT through resistor RT. Then, switches 45 and 46 are turned on and the capacitor CT has a positive polarity on the side connected to the minus terminal 39' of the operational amplifier 39 and has positive polarity on the side connected to the output of operational amplifier 39. When the offset control signal OC becomes 1 and the capacitor which stores the voltage including in the offset voltage is reversed, data input is compulsorily made 0. In this case, the offset does not exist even if the input signal is transferred through positive and negative switching circuit 12 and multiplying block 3, and the output of the D/A converter becomes 0. However, as the operational amplifiers are employed and the offset voltage is activated, the offset voltage is added to capacitor CT with a reversed voltage and is consequently stored. As a result the offset voltage is canceled. The offset voltage occurring after the capacitor CT receives the input signal is canceled by changing offset control signal OC to "1" to change the polarity of capacitor CT. When offset control signal OC is 0, input voltage is applied to the data input DATA-INPUT and the corresponding output from the multiplying block is applied to the capacitor CT through the resistor RT. The present invention achieves an offset canceling function in an equivalent manner by reversing the polarity of the capacitor CT. After the offset is canceled, the offset control signal OC becomes 0 and the capacitor returns to its original state. Switch 47 is controlled by a reset signal. When the reset signal is received, the voltage of the capacitor CT is made 0 and the output of the adding block 4 is compulsorily 0 as it is a resetting operation. This offset control signal OC is also subjected to phase control.

The output of adding block 4 is supplied to a sample holding block 5 in which the output of adding block 4 is stored in capacitor Ch through switch 48 when the phase-controlled sample hold control signal S/H out is 1. When the S/H$_{out}$ signal is 1, a control signal of switch 50 is turned to 0 by inverter 54' and if one terminal of capacitor Ch is not grounded, the signal of a final output data is applied to capacitor Ch through switch 51. Namely, the final output signal at that time is fed back to the lower side of capacitor Ch. Therefore, capacitor Ch stores the voltage obtained by subtracting the final output data from the output of the adding block 4. At this time switch 52 is turned on and a plus terminal of operational amplifier 53 is compulsorily 0, thereby causing the final output data to be an offset voltage. Therefore, capacitor Ch stores the voltage obtained by subtracting the offset voltage from the output of the adding block 4 beforehand. On the other hand, where the S/H$_{out}$ signal is 0, switches 49 and 50 are turned on and the lower side of capacitor Ch is grounded. As a result, the voltage stored in capacitor Ch is applied to the plus terminal of the unity gain operational amplifier 53 through switch 49. The offset component is already subtracted and the offset component is canceled. The output of the operational amplifier 53 is input to the sigmoid function block 6 through operational amplifier 53. As described above, when the S/H control signal is turned to 1, switch 48 is turned on and capacitor Ch receives the difference between the output value from the adding block and the final output value. As, at this time, switch 51 is turned on, 0 volts are compulsorily applied to the operational amplifier 53. At this time, DATA-OUTPUT produces an offset voltage *V through the sigmoid function block 6 and operational amplifier 56. The offset voltage is applied to the lower side of capacitor Ch through switch 51. Therefore, when the S/H$_{out}$ control signal is 0, namely, switch 49 is turned on and switch 52 is turned off, the voltage stored in the capacitor Ch is finally outputted through amplifier 53 and sigmoid function block 6 as the value obtained by subtracting the offset voltage data ΔV from the output of the adding unit 4. When the S/H$_{out}$ signal is turned to 1, the offset voltage formed at this timing becomes ΔV. As a result, the offset voltage is canceled. The non-linear functional block for forming a sigmoid function block comprises non-linear circuit selection circuit 22. The phase control SEL SIG signal is turned to 1, switch 55 is turned on and the output of the sigmoid function block 6 is applied to operational amplifier 56. However, when SEL SIG signal is 0, it forms the control signal of switch 58 which is made 1 through inverter 57, and the output of the sigmoid function is cut. The output voltage of the sample and hold block 5 is directly input to operational amplifier 56 without going through a sigmoid function. In this case, the neuron unit shown in FIG. 12 can be used for an adaptive filter or for a linear neuron network and further it becomes easy to be tested as to its operational characteristic. Operational amplifier 56 is basically a unity gain operation amplifier for directly feeding back the output to the minus terminal, and is operated as a buffer. Therefore, this acts as a buffer in order to make the output impedance 0. Output block 7 is connected to time division output block 24 and output control block 23. When CS$_{in}$ is "1", switch 59 is turned on and switch 51 is turned on. The final output operational amplifier 56 outputs the final output at data output DATA-OUTPUT, which is then fed back to the minus terminal of the operational amplifier 56. The final output value is simultaneously input to sample/hold block 5. On the other hand, when $CS_{in}$ is 0, switch 60 is turned on and switch 61 is turned off. Therefore the output of amplifier 56 is not produced on a DATA-OUTPUT data line. However, as switch 60 is turned on to provide unity gain buffer voltage, the following operation of operational amplifier 56 is not disturbed, but is carried out. Output control circuit block 23 determines whether the output pulse voltage is transmitted by control signal $CS_{in}$ for a daisy chain operation. $CS_{in}$ is outputted as $CS_{out}$ through a delay circuit 23' and the timings of the output analog signals to the other adjacent neuron unit in the same layer is determined. Therefore, the present invention transmits an analog signal in a time division manner from output block 7 to the common bus B shown in FIG. 4. This does not conflict with other output signals from other neuron units.

Figure 13:
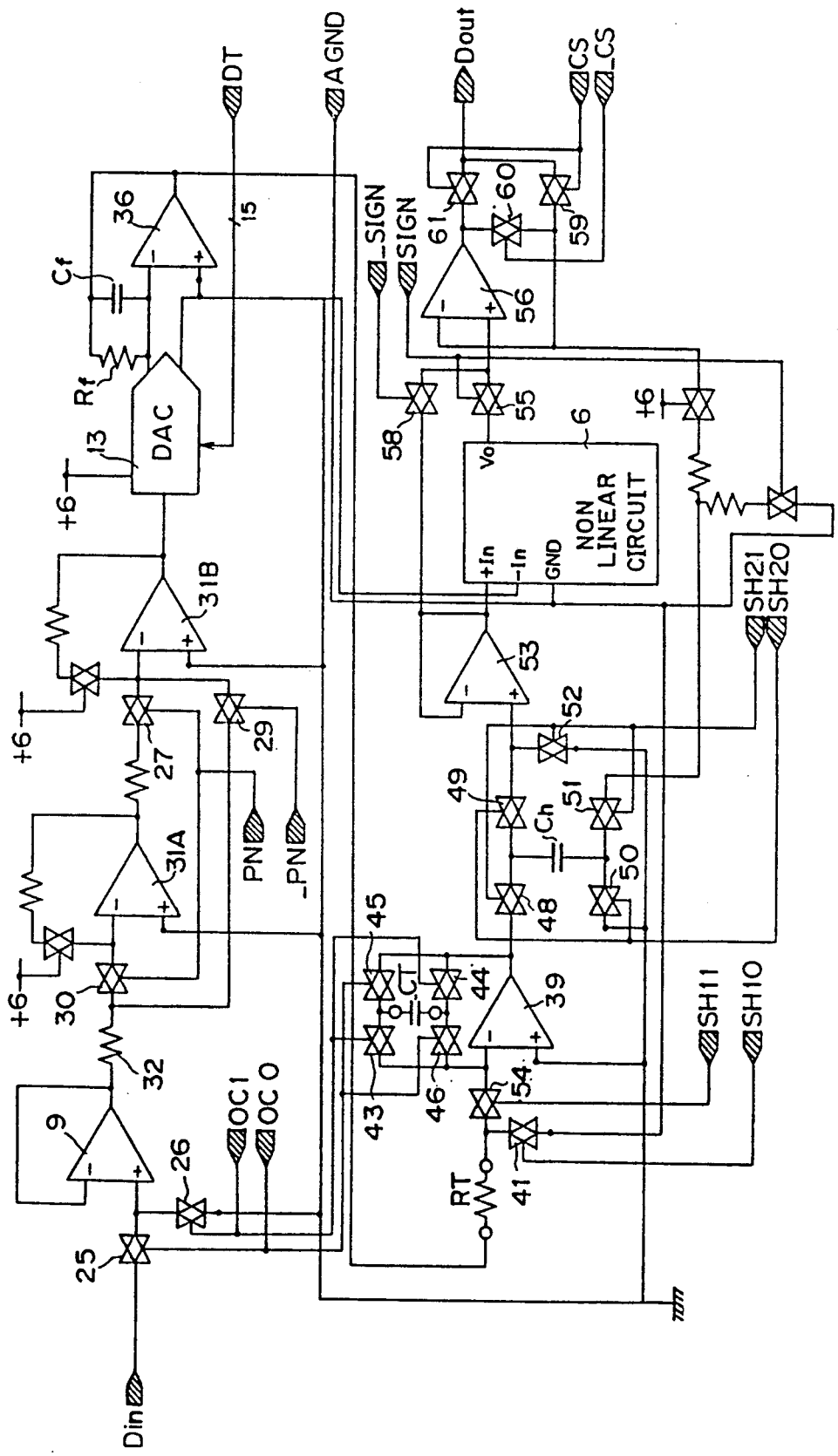
FIG. 13 is a detailed circuit of another embodiment of the neuron unit of the present invention.

A phase control shown in FIG. 13 is realized by forming offset cancellation OC, sign $\overline{SIGN}$, sample hold S/H, sample hold $S/H_{out}$, sigmoid selection signal SEL SIG, daisy chain signal CSI in FIG. 12 by two signals, namely, OC0 and OC1, PN and minus PN, SH11 and SH10, SH21 and SH20, minus SIGN and SIGN, and CS and minus CS, respectively. One control signal is formed by two signals comprising a positive phase and a negative phase, and is shifted by shifting the phase of the respective signals so that the positive phase of the control signal does not turn the switch on at the same time as the negative phase of the control signal turns on a different switch. The Rf connected to the output terminal of D/A converter 13 makes a feedback signal from operation amplifier 36 to be matched with an operation speed of the D/A converter and D/A converter 13 receives digital input from DT terminal. Parts in FIG. 13 which are the same as in FIG. 12 are given the same numbers. Therefore, their explanation is omitted.

Figure 14:
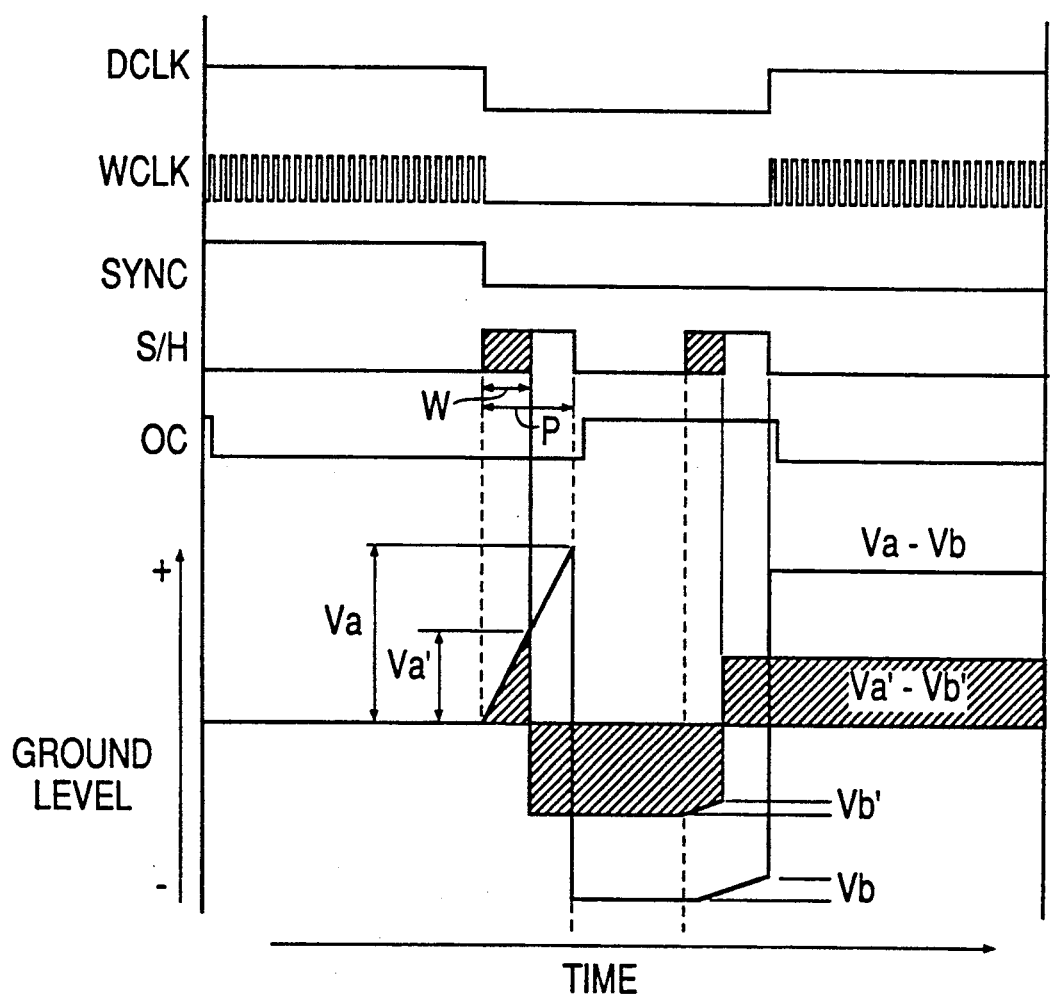
FIG. 14 is a timing chart showing a sample/hold operation of the circuit shown in FIG. 12.

FIG. 14 shows a timing chart for an integrator. The data clock DCLK and weight clock WCLK are basic operation clocks. When data clock DCLK is high, a high-speed weight clock WCLK is output during a half period of the data clock DCLK. Weight clock WCLK is a synchronizing clock for inputting serial weight data to the integrator. Data clock DCLK is a basic clock for processing an analog input signal. Synchronizing signal SYNC can achieve synchronization of respective analog neuron units within respective layers. The operation of the output voltage of the integrator is shown by a triangular integration waveform in the lower part of the drawing. The integration waveform is controlled by a pulse signal of sample/hold control signal S/H. During the period of high sample/hold control signal S/H, an integration is carried out. Namely, a charge is applied to capacitor CT of the integrator path. During the period when the sample/hold control signal S/H pulse is high, this charge is gradually accumulated in the capacitor CT in order to increase the voltage. When the sample/hold control signal S/H pulse is low, the charge application is terminated. Therefore, during the scope of the integration integral time, only the charging period is of importance. Thus, the pulse width of the sample/hold control signal is controlled to expand or compress the scope of the integration period. Therefore, even if the input signal is the same, the output of the integrator becomes the charge voltage Va when the sample/hold control signal S/H has a pulse width P and it becomes the charging voltage Va' when the sample/hold control signal S/H has a pulse width W.

When the sample/hold control signal S/H is low, and the offset control signal OC is raised the polarity of the capacitor CT of the integrator is changed and the integration output, to which an offset component is added, is reversed. When the offset control signal OC is high and the sample/hold control signal S/H is also high, the offset voltage Vb (Vb') is added to the capacitor CT. When the S/H signal becomes low again, and off-set canceling signal becomes low, then the polarity of the capacitor is again reversed to have an original polarity and the integral output value Va−Vb (Va'−Vb') in which the offset component is canceled is subjected to a sample/hold operation. After the output of the integrator is reversed the polarity of the output of the integrator is returned to its original state.

Figure 15:
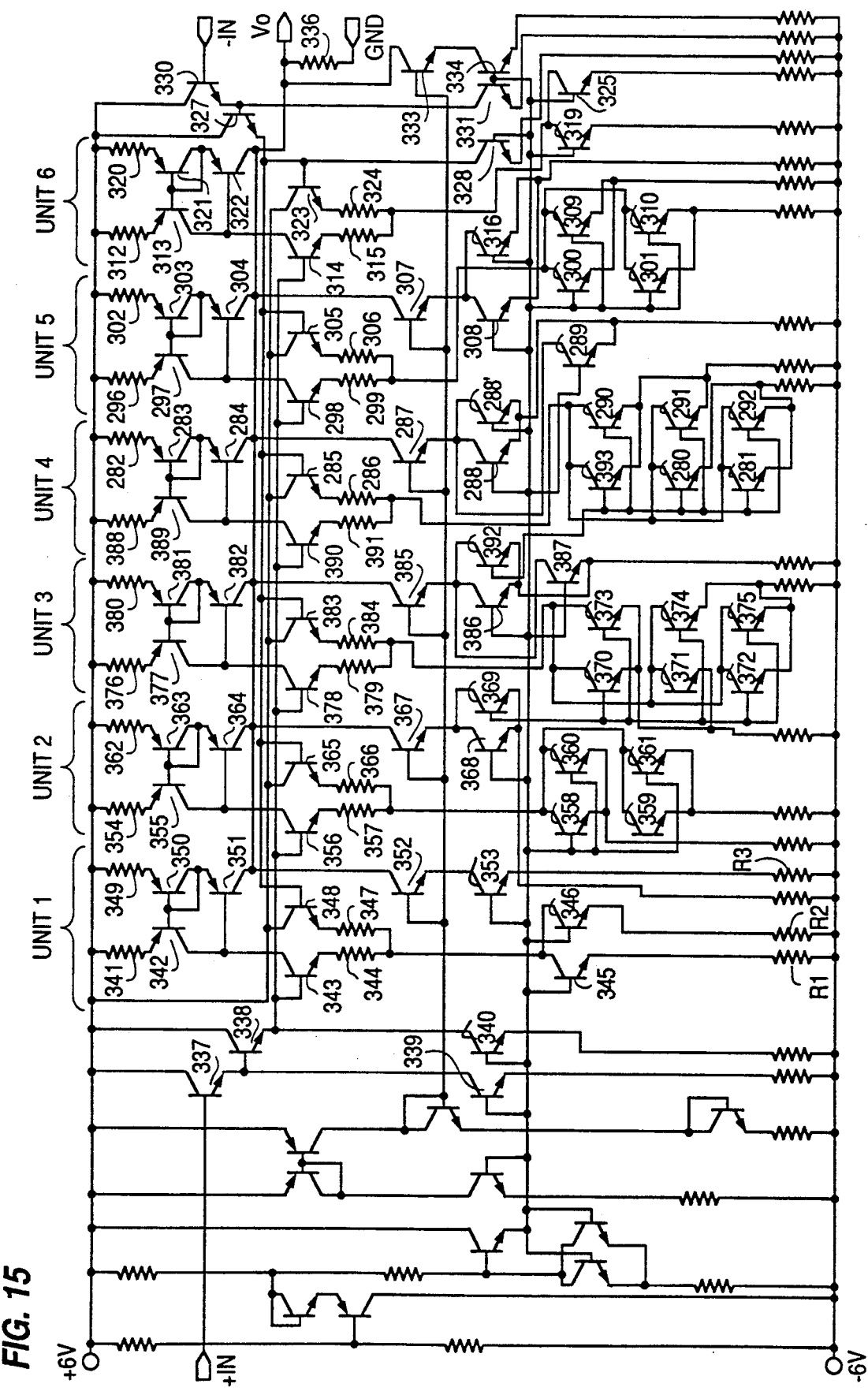
FIG. 15 is a detailed circuit of the sigmoid generator shown in FIG. 12.

FIG. 15 is a transistor circuit for realizing the sigmoid function. The sigmoid function designates a continuous and monotonically decreasing function and does not exclude a linear function. The transistor circuit comprises, for example, six units each comprising a current mirror circuit, a differential amplifier and resistors. In FIG. 15, transistors 343, 348, 356, 378, 390, 298 and 314 and the corresponding transistors constitute a differential amplifier. A group of transistors connected to respective collector sides of the differential amplifiers form a current mirror circuit, respectively. A collector current flowing through a left transistor of the differential amplifier is an output current. The current mirror circuit produces an output after changing a direction of the current. The current flows into resistor 336 connected to the output V0, and resistor 336 converts the current into a voltage. As a driving capacity of this sigmoid function circuit is insufficient, the output thereof is connected to an operation amplifier having a high impedance. A circuit positioned at an input side of transistors 337 and 339 forms a bias circuit. A segmented linearization method is utilized to realize a sigmoid function. Namely, a curve of a sigmoid function can be expressed by six segments corresponding to the outputs of six units 1 to 6, as the respective outputs of six units have different slopes. A slope in the respective segments corresponding to each of the outputs of units 1 to 6 in a sigmoid function circuit which is constructed according to a segment linearization method is determined by a ratio of emitter resistor 344 to output resistor 336. The emitter resistor of the transistor 343 also affects the slope in the respective segments for the sigmoid function. The gains of the respective differential amplifiers is different. A breaking point at which a segmental linear curve changes a slope is determined by saturation characteristics of the respective differential amplifiers. The saturation characteristics of the respective differential amplifiers differ. The characteristics of respective amplifiers are selected such that the value of the total sum of the current outputted from the respective amplifiers represent a sigmoid function at an output point V0. Transistor 345 and resistor R1 forms a current source. Transistor 346 and resistor R2, and transistor 353 and resistor R3 are, respectively, current sources which supply the same value of the current. In other words, the resistances of the resistors are determined such that the same value of a current flows. As the collector of transistors 345 and 346 is connected, the sum current flows through a crossing point of terminals of resistors 344 and 347. The collector currents of transistors 343 and 348 become the same when the current mirror circuit is balanced. Transistor 351 is provided to improve current mirror characteristics of transistor 351.

Transistor 350 is formed of a diode-connection. To change a direction of a current by a current mirror circuit means that there are a case where a current is drawn in from an output terminal and a case where a current is drawn out to an output terminal As shown in FIG. 15, a current flows outwardly from a collector of transistor 351 of the current mirror circuit. Although it seems that there are many transistors in a lower part of FIG. 15, the transistors whose emitters and collectors are respectively connected at the same point are the same ones. For example, transistor 358 is the same as transistor 360 and these transistors 358 and 360 are the same as transistor 345. Transistors 359 and 361 are the same and correspond to transistor 346. Transistors 368 and 369 are the same and correspond to transistor 353. The same is applied to the other transistors. As stated above, the sigmoid function circuit comprises six circuit units each of which enables an operational amplifier with a constant current source to change a direction of a current in accordance with the positive and negative polarity of the output voltage, the constant current source being driven by the same current. Transistors 337 and 338 are for level shift and transistors 330 and 327 are also level shifts. The level shift circuit makes an operation scope to be the same regardless of the positive and negative polarities of the sigmoid function. Transistor 352 is for correction so that a collector current of transistor 351 is made equal to that of transistor 353. The same function is conducted by transistors 367, 385, 287 and 307. The plus and minus terminals of sigmoid function block 6 of FIG. 12 correspond to the terminals + in and − in of the sigmoid circuit of FIG. 15 which form inputs of operation amplifiers after subjecting to level shifting.

The timing chart of the present invention will be explained.

Figure 16:
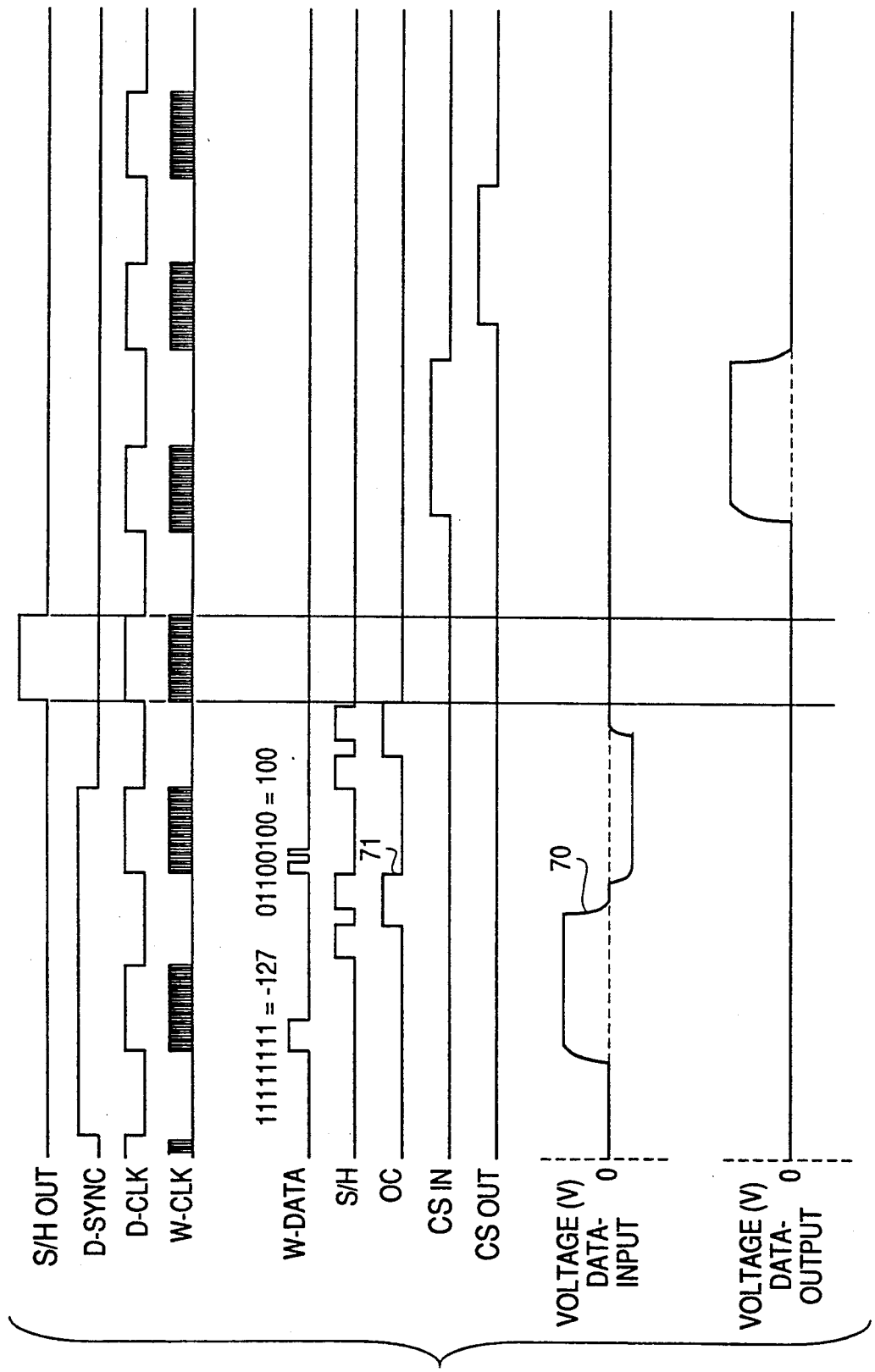
FIG. 16 is a timing chart of the circuit shown in FIG. 12.

FIG. 16 is a timing chart for a unit found in the present invention. D-SYNC and D-CLK are synchronization signals. W-CLK is a timing signal for providing a digital signal to the D/A converter, and the respective bits of weight data are synchronized with W-CLK. For example, in FIG. 16, a pattern of all 1's, corresponding to −127, is applied and thereafter pulses of 01100100, corresponding to 100, are applied. An S/H signal is applied to a time division adding control block 15 provided at an input to the adding block 4. When the S/H signal is "1", the output of the multiplying block 3 is applied to the capacitor CT of the integrator. When the first rising edge of the S/H signal data input is received, the output of the multiplying block, namely, the sum of the input pulse voltages, is added to the capacitor CT of the adding block. At this time, data applied to the D/A converter is −127 and the input data corresponding to −127 is provided as a positive voltage with a waveform 70. This positive voltage is stored in capacitor CT. When the offset control signal OC is provided as shown in waveform 71, the capacitor CT is reversed. The offset concealing generating block of the input block makes the input 0 volts, and when the S/H signal is high, the corresponding offset voltage is applied to a capacitor CT in the adding block. The capacitor's polarity is then reversed. The offset component of the voltage set at a previous rise of the S/H signal is canceled and when offset cancellation OC is 0, the capacitor CT returns to its original state. As stated above, when the voltage is held in capacitor CT, the input from a different neuron unit is multiplied by the weight 100 at respective timings of the weight clock W-CLK and the product is applied to the adding block. When the output of the positive and negative switching circuits are positive, and positive weights are applied to the D/A converter, the output of the multiplying block 3 is reversed to provide a negative voltage. The negative output voltage is stored in capacitor CT, and is then added to the voltage stored in the previous timing. Then, the resulting voltage is also reversed by the adding block 4, or the integrator. Therefore, the sum of the products of the input and the weight is stored in the capacitor CT in a time division manner. When $CS_{in}$ is input, the voltage stored in capacitor CT is output as data-output through a sigmoid function. $CS_{out}$ is output after a delay time from the end of $CS_{in}$, and $CS_{out}$ is also transmitted to adjacent units within the same layer to perform a daisy chain control which is explained later. When $S/H_{out}$ is turned from a low level to a high level, a voltage stored in the capacitor CT of the integrator is sampled in capacitor Ch. When $S/H_{out}$ falls to a low level again and CSin=1, the voltage held in the capacitor Ch is output through the sigmoid function circuit.

Figure 17A:
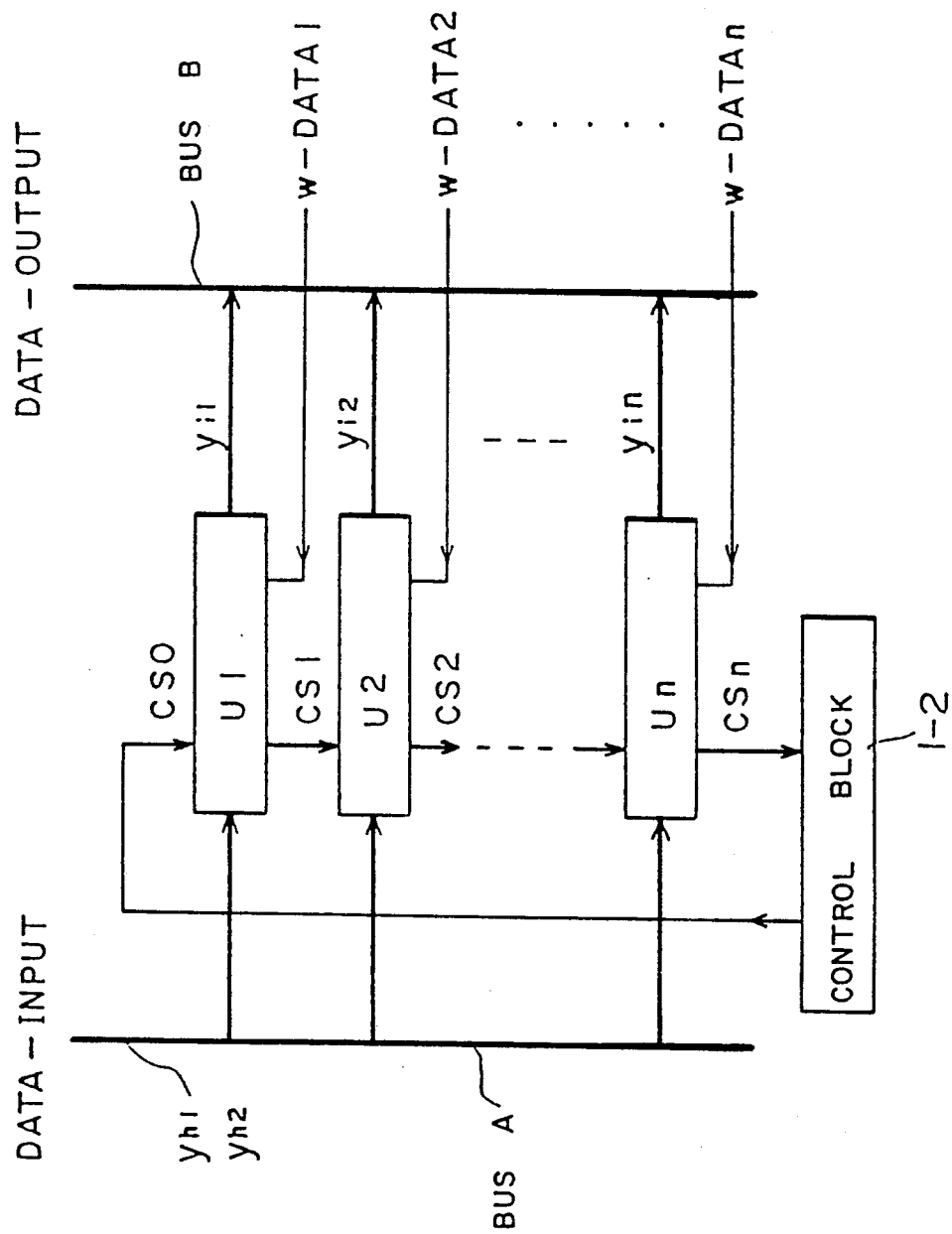
FIG. 17A is a diagram showing a connection of the neuron units for an explanation of a chaining operation.
Figure 17B:
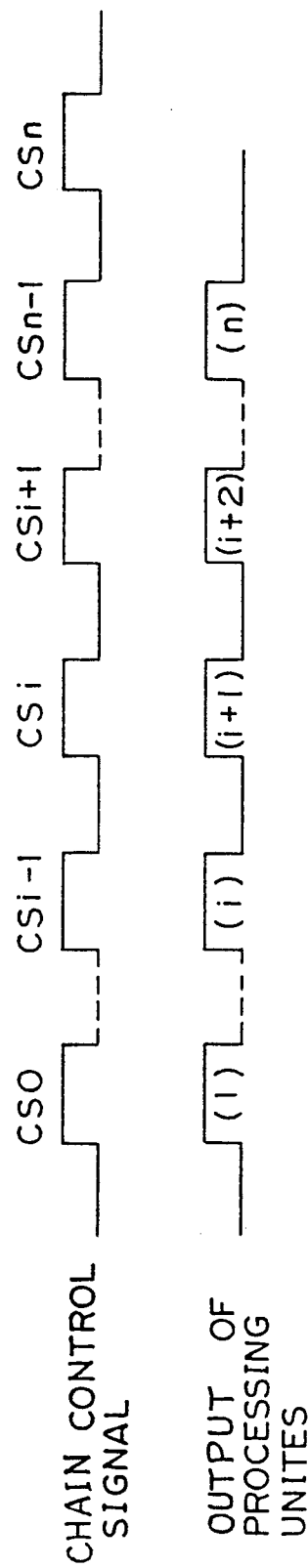
FIG. 17B shows a relation between a chain control signal and an operation of the respective processing units.

FIG. 17A is a block diagram of a connection of the neuron unit according to another embodiment of the present invention. In FIG. 17A, U1, U2, . . . , Un are units in the intermediate layer. The units of the input layer are not shown. The signal output from respective units in the previous stage are applied to bus A of DATA-INPUT and bus A is connected to n units in the post stage. Similarly, the output from units U1, U2 . . . Un in the first stage are commonly connected to the bus B of DATA-OUTPUT. Therefore, the units in the previous stage are connected to the units in the following stage only through bus A. Therefore, the amount of wiring can be minimized and the realization of a neuron unit and its integrating circuit becomes possible. When the signal is transmitted from the units in the previous stage to the units in the post stage, the analog pulse voltages, having amplitudes corresponding to the weights, are transmitted in a time division manner. In FIG. 17A, DATA-INPUT is a time division input of the analog data and DATA-OUTPUT is a time division analog output. CS0 to CSn are daisy chain output control signals and W-DATA1 to W-DATAn are weight data. Processing units U1 to Un in the embodiment execute the process independently. The processing unit Ui receives a control signal from the previous processing unit Ui−1 and outputs a control signal to the next processing unit Ui+1. The process control block 1-2 transmits the first control signal to the first processing unit Ui, and receives the signal designating the end of all the processing units as the control output from the last processing unit (Un). Namely, as shown in FIG. 17B, the sequential generating of daisy control signals CS0, . . . , CSi−1, CSi, CSi+1, . . . , CSn−1 and CSn enable the processing units 1, . . . , i, i+1, i+2, . . . , n and control block 1-2 to perform the operations. In this embodiment it is not necessary for control block 1-2 to be connected to all the processing units, and therefore, control block 1-2 can be simply realized. Adjacent processing units are connected to each other, thereby simplifying the wiring.

Figure 18:
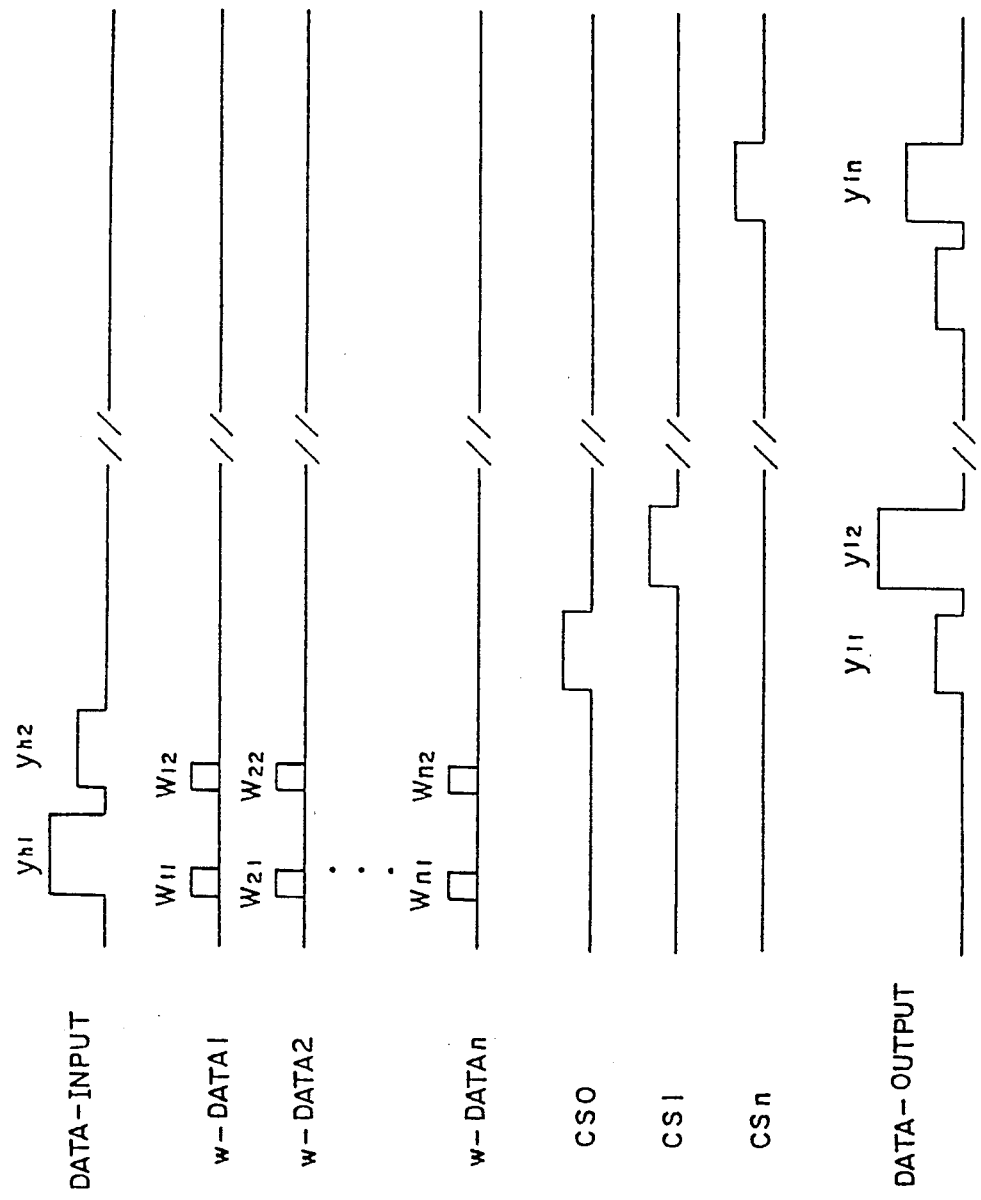
FIG. 18 is a timing chart of a connection of the neuron units shown in FIG. 17B.

FIG. 18 shows a timing chart of the neural network shown in FIG. 17A. The outputs yh1 and yh2 from units H1, and H2, not shown, are received from DATA-INPUT in a time division manner and weights W11 and W12 are sequentially received by unit U1. The process represented by the above equations (1) and (2) is executed in unit U1. In parallel with this operation, the output yh1 and yh2, and weights W21 and W22, ..., Wn1 and Wn2, are supplied to units U2 to Un, to perform the same function as unit U1. Control block 1-2 applies a daisy chain output control signal CS0 to unit U1 and the output yi1 of unit U1 is applied to the DATA-OUTPUT. Next, unit U1 outputs CS1 to unit U2 and unit U2 transmits output yi2 to the DATA-OUTPUT. This sequence is linked until finally unit Un transmits the CSn to control block 1-2 and completes the process series. It also executes a time division process of the neural network.

FIG. 19 is a timing chart of the above unit shown in FIG. 17A. W-data is a digital signal input to the D/A converter of multiplying block 3 and respective bits of weight data are synchronized with W-CLK (not shown). For example, the pulse pattern corresponding to W1 is first applied and thereafter pulse patterns W2 and W3 are applied. S/H signal (not shown in FIG. 19) is a signal to be applied to the time division adding control block 15 provided at the input of adding block 4. When the S/H signal is 1, the output of the multiplying block is input to capacitor CT of the integrator. When the first S/H signal rises, the output data from the multiplying block, namely, the products of the pulse signals, are applied to capacitor CT of adding block 4. Then, the digital amount W1 is applied to the D A converter 13 of the multiplying block 3 and the input data corresponding to W1 is provided as positive voltage as shown in the waveform D1. In this manner, the stored voltage is held in capacitor CT and inputs D2 and D3 from different neuron units are respectively multiplied by weights W2 and W3 at different timings of W-CLK, thereby being applied to adding block 4. Therefore, the sum of the products of the input and the weight is stored in capacitor CT in a time division manner and when $CS_{in}$ is input, the voltage stored in capacitor CT is outputted as data output through a sigmoid function and $CS_{out}$ is output after $CS_{in}$ is finished and $CS_{out}$ is transmitted to the adjacent neuron unit within the same layer.

The data DATA-INPUT is applied in the sequence D1→D2→D3 in a time division manner to a neuron unit. When D1 is input, the weight data (W1 data) is also input and the process represented by equation (1) is conducted within the neuron unit. For the following input D2, the weight data W2 corresponding to the data D2 are input to the neuron unit and are subjected to the sum of the product, namely, (D1×W1+D2×W2+D3×W3), and the sum of the product is processed through the sigmoid function processing block.

As described above, the operation of the neuron unit is completed and the daisy chain output control signal $CS_{in}$ controls the output in a time division manner and after the process is completed, the daisy chain output control signal $CS_{out}$ is produced.

This embodiment is specifically useful for the output part of the neuron unit. This makes it very easy to control the signal output from the neuron unit.

Figure 20A:
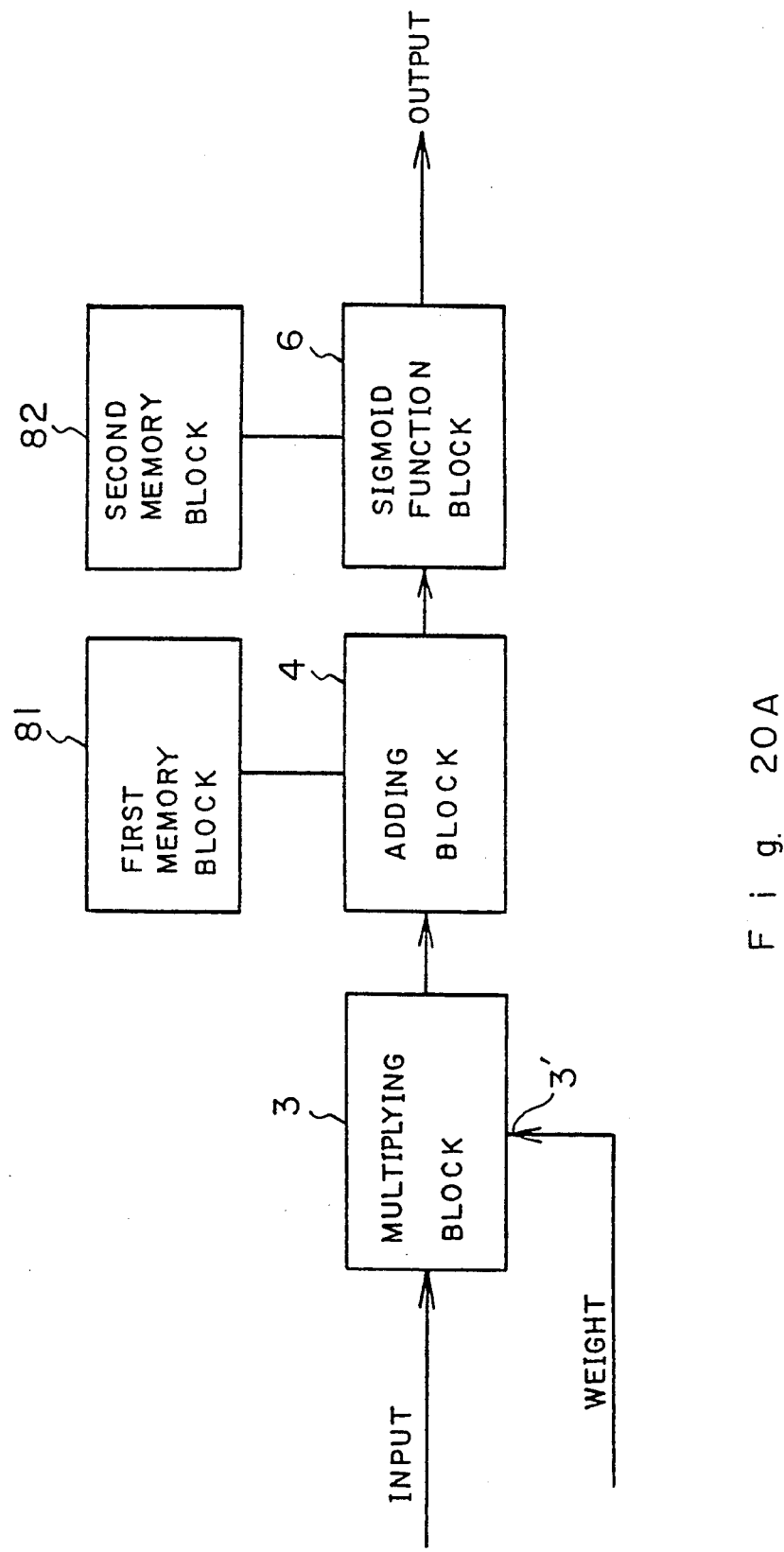
FIG. 20A is a block diagram of the neuron unit of the present invention for explaining a pipe line operation.

FIG. 20A shows a block diagram of another embodiment. Multiplying block 3 multiplies respective inputs for the plurality of units connected to each other by the weight. The weight is read from a memory, which is not shown in FIG. 20A.

Adding block 4 accumulates all the products of the input value and the weight.

Sigmoid function block 6 performs a non-linear function, for example, the above recited sigmoid function, by using the output of adding block 4, and calculates threshold values for the respective neuron units. The first and second memory blocks 81 and 82 store a first intermediate value obtained from the previous circuit and a second intermediate value which is transmitted to the following stage circuit respectively. The first memory block 81 corresponds to the capacitor CT in the integrator and the second memory block 82 to the capacitor Ch. The output of the present neuron unit is applied to respective neuron units constituting the layer next to the layer to which the present unit belongs. In a layer structure neuron network using an analog LSI as a neuron unit the neuron unit multiplies an input value to the LSI by the weight to be input at terminal 3' and the sum of the outputs of the multiplying block 3 which is obtained with regard to a plurality of inputs to the analog LSI. Here the first memory block stores the result of the addition. The second memory block 82 stores the input and output of the non-linear-type function block for the output of the first memory block 81. The sum of the products of the input signal from the previous stage and the weight data transmitted from the outside is stored in the first memory block and, simultaneously, the second memory block transmits the output analog signal to the following stage unit. Thus, the analog pipe line operation is conducted.

In the neuron network, equations (1) and (2) can be used to calculate the outputs of the respective units in the intermediate layer and the output layer.

When an input pattern is applied to multiplying block 3 and adding block 4, the output value is calculated using equation (1) in accordance with the sigmoid function block. The above calculation is not conducted serially for the respective units in an intermediate layer, but rather in parallel. Upon completion of the calculation, the output value corresponding to the next input pattern is immediately calculated for the respective units, also in parallel.

The output of the intermediate layer for the input pattern is applied to the output layer and is used as the output value to calculate the output value for the respective units at the output layer. The value of the unit in the intermediate layer is stored in the first and second memory blocks 81 and 82 and can be output when necessary.

In this embodiment, different intermediate results are stored in two memory blocks, respectively. Therefore, the network process can be conducted using a pipe line operation.

Figure 20B:
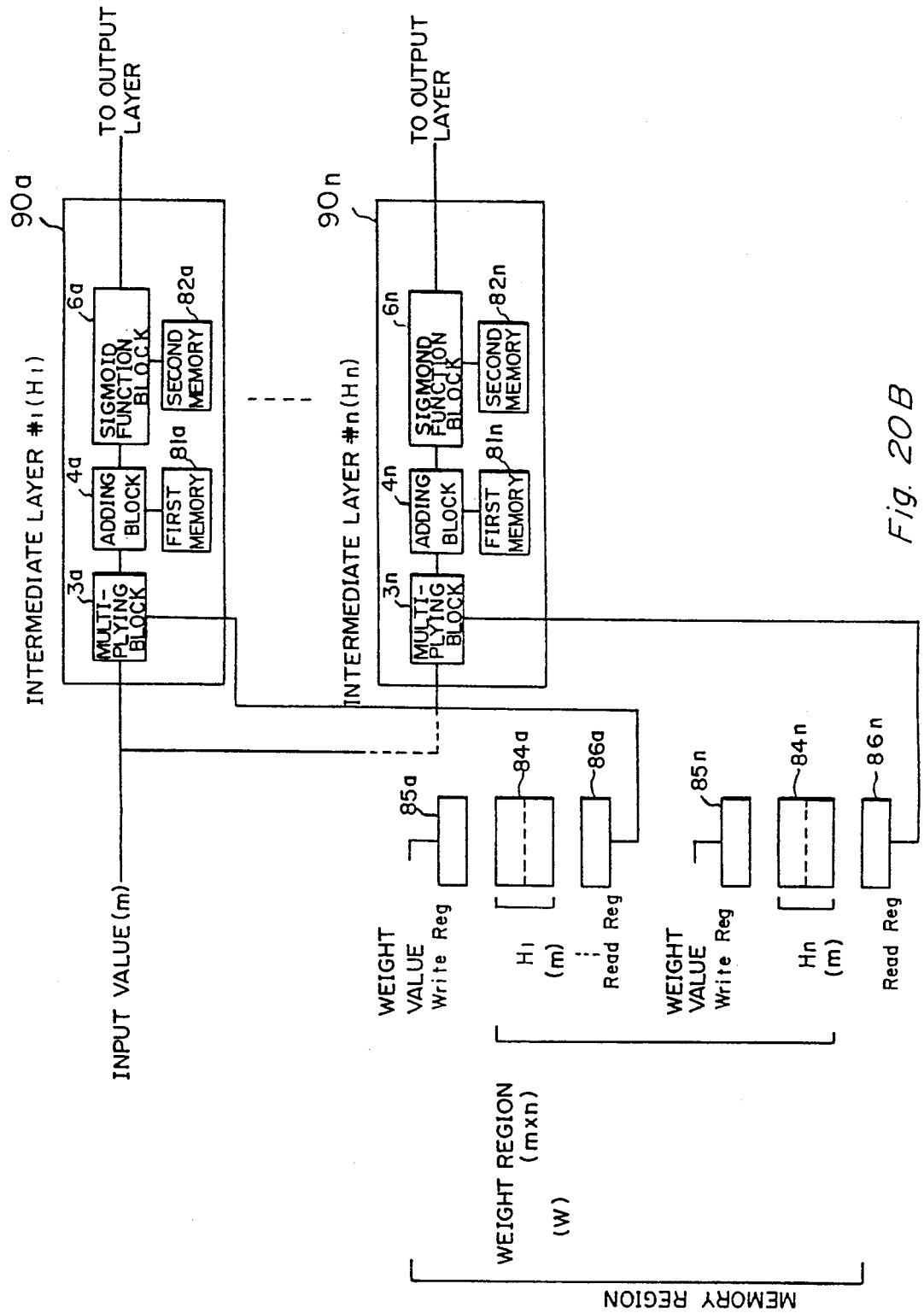
FIG. 20B is another block diagram of the neuron units of the present invention for explaining a pipe line operation.

FIG. 20B shows a block diagram of an embodiment of an intermediate layer of the neural network. The intermediate layer is comprised of n neuron units 90a, ..., 90n. Respective units are comprised of multiplying blocks 3a to 3n and adding blocks 4a to 4n corresponding to adding block 4, sigmoid function blocks 6a to 6n corresponding to the sigmoid function block 6 and, the memory 81a to 81n and memory 82a to 82n corresponding to the first and second memory blocks 81 and 82. A memory region is provided for storing a weight which connects the two units in the network. FIG. 20B shows a memory region for the intermediate layer but a similar memory region is used for the output layer. This memory region comprises m×n regions 84a to 84n corresponding to n units H1 to Hn of the intermediate layer and m units of the input layer. The weight value is previously stored in this area through the write registers 85a to 85n in respective units.

Figure 21:
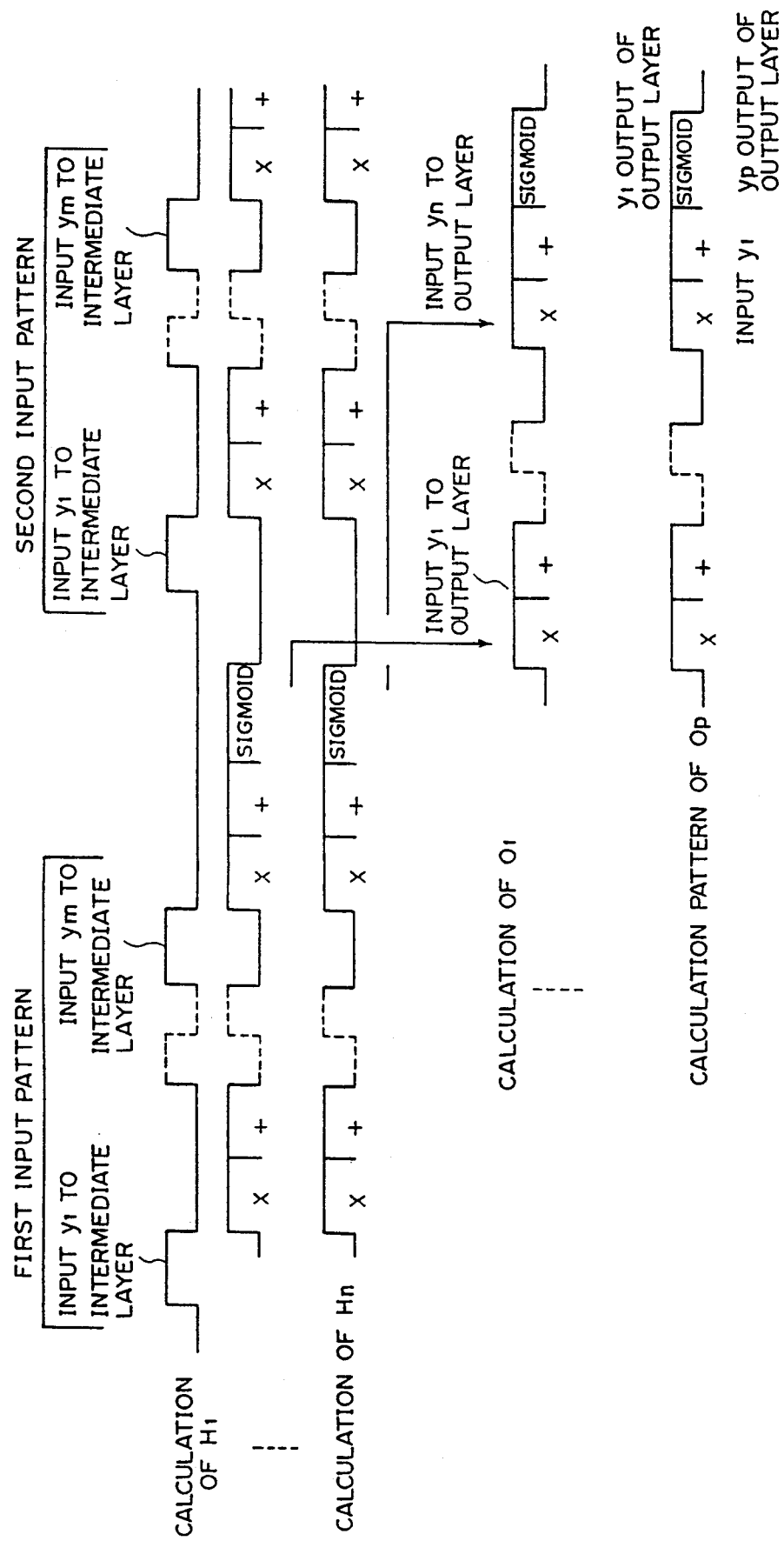
FIG. 21 is a timing chart of the block diagram of FIG. 20B.

The process corresponding to respective units 90a to 90n are is explained by referring to the timing chart in FIG. 21. The first input pattern to the intermediate layer, namely, the input from respective units in the input layer, starts to be processed.

The input yi from unit I1 in the input layer is simultaneously applied to respective units 90a to 90n (H1 to Hn) in the intermediate layer, and the operations of respective units start simultaneously. The weights of the connections between unit I1 and respective units in the intermediate layer are stored in memory regions 84a to 84n and are applied to the multiplying blocks 3a to 3n of the respective units through read registers 86a to 86n, in order to provide a product or a weight and the input y1. The products are applied to adders 4a to 4n. Then, a similar operation is applied to the input y2 from unit I2 of the input layer and the products of the weights and inputs y1, y2, ... are applied to adders 4a to 4n which are to accumulate these products.

A similar calculation is applied to all the inputs from respective units in the input layer. The sum of the products for the input ym is obtained from the last unit Im, and the result is stored in the first memory 81a. The content of the first memory is transferred to the second memory 82a and the result is transmitted through the sigmoid function block 6a. In this instance, the content of the first memory is already used and thus, the second pattern is immediately applied to respective units 90a to 90n in the intermediate layer. The same operation as that to the first input is applied to the second input and the result is again stored in the first memory 81a. The content of the second memory 82a is simultaneously transmitted through the sigmoid function block 6a, or, without going through the sigmoid function block 6a, to the output layer. Then, the unit 01 to 0p in the output layer starts the process, and input y1 is supplied to respective units in the output layer from intermediate unit 90a. The sum of the products between the inputs y1 and weights for connection between the intermediate layer and the output layer are then stored in the memory regions. Next, the same operation is applied to input y2 from unit 90b(H2) of the intermediate layer. Input y2 is supplied from the second memory 82b in unit 90b(H2). Thus, up to this time, the output value can be maintained.

Simultaneously, the sum of the products is applied to the input from the second memory 82n of the unit 90n(Hn) of the intermediate layer and is transferred to the first memory within the unit in the output layer. When the data is transferred to the second memory and is subjected to the sigmoid function, the process in the output layer for the first input pattern is completed and thereafter the second input pattern can be processed.

Figure 22:
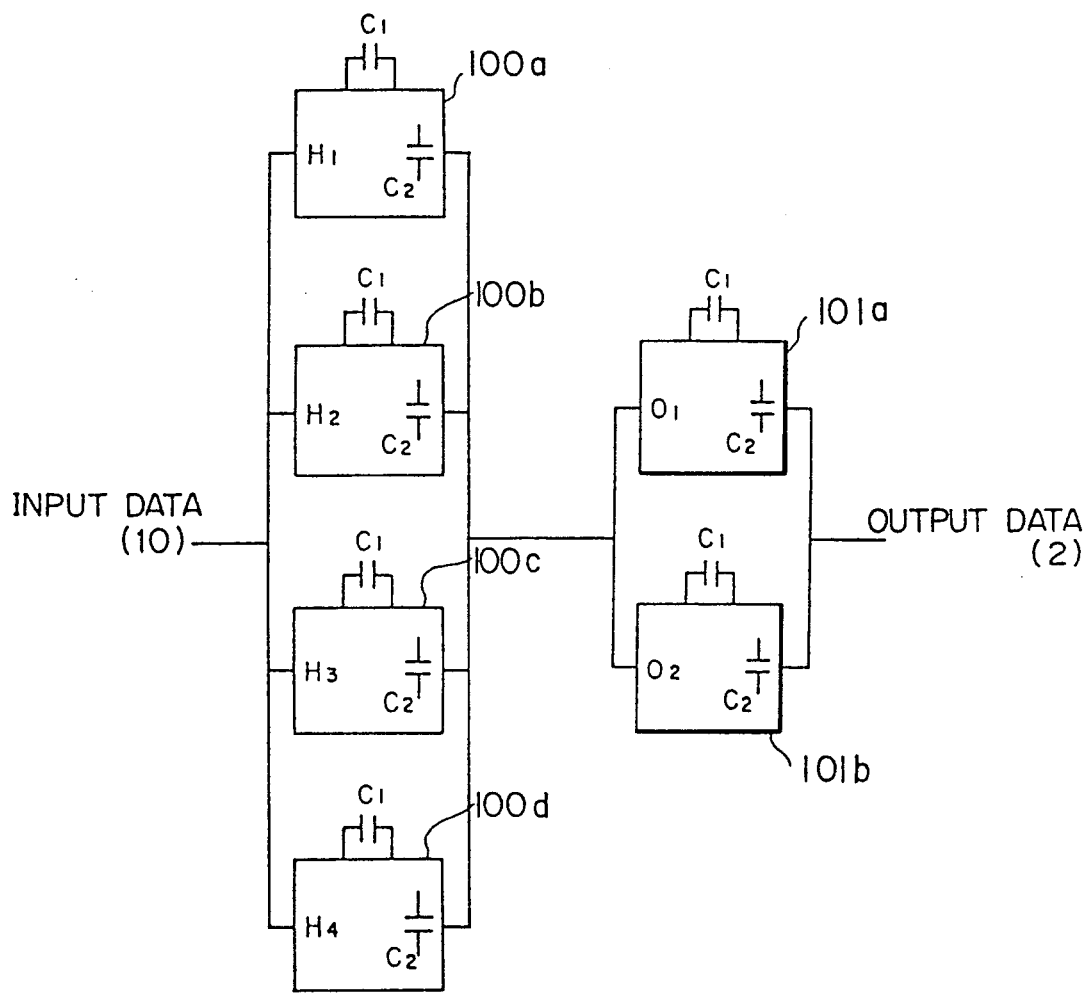
FIG. 22 is a diagram showing a block diagram of a neural network of the present invention for explaining a pipe line operation.

FIG. 22 shows an embodiment of the neural network utilizing the analog neuron unit. The input layer is comprised of ten units and the intermediate layer is comprised of four neuron units 100a to 100d. The output units are comprised of the two neuron units 101a to 101b, forming the neural network. In the drawing, ten input data are input from the ten neuron input layer. The neuron unit in the intermediate layer has a capacitor C1 and the neuron unit of the output layer has a capacitor C1. The capacitor C1 corresponds to the first memory. The capacitor C1 stores the data of the sum of the products. Capacitor C2 corresponding to the second memory stores the result of the first memory. The capacitor C2 is used for sample holding.

FIG. 22 uses the four neurons 100a to 100d in the intermediate layer which complete a sum of the products operation for the ten input data and the result is stored in the capacitor C1 as its terminal voltage. The result is then transferred to the capacitor C2 and the circuit before capacitor C1 is separated from the circuit after capacitor C2 in an analog manner. The output of the capacitor C1 is applied to C2. Namely, the result of the sum of the products is applied to the sigmoid function in the intermediate layer. At this time the output layer starts processing the signals and the output operation of the intermediate layer is conducted in both a sequential manner and a time division manner. Neuron units 101a and 101b in the output layer conduct the operation of the sum of the products. Thereafter, the operation is repeated in a sequence of 100b, 100c and 100d. The sum of the products is stored in capacitor C1 in the output layer.

As described, by storing the output of the neuron unit from the intermediate layer in the capacitor C2 in the output layer it is not necessary to maintain the result of the sum of the products in capacitor C1. Thus, when the process in the output layer starts, processing of the input data to the intermediate layer can begin. Therefore, in the above embodiment, the process in the intermediate layer and output layer can be conducted in a pipe line manner, to achieve a high-speed network operation.

Figure 23:
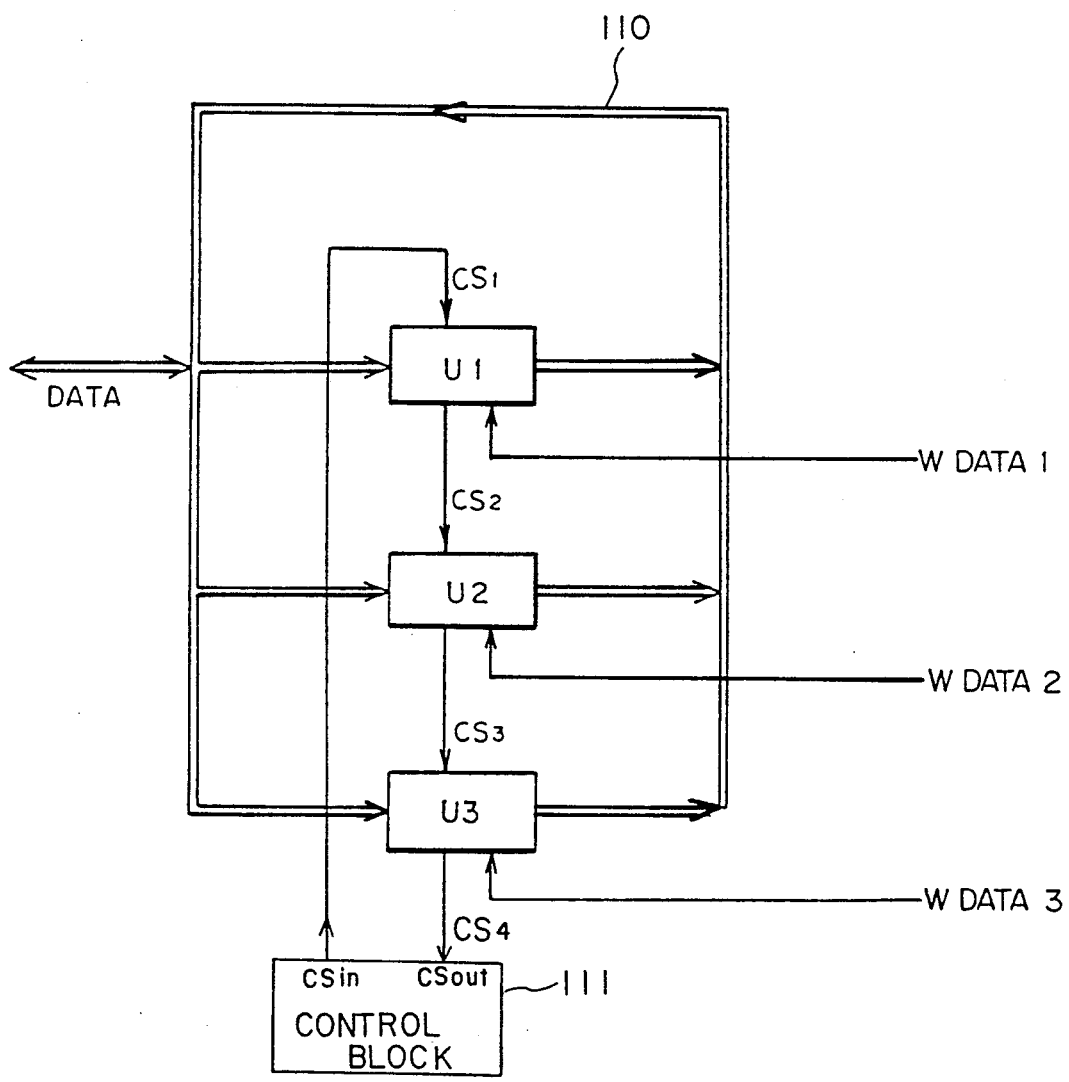
FIG. 23 is a block diagram of another embodiment of a neural network- of the present invention.

FIG. 23 is a block diagram of the neuron network of the layer structure. In the drawing, neuron units U1, U2 and U3 are provided in a single layer. The output signal produced by each respective neuron unit is fed back to the same bus through feedback line 110 in order to constitute the inputs of the same neuron units. To provide an equivalent neuron network with a layered structure, The present embodiment controls units U1 to U3 in a single layer in a time division multiplexing manner by control signals $CS_{in}$ and $CS_{out}$ from control block 111.

Figure 24:
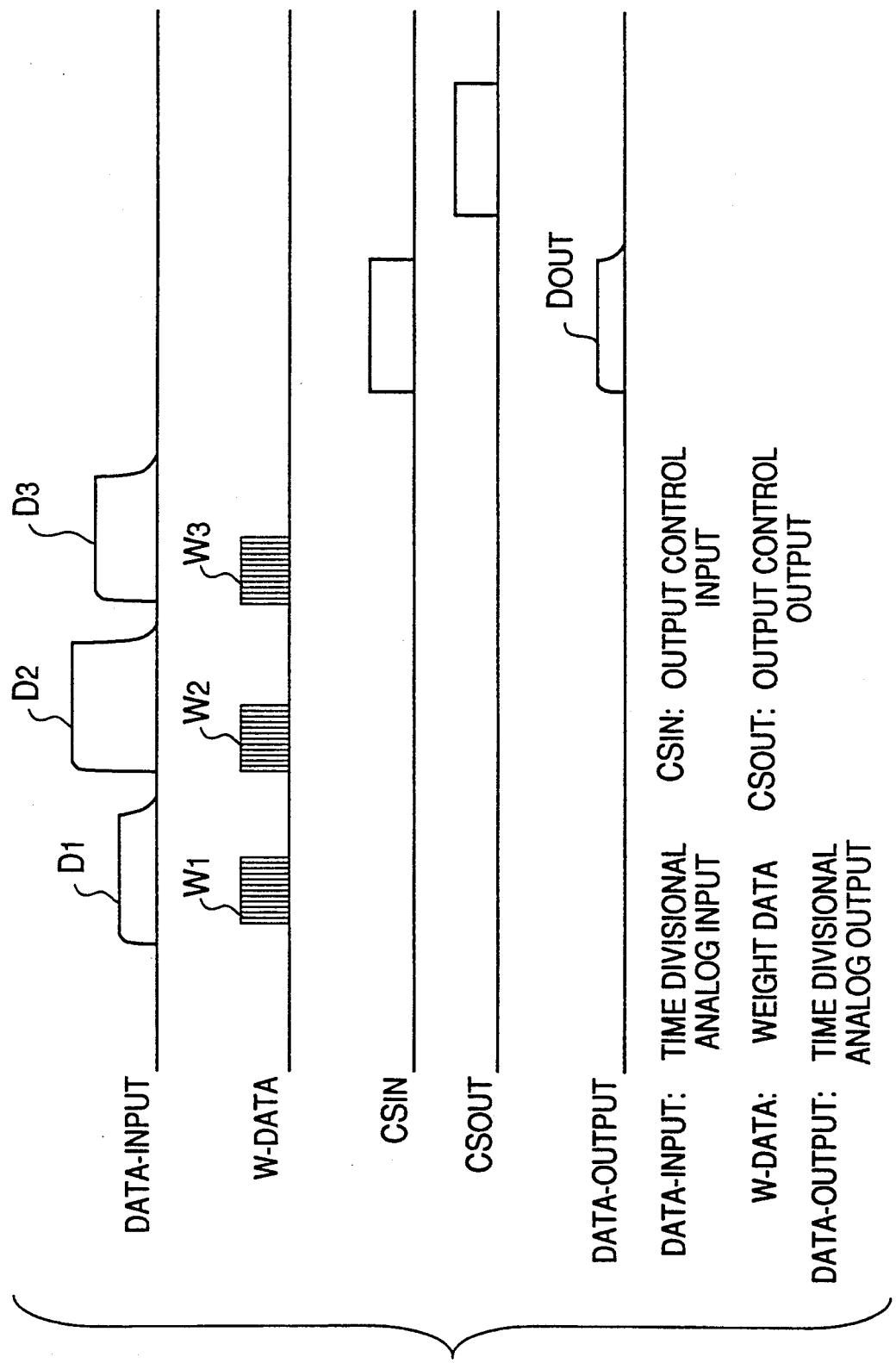
FIG. 24 is a timing chart of the embodiment shown in FIG. 23.

FIG. 24 shows a timing chart of input and output voltages of the units of this embodiment. The units in this embodiment receive the voltages (D1, D2 and D3) with the amplitude of the previous output and the weight data (W1, W2 and W3) to provide the sum of the products (W1D1+W2D2+W3D3) and, then, apply a non-linear function operation to the sum of products. When $CS_{in}$ is at a high level, $D_{out}$ is produced, and after that, output control signal $CS_{out}$ results. This embodiment repeatedly uses the units U1, U2 and U3 in the single layer to provide an equivalent multi-layered structure.

Figure 25:
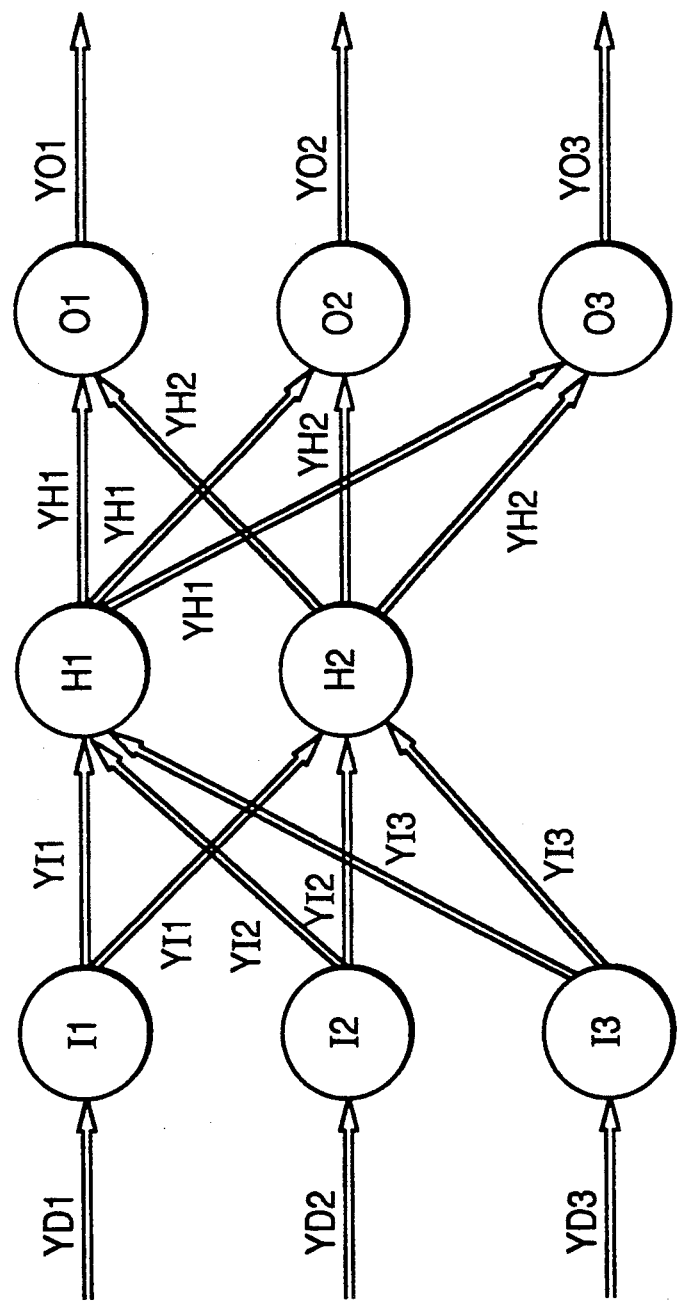
FIG. 25 is a block diagram of a neural network of a layered type which is equivalent to the neural network shown in FIG. 23.

FIG. 25 shows an equivalent layer structure neural network which is realized by the neural network shown in FIG. 23.

Figure 26:
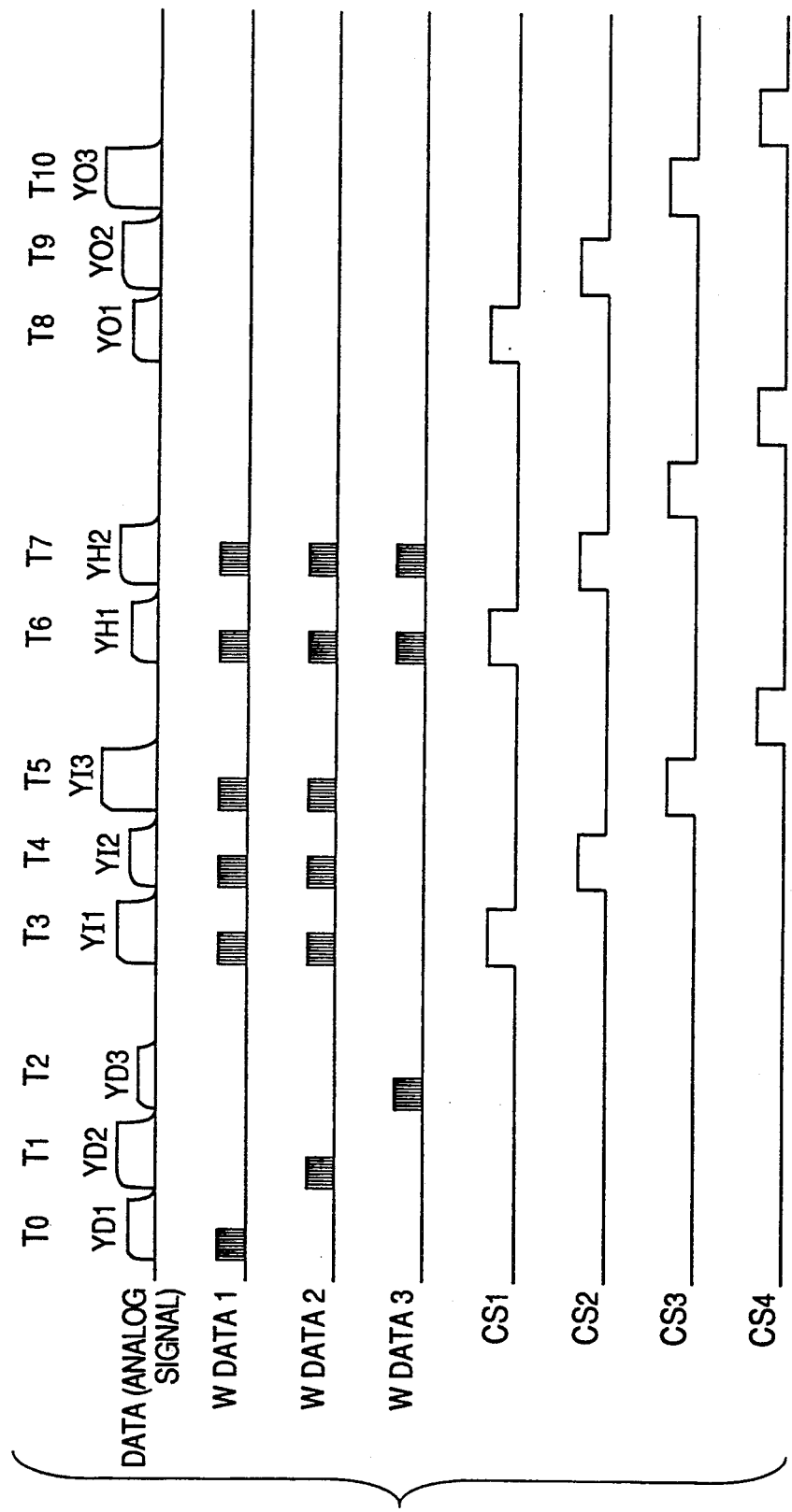
FIG. 26 is a timing chart of the embodiment of FIG. 23.

FIG. 26 shows a timing chart of the neural network shown in FIG. 23. W-DATA1, W-DATA2 and W-DATA3 are input to units U1, U2 and U3, respectively, as variable weight data. As shown in the time chart of FIG. 26, the data input line provides data YD1, YD2 and YD3 to units U1, U2 and U3, respectively, and weight data W1, W2 and W3 are simultaneously applied to units U1, U2 and U3 respectively, in a time division manner. That is, W1 data is applied to unit U1 simultaneously with data YD1 at the timing T0. At the next timing T1,YD2 and W2 are applied to unit U2. At the following timing T2, YD3 and W3 are applied to unit U3, thereby enabling the products thereof to be calculated and to be applied to the sigmoid function block.

When the present embodiment, shown in FIG. 23, is compared with the layer structure of the neural network of FIG. 25, the neuron units I1, I2 and I3 of the input layer correspond to units U1, U2 and U3 of this embodiment, and the product of the input voltage and weight voltage are obtained by units I1,I2 and I3. Unit I1 in FIG. 25 calculates the product of YD1 and W1, and provides an output YI1 after the sigmoid function. This output is simultaneously applied to the units H1 and H2 of the hidden layer or the intermediate layer, and the operation of the hidden layer in this embodiment can also be carried out in units U1 and U2. The output YI1 from the unit U1 which corresponds to unit I1 is fed back through a feedback line 110 and then applied to units U1 and U2 corresponding to the hidden units H1 and H2 at time T3. At this time, weight data W1 and W2 are applied to units U1 and U2 which correspond to the units H1 and H2 in the hidden layer together with YI1. Similarly, in FIG. 25, the product of YD2 and W2 is calculated by unit I2 in order to output the data YI2 through the sigmoid function to be applied to units H1 and H2. When this operation is explained by referring to FIG. 23, the process of unit I2 is conducted by unit U2 and data YI2 output from unit U2 is fed back through a feedback line and is simultaneously applied to units U1 and U2 corresponding to units H1 and H2 at a time T4. Similarly, the sigmoid function output value of the product of YD3 and W3 is executed by unit I3, thereby outputting data YI3 is simultaneously applied to units U1 and U2 at timing T5, which correspond to H1 and H2 in the hidden layer, as illustrated in FIG. 26.

In FIG. 25, the input YI1, YI2 and YI3 to unit H1 and H2 are respectively multiplied by data W1 and W2. As shown in FIG. 26, an operation of these multiplications is carried out at different times T3, T4 and T5. The output value provided after the sum of the products through the sigmoid function in unit H1 is YH1. Input YI1, YI2 and YI3 to unit H2 are multiplied by W2, and the sum of the products is calculated by unit H2 in order to provide the output YH2.

This operation can be conducted in a time division manner. Namely in the latter case, the products of YI1 and W2, YI2 and W2, and YI3 and W2, are obtained in unit H2, which corresponds to unit U2, at times T3, T4 and T5, respectively. The sum of the products is outputted from unit U2 through the sigmoid function block. The timing T7 when YH2 is outputted is different from the timing T6 when YH1 is outputted.

According to this embodiment, units U1 and U2 are used for units H1 and H2 to facilitate the operation of a time division process. The output layer 01, 02 and 03 are similarly executed by using units U1, U2 and U3 in this embodiment. Namely, as shown in FIG. 26, the analog voltage YH1 produced from unit U1 corresponding to H1, is input to U1, U2 and U3 each corresponding to 01, 02, and 03 at time T6. The output YH2 from unit U2 corresponding to unit H2 is provided to 01, 02 and 03 at time T7. That is, in this present embodiment, units H1 and 01 comprise the same unit U1, and units H2 and 02 comprises the same unit U2, and unit 03 corresponds to unit U3. The products of YH1 and the weight data can be simultaneously obtained at units U1, U2 and U3 which correspond to units 01, 02 and 03, respectively. The products of YH2 and the weight data are simultaneously obtained in units U1, U2 and U3, which again correspond to units 01, 02, and 03, at time T7 (different from the time T6). In units U1, U2 and U3 which correspond to output units 01, 02 and 03, the sum of the products is calculated at time T6 and T7 while the output values through the sigmoid function is outputted as YO1, YO2, and YO3 at times T8, T9, and T10.

The control signals CS1, CS2, CS3, and CS4, shown in FIG. 26, facilitate the calculation of the multiplication of the input signal and the weight data and the sigmoid function to be carried out, thereby producing the result of the calculation. For example, CS1 becomes "1" when the unit U1 is in an output state. Therefore, YI1, YHI1, YO1 are input to the next stage at times T3, T6 and T8, respectively in a feedback manner. The corresponding weight data are input to unit U1 and the result of the previous sum of products after a non-linear function is output from unit U1, when the pulse signal CS1 is "1". Similarly, when a pulse signal CS2 becomes "1", YI2, YH2 and YO2 are input to the next stage in a feedback manner and the result of the previous sum of products after a non-linear function is output from unit U2. When a pulse signal CS3 becomes "1", YI3, YH3 and YO3 are input to the next stage in a feedback manner and the result of the previous sum of the products after a non-linear function is output from unit U3. The control signal CS4 is outputted from unit U3, after unit U3 outputs signals. Accordingly, the operation of units U1 to U3 in the embodiment constitutes, a neural network of an equivalent layer structure by using a single layer unit in a time division multiplexing manner.

Figure 27:
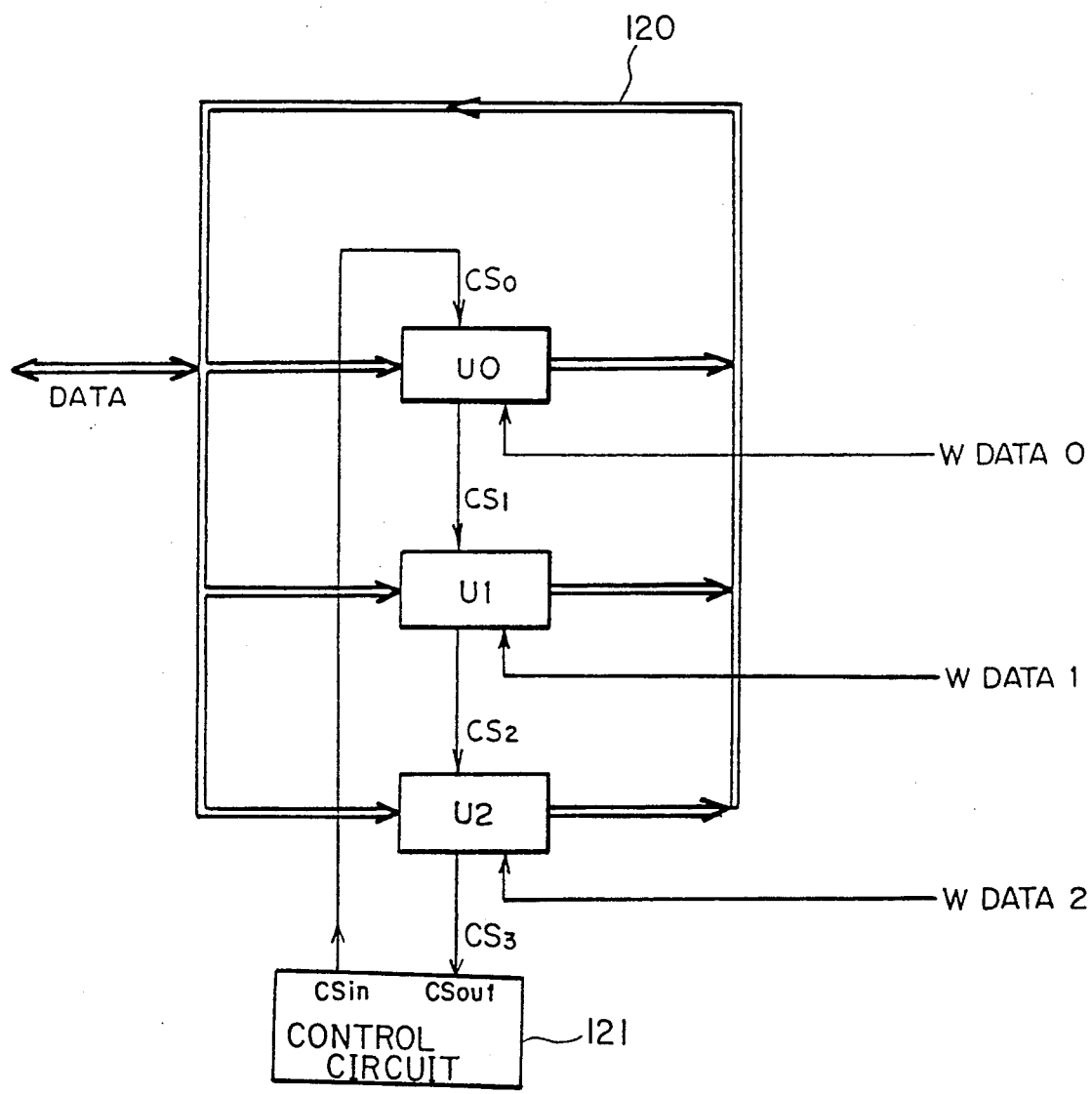
FIG. 27 is a block diagram of a further embodiment of the neural network of a feedback type.

FIG. 27 shows the structure of another embodiment of a neural network. The output signals from respective neuron units U0, U1 and U2 are fed back by the same bus 120 and are entered in the same units. The present invention provides a Hopfield type network in which units U0 to U2 are used in a time division multiplexed manner and the weight between the units can be changed.

Figure 28:
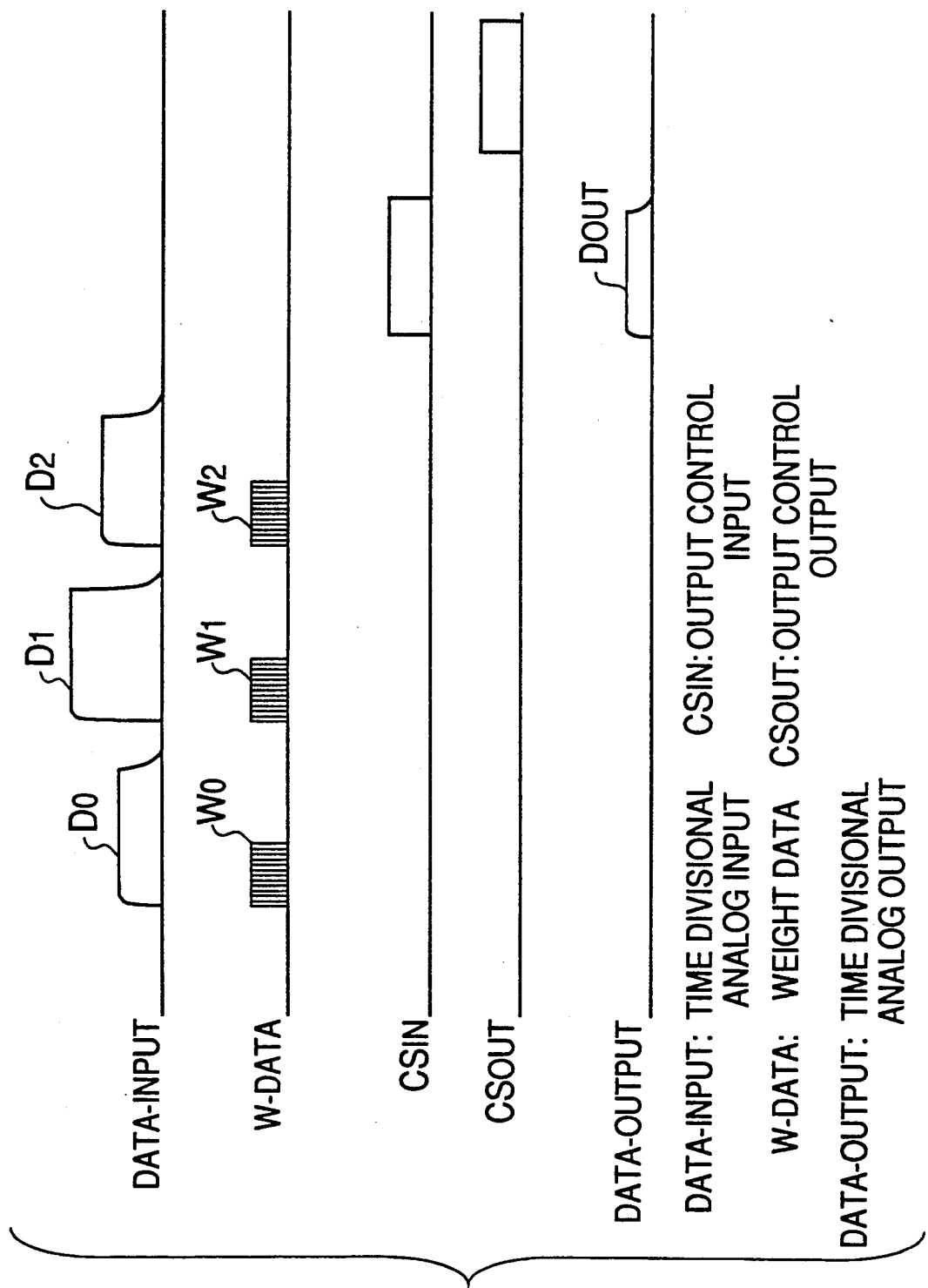
FIG. 28 is a timing chart of the embodiment shown in FIG. 27.

FIG. 28 shows a timing chart for a waveform of the input voltage for the unit. A pulse voltage (D0, D1, D2) has an amplitude corresponding to the sum of the products while the weight data (W0, W1, W2) are input in a time division manner. The sum of the products (W0D0+W1D1+W2D2) is obtained inside the unit and is subjected to a non-linear function operation. When $CS_{in}$ is at a high level, the result $D_{out}$ is outputted, and thereafter $CS_{out}$ is outputted as an output control signal. In this embodiment, the operation is repeated within the network until the output of the network becomes stable.

Figure 29:
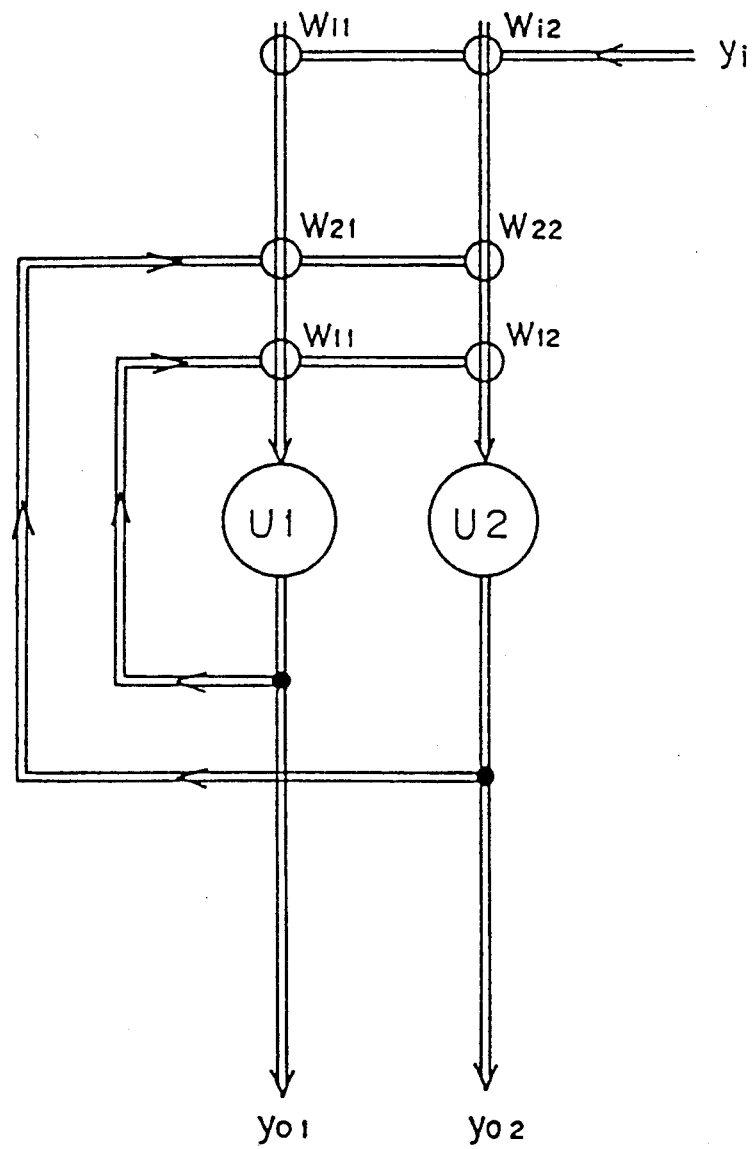
FIG. 29 is a block diagram of a neural network of a feedback type according to a further embodiment of the present invention.

FIG. 29 is a block diagram of the neural network according to the present embodiment.

Figure 30:
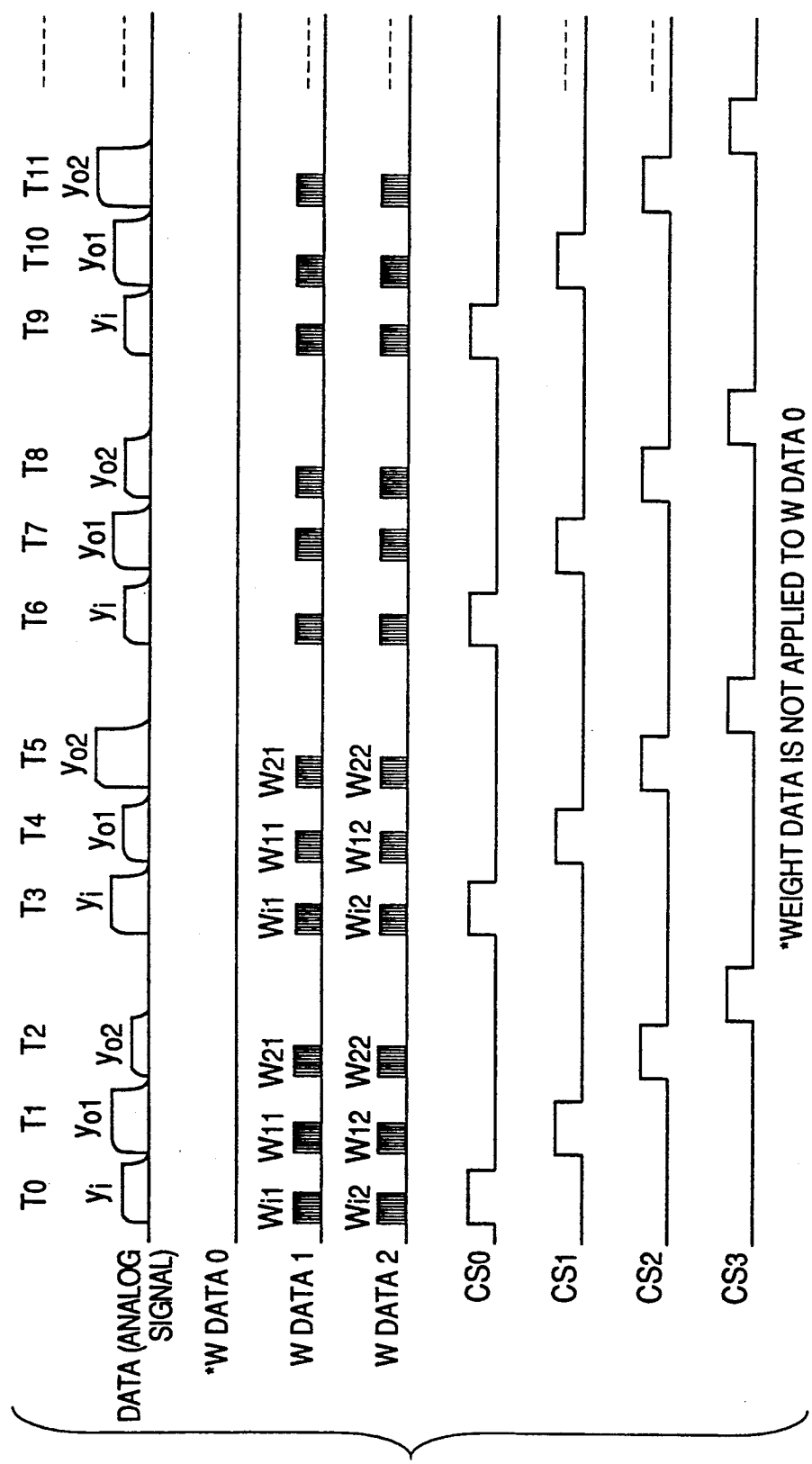
FIG. 30 is a timing chart of the embodiment shown in FIG. 29.

FIG. 30 is a detailed timing chart of a waveform of a neural network which uses multi division multiplexing according to the block diagram shown in FIG. 27.

As shown in FIG. 27, W0, W1 and W2 are weight data to be supplied to the units U0, U1, U2, respectively. FIG. 29 realizes a Hopfield type network shown in FIG. 27 and uses unit 0 of FIG. 27 in order to produce the input yi in FIG. 29. Namely, the weight 0 of unit 0 is determined such that it always has 0 weight data and that the output of unit 0 is kept constant, for example, by storing a constant voltage in the capacitor Ch, and is applied to units U1 and U2 as an input yi. The timing chart shown in FIG. 30 illustrates outputs yi, YO1 and YO2 from units U0, U1 and U2 which are given, and weight data W0, W1 and W2 are respectively applied to units U0, U1 and U2 in a time division manner. Namely, at a time T0, Wi1 of W1 data and yi are applied to unit U1. Wi2 is made to correspond to W2. At the next time T1, YO1 and W11 are input to unit U1, and YO1 and W12 are supplied to unit U2. At the next time T2, Y02 and W21 are applied to unit U1, Y02 and W22 are applied to unit U2. Therefore, respective products are calculated and put through the sigmoid function in each unit. The operations of T0 to T2 are repeated in the sequence of T3 to T5, and T6 to T8, . . . . When the energy function of the network is at a minimum or at a local minimum, the output of the network becomes stable and will not be changed, thereby finishing the repetition of this operation, as the output of the network does not change.

The control signal CS0, CS1, CS2, CS3 shown in FIG. 30 enables a calculation of the products of the input signal and the weight data, and the sigmoid function, to be outputted. For example, CS0 is a pulse which becomes "1" when the unit U0 is in outputting state. Therefore, yi is input to the other unit from a unit U0 at times T0, T3, T6 and T9 and when the corresponding weight data is input to the other unit, CS0 will become "1". Similarly, CS1 is a pulse which becomes "1" when Y01 is output from unit U1 and CS2 is a pulse signal which becomes 1 when Y02 is output from unit U2 after unit U2 produces the output.

The present embodiment provides a neural network which uses a plurality of units in a time division and multiplexing manner.

Figure 31A:
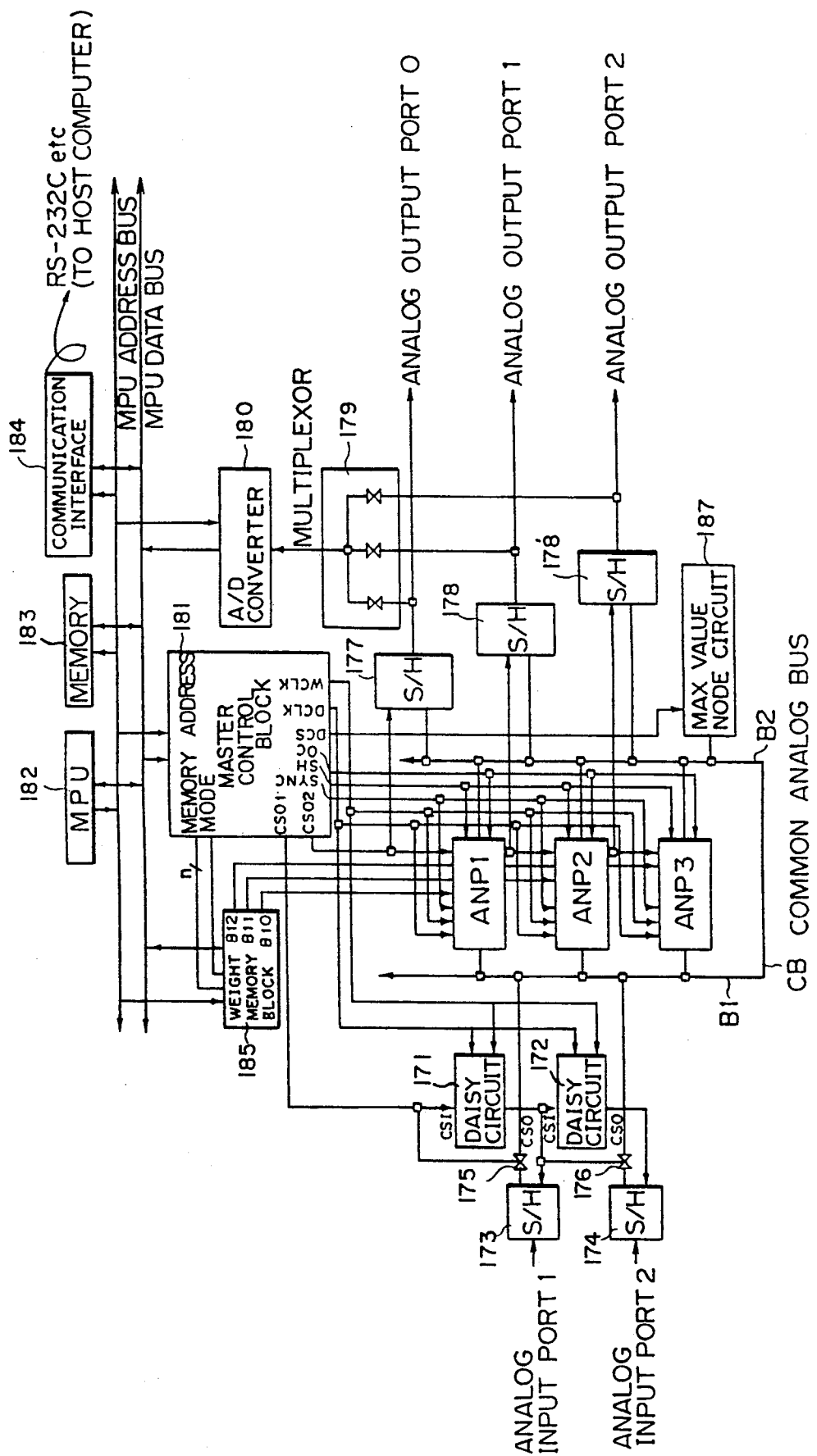
FIG. 31A is a detailed circuit of the embodiment of the neural network of the layered type shown in FIG. 23, FIGS. 31B and 31C are timing charts of the embodiment shown in FIG. 31.

FIG. 31A is an example in which a neuron computer can be realized through a feedback type network which operates in a layer-type network. For the time division analog input signal from analog input ports 1 and 2, a sum and product operation is conducted at ANP1, 2 and 3 (neuron unit shown in FIG. 12 is hereinafter called ANP(Analog Neuron Processor)). ANP1, 2 and 3 operate as an intermediate layer and produce a time division output to analog bus B2. The output signal is fed back to the analog bus B1 through analog common bus CB and again ANP1, 2 and 3 calculate the product at three operations for the feedback signal, thereby enabling ANP1, 2, 3 to operate as an output layer and realize a layer-type network by using a single ANP1,2 3. The max value node circuit 187 produces a dummy signal to analog bus B2 after receiving DCS output of the master control block 181 and produces a dummy signal to the analog bus B2. DCLK and WCLK are input to a daisy chain circuit 171 from the master control block 181 at the timing of the rise and fall of the CSI signal.

Figure 31B:
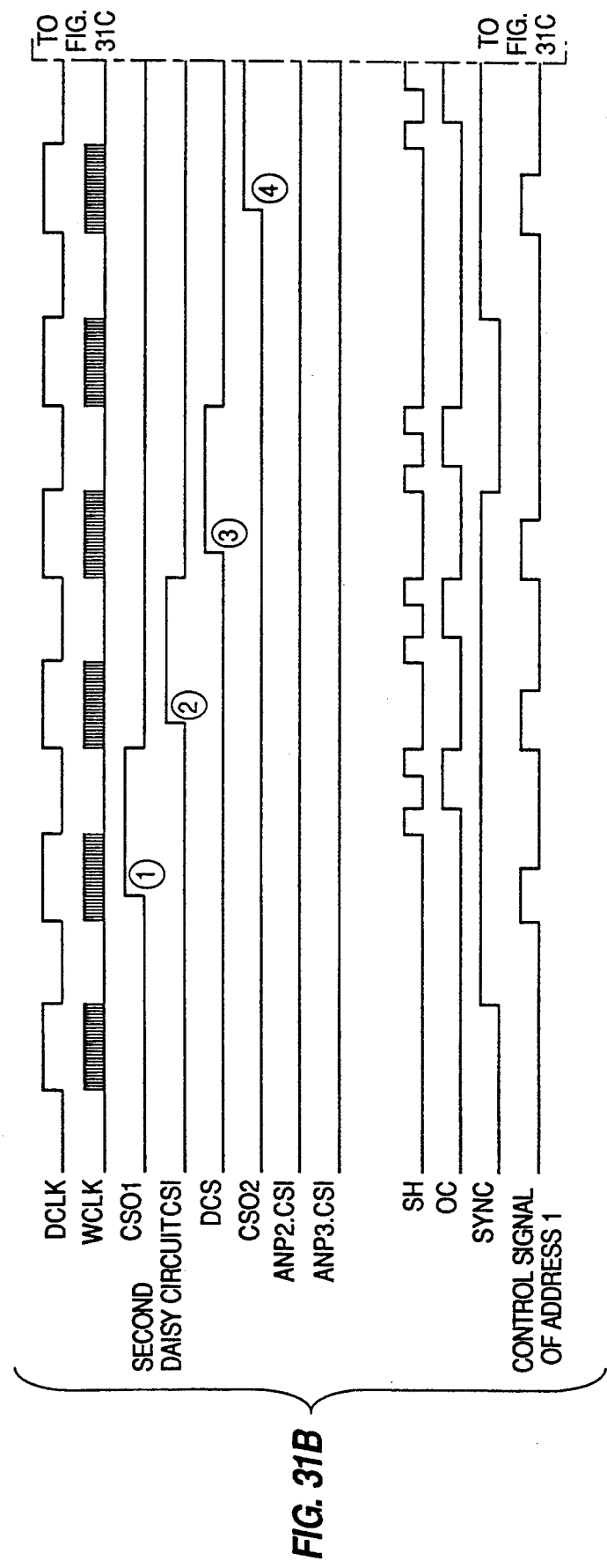

FIGS. 31B and 31C are timing chart of a feedback type layer network shown in FIG. 31A.

During a period when DCLK is high, WCLK is produced and the analog signal becomes constant. Once the weight data is input serially, CS01 from the master control block 181 is input to daisy chain circuit 171, as shown, and a rise as illustrated in ① at a timing before the serial input data is converted to parallel data. At this time the analog signal maintained at the sample and hold S/H by analog input port 1, appears on analog bus B1 through analog switch 175. This enables ANP 1, 2, 3 to execute a product and sum operation. Next, when DCLK is input, CSI is supplied to a daisy circuit 172 rise as shown in ② and the sample hold circuit S/H signal maintains the input signal from the analog input port which appears on the analog bus through an analog switch. This enables a second product and sum operation at ANPs1, 2, and 3. Further, at the next timing, when DCLK is input, the master control block 181 produces dummy signal DCS as shown in ③ and ANPs1, 2, and 3 perform a third product from the operation for fixed voltage. During the rise of the synchronization signal, the output layer of ANPs 1, 2, 3 performs a sum of product operation. When address count prohibiting signal rises slightly, the signal of the address signal to a weight memory 185 also rises. WCLK is then able to operate the address counter. At times, other than the above, the count is suppressed. Next, when the CS02 is applied to the ANP1 from master control block 181, ANP1 produces the result of the sum of the products of the previous timing to analog bus B2. This enables the output to be fed back to analog bus B1 through the analog common bus CB and performs the sum product operation at ANPs1, 2, and 3 again, as shown ④. After a predetermined delay is applied to the CS02 by a daisy chain circuit 172, the input signal, CSI is added to ANP2 as shown by ⑤. At this time, the output signals from ANP2 are again added to analog bus B1 through common bus CB and analog bus B2 is again supplied to the ANP1. Thus, the sum and product operations are performed.

Similarly, CSO from ANP2 is delayed by a predetermined timing to provide a CSI signal of ANP3 and when the CSI signal rises as shown as ⑥, the output signal from ANP3 is fed back to ANP1, 2, 3 through analog bus B2, common bus CB and analog bus B1, thereby performing a product of sum operation. Similarly, when the signal DSC from the dummy node of master control block 181 rises ⑦,the summing operation is conducted for respective fixed voltages by ANPs 1, 2 and 3. Upon the rise of the CS02 signal, ANPs 1 and 2 produce output as shown by ⑧ and ⑨ through S/H 178 and 178'. The output is not produced from analog output port 2.

At times 1, 2 and 3, ANP1, 2, 3 operate as an intermediate layer, at time 4, 5 and 6, ANP1, 2, and 3 operate as an output layer. Therefore, according to this embodiment, only a single layer of ANP1, 2 and 3 are required to constitute a layer type network by using the respective ANP for different functions at different times. S/H 177, multiplexer 179, A/D converter 180, MPU 182, memory 183 and communication interface 184 are also shown in FIG. 31.

Figure 32A:
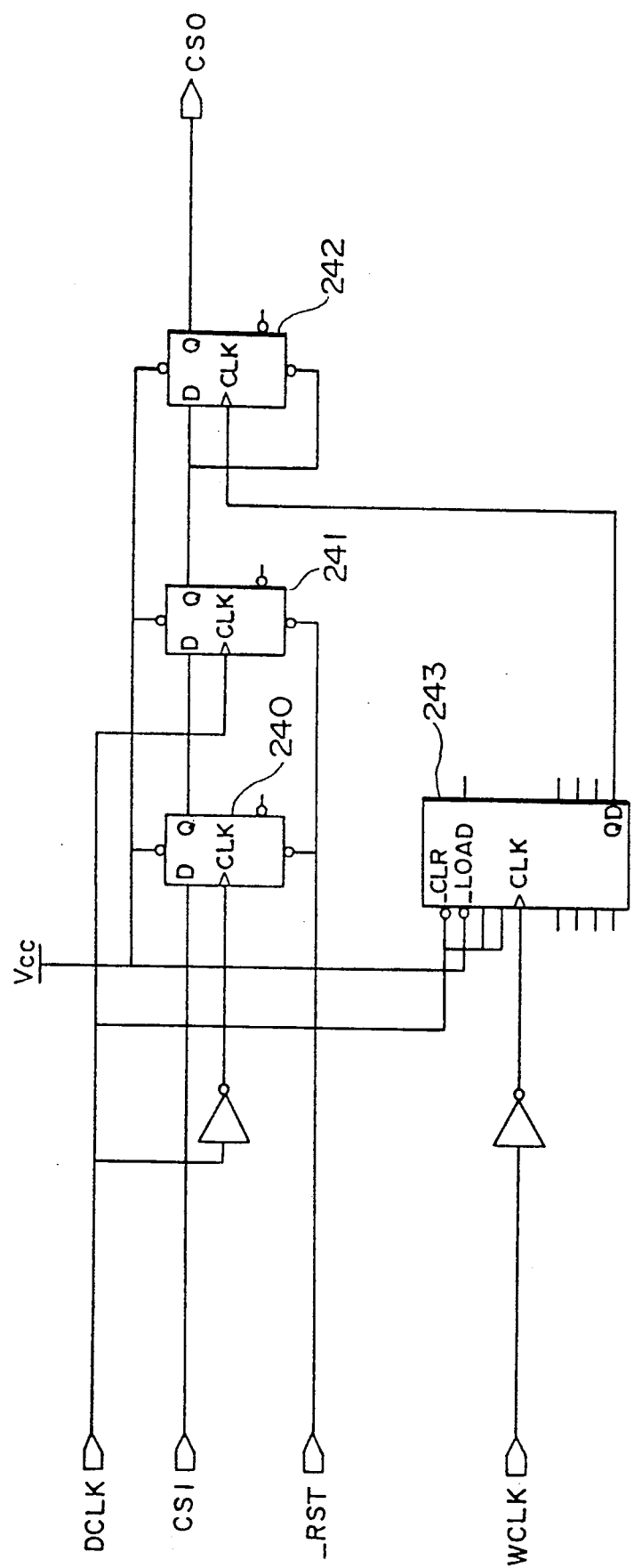
FIG. 32A is a circuit diagram of a daisy chain circuit in the of FIG. 31A.

As shown in FIG. 32A, daisy circuits 173 and 174 are provided on the input side. D-type flip-flops 240, 241 and 242 sets data to be input at D-terminal at the rise of DCLK signal, thereby turning the output cue to be in a state of ①. The first flip-flop 240 sets CSI signal upon a fall of DCLK. The output signal from flip-flop 240 is set in flip-flop 241 upon the following rise of DCLK.

The output of flip-flop 241 is applied to the D-terminal of the third flip-flop 242. The clock signal for setting the input to flip-flop 242 is the output of four bit counter 243, which is triggered upon a fall of WCLK and therefore is cleared upon a fall of DCLK. Accordingly, upon a fall of DCLK, counter 243 is turned to be all 0's. Thereafter, a falling edge of the clock DCLK is input to the counter 8 times, thereby enabling the upper bit of QD signal to be high. This will trigger flip-flop 242, such that a high signal is outputted to a terminal for CSO. When the output of flip-flop 241 is turned to 0, CSO is cleared. The above operation achieves a daisy operation in which CSO is outputted after a predetermined time corresponding to 8 pulses of WCLK which then passes after a fall of CSI.

Figure 32B:
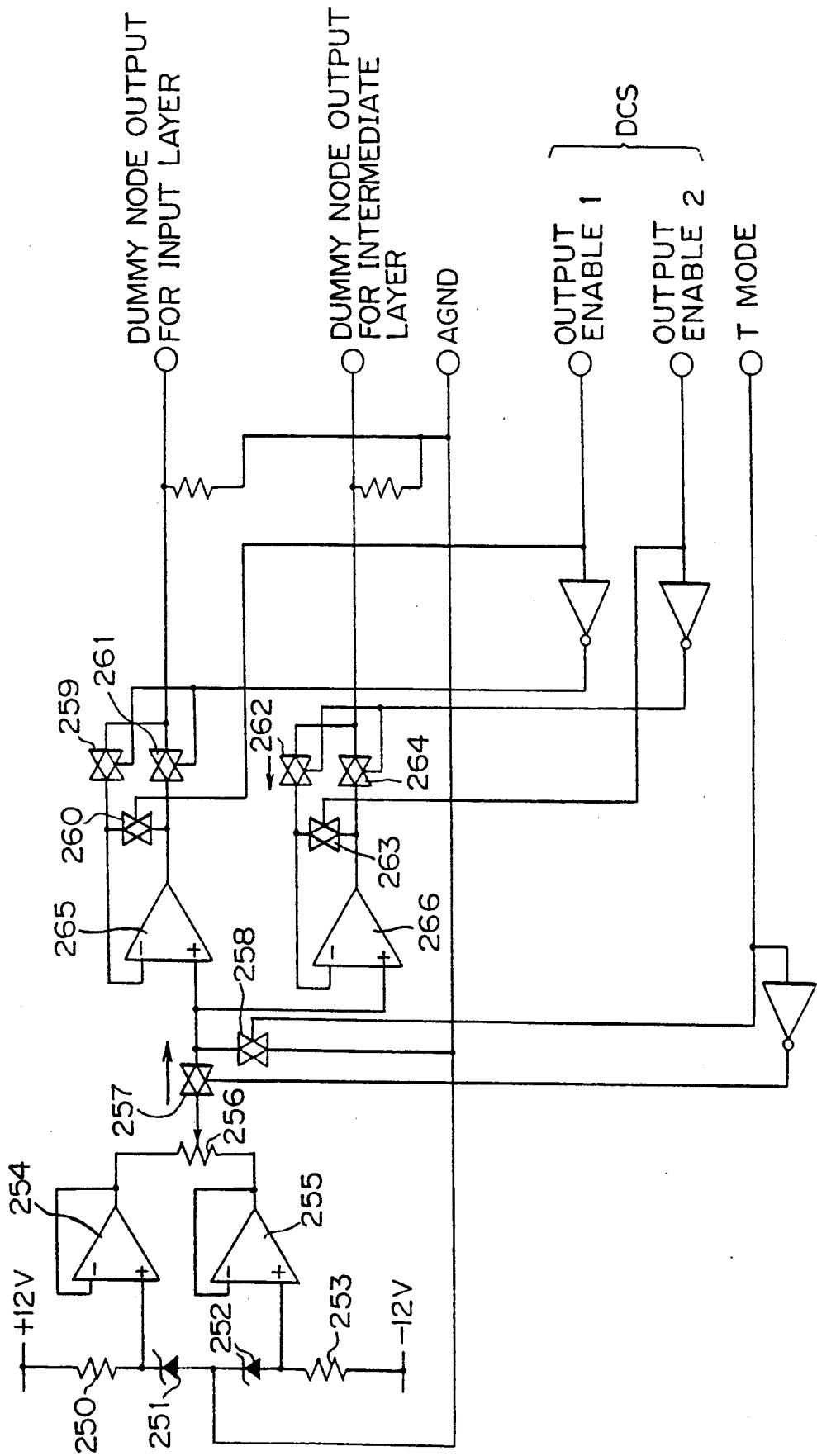
FIG. 32B is a circuit diagram of a max value node circuit in the embodiment of FIG. 31A.

FIG. 32B is a detailed circuit diagram of a max value node circuit 187 which forms a neuron unit for a dummy node. In FIG. 32B, resistor 250, Zener diodes 251 and 252, resistor 253 and voltage follower 254 and 255 constitute a circuit for a constant voltage. When a current flows from plus 12 volts to minus 12 volts through resistors 250 and 253, and Zener diodes 251 and 252, then plus 7 volt and minus 7 volts are respectively formed at the input terminals of voltage follower 254 and 255. These voltages are output through output resistor 256, which is connected to voltage follower 254 and 255. Analog switches 257 to 264 perform a control such that these two constant voltages are derived out, in a time division manner. When a T-mode signal is 0, the constant voltage is provided to the following voltage follower 265, through analog switch 257. When a T-mode signal is 1, namely, a test mode, the output of the voltage follower is suppressed to the analog ground by analog switch 258, thereby enabling 0 volt to be input to voltage follower 265. During a test mode, an offset voltage on the bus is transmitted to MPU. Voltage follower 265 is turned, to be enabled under the control of the switches on the output side. When the output enable is 1, analog switch 260 is turned on to operate the voltage follower and the output thereof is provided; but at this timing the output is not produced from a dummy node terminal. Conversely, the output is produced at the dummy node output when the output enable is 0. A switching control of analog switch 260 and the output thereof, is conducted by the output enable 1 or output enable 2 while subjecting to 0 enable operation. When the output enable 1 or output enable 2 is 0, a constant voltage is produced at the output terminal of the dummy node. The dummy node output connected to amplifier 265 is for an input layer and the dummy node connected to to amplifier 266 is for an intermediate layer. The output voltage of the dummy node is fixed to a predetermined value and therefore can be used as a threshold voltage. Zener diodes 251 and 252 produce a constant voltage in a reverse bias state and the fixed voltage can be varied within a range from plus 7 volts to minus 7 volts. The enable status of output enable 1 and output enable 2 is determined by dummy node control signal DCS from master control block 181 to avoid the output enable 1 and output enable 2 from colliding with the output voltage from other ANPs connceted to the analog bus.

Figure 33:
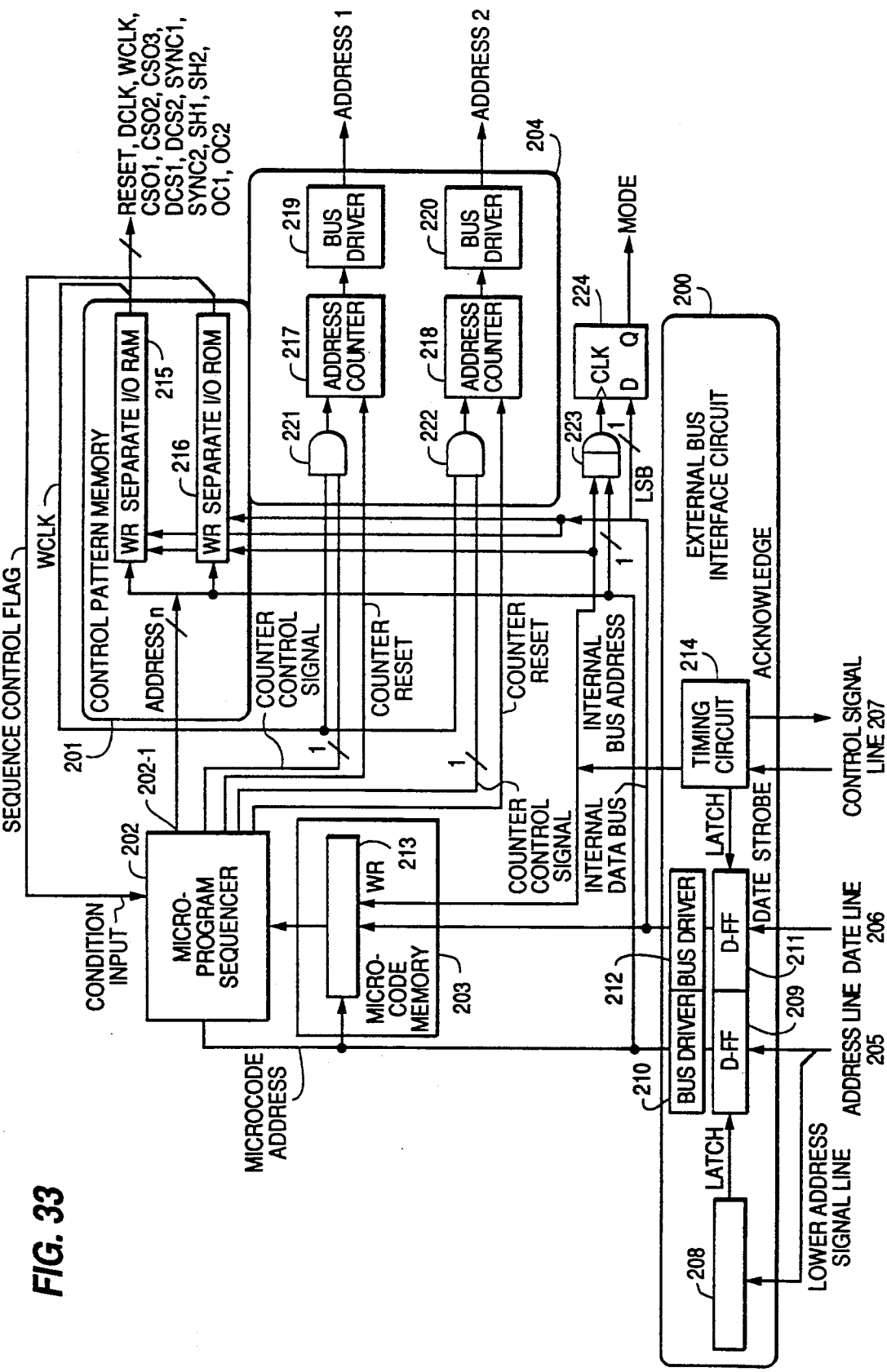
FIG. 33 is a circuit diagram of a master control block in the embodiment of FIG. 31A.

FIG. 33 shows a structure view of master control block 181. Master control block 181 totally controls all the control signals. A main portion of the structure comprises external bus interface circuit 200, control pattern memory 201, micro program sequencer 202, micro code memory 203 and address generating block 204. External bus interface circuit 200 constitutes an interface for using connection to MPU and is connected to address line 205, data line 206 and control line 207. The upper address comparison circuit 208 and resistor or D/FF 209 which are provided in external bus interface circuit 200 decode upper addresses transmitted from MPU. When the upper address is determined as the predetermined address, the lower addresses and data are respectively set in D/FF 209 and 211 using a latch signal from timing circuit 214 as a trigger. The set address and data are input to an internal block through bus drivers 210 and 212 and internal address bus and internal data bus, respectively. The address is utilized when a micro code is written by MPU side through a data bus by referring to micro code memory 203. The lower address is transmitted as a micro code address to micro program sequencer 202 through bus driver 210 and control pattern memory 201, which can be referred to by using a predetermined address from MPU side.

After the data from MPU or main memory is latched in D/FF 211 through data line 206, the data from MPU or a main memory is applied to separate IO Ram 213 in a micro code memory or separate IO RAM 215 and 216 within control pattern memory 201 through bus driver 212. When the data strobe signal from MPU or main memory are applied to timing circuit 214 through control signal line 207, an acknowledge signal is returned according to this communication method and transmitting and receiving control of the addresses and or data can be conducted. Timing circuit 214 controls a latch timing for D/FF 211 and D/FF 209 and a write timing into a micro code memory 203 and control pattern memory 201 through a WR signal.

A period of "1" and "0" patterns of a complex control signal provided to a neuron unit, is stored in control pattern memory 201. One period of pattern is read out from control pattern memory 201 in accordance with a control of micro program sequencer 202 thereby providing a complex control signal of "1" and "0" patterns, and is read out from pattern memory 201 in accordance with a control of micro program sequencer 202. Control signals, such as, reset signal Reset, data clock DCLK, wait clock WCLK, CSO1, CSO2, CSO3, SYNC, SYNC2, SH1, SH2, OC1 and OC2 are read out from separate IO RAM 215 and control information accompanied with patterns i.e. sequence control flag is read out from the second separate/ORAM 216. Where 1001 1001 pattern is stored in control pattern, namely, this constitutes 1, 0 bit pattern the address of control pattern memory 201 is controlled such that "1, 0" bits pattern is repeated and a repetition of this pattern is read out from control pattern memory 201. Pattern of control signal is very complex and thus these patterns are previously stored in separate I/O RAM 215 and address of separate I/O RAM 215 is designated by control of micro program sequencer 202, thereby producing the bit pattern sequentially. Therefore the same pattern is repeated several times and realization of the repetition of the same pattern is subjected to an address control. Such pattern for a single period is called as an original pattern. In order to repeat the original pattern, it is necessary to feed back a predetermined data from control pattern memory 201 to micro program sequencer 202. A sequencer control flag within the second separate I/O RAM 216 is input to micro program sequencer 202 as a condition input and thereby, micro program sequencer 202 controls first separate I/O RAM 215 such that the designated address is returned to the head address within the separate I/O RAM in which the original pattern is stored. Therefore a repetition of original pattern is carried out. Micro Program sequencer 202 sequentially produces an RS signal of separate I/O RAM through general purpose port output line 202-1 until the above condition is satisfied. In a normal case, the address signal of separate I/O RAM 215 is incremented and the address is returned to the head address in which the original pattern is stored when the condition of reaching the end of the original pattern is satisfied. As a result, a predetermined pattern is output as a control pattern from separate I/O RAM 215.

Figure 34A:
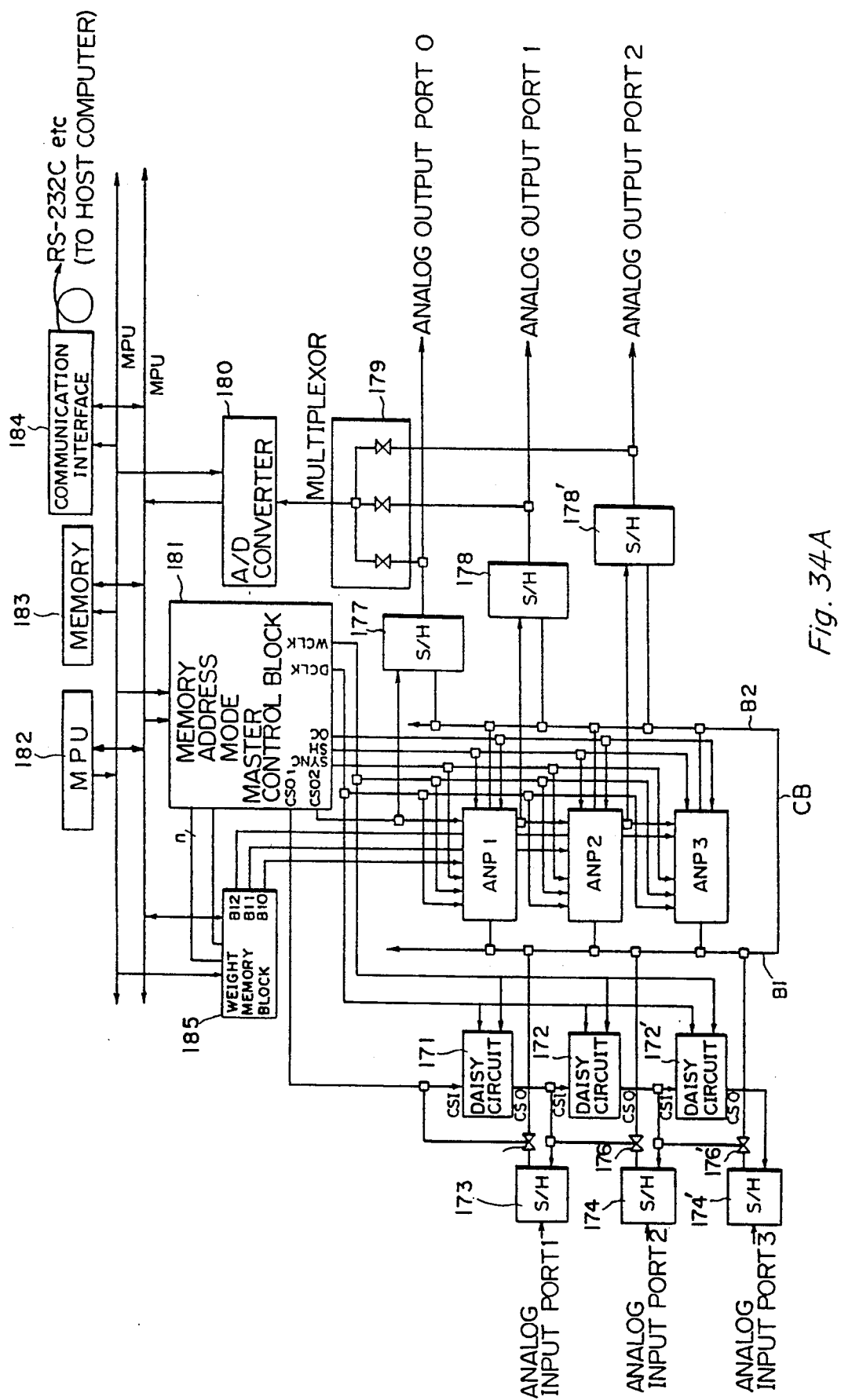
FIG. 34A is a detailed circuit of the embodiment of the neural network of the feedback type shown in FIG. 27.

FIG. 34A shows an embodiment in which an analog neuron computer is formed by a Hopfield type feedback network.

Figure 34B:
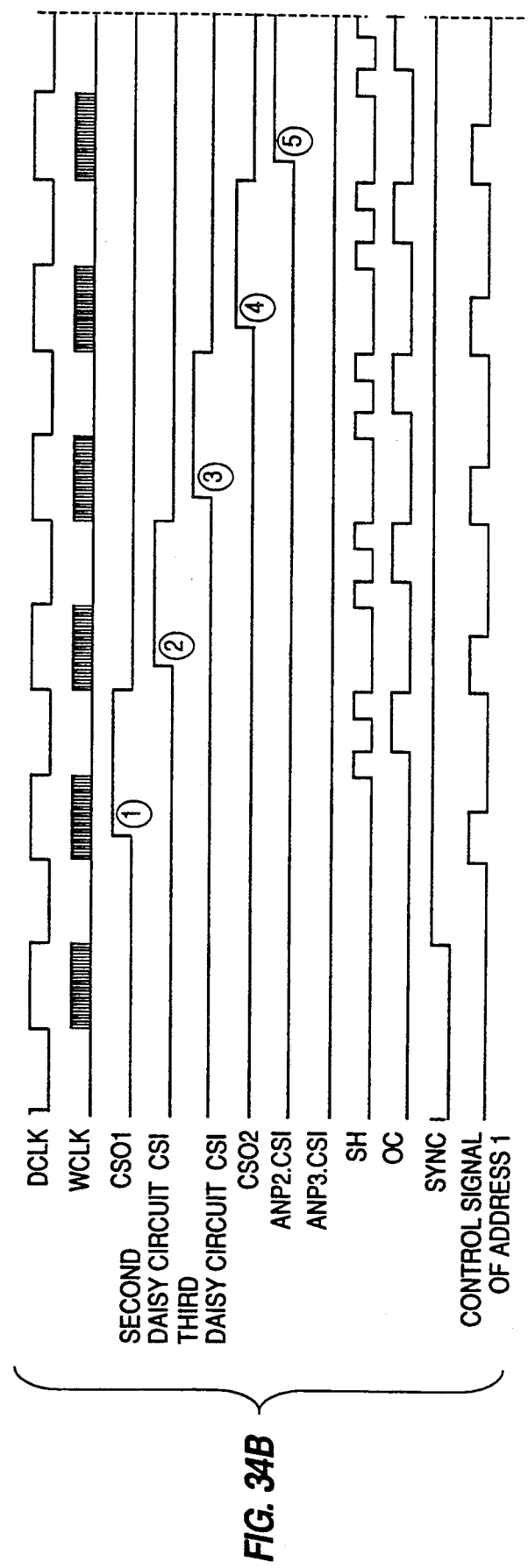
FIGS. 34B and 34C is a timing chart of the embodiment shown in FIG. 33.
Figure 34C:
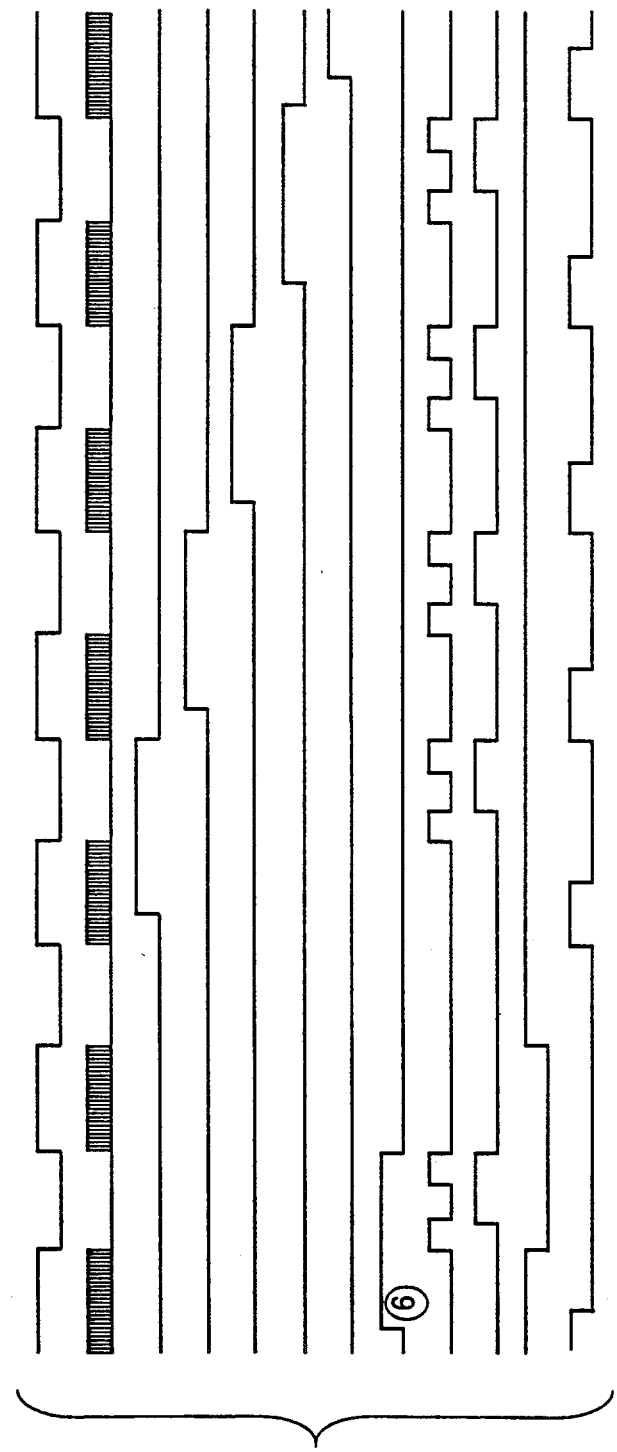

FIGS. 34B and 34C show a timing chart of the embodiment shown in FIG. 32A. The output from the memory address terminal and mode terminal of master control block 181 is added to weight memory block 185 and B10 of the data output from the weight memory block 185 which is connected to ANP1, B11 ANP2 and B12 ANP3. The output signal from the terminal for CS01 of the master control block 181 is applied to daisy chain circuit 171 and analog switch 175. The output from the sample/hold circuit 173 from the analog input port 1 is provided on analog bus B1. Then, this signal is delayed by a predetermined time by daisy chain circuit 71, CSO output is produced, and this is applied to daisy chain circuit 172 as CSI. The signal of sample/hold circuit 174 connected to analog input port is provided on analog bus B1 through switch 176. The output signal CSO of daisy chain circuit 172' simultaneously opens the output switch 176' of the sample hold circuit 174' which is connected to analog input port 3 and the signal output from the output switch 176' is provided on analog bus B1. ANP1 performs a single product and sum operation during the period of a DCLK signal and when the DCLK signal is high, the weight clock is driven and the digital weight data is input in synchronization with the weight clock which is multiplied by the analog input signal. When the latter part of the DCLK is low, the sample/hold signal S/H becomes high, enabling a capacitor integrator to perform a summing operation. During period ①, when CS01, namely, CSI of the daisy chain circuit 171, is high, ANPs 1, 2, and 3 perform a product and sum operation for the analog signal on bus B1. When the OC signal from the master control block 181 becomes high, ANPs1, 2, and 3 perform an offset cancellation and a sample hold operation. This results in a completion of one cycle of the product and a sum operation. Next, when input signal CSI reaches the second daisy chain circuit 172, it becomes high as shown by ②, and ANP1, 2, 3 perform a product and sum operation for the input signal from the analog input port. When the product sum operation period is completed, the CSI signal is input to daisy chain circuit 172' and the output signal is produced from sample/hold circuit 174' and as shown by ③, the third product sum operation cycle is cut.

Next, CS02 signal ④ is produced from master control block 181 and the signal formed in the previous product and sum cycle from ANP1 is fed back to analog bus CB. The product and sum operation are simultaneously conducted by ANPs 1, 2 and 3 for the feedback signal. Next, after being delayed by a predetermined timing, CSO output signal from ANP1 is applied to ANP2 as shown by ⑤. The signals stored in the timing of the product and sum cycle of the previous timing are outputted from ANP2 in a daisy chain like manner. The signal is fed back to ANP1, 2 and 3 through the analog bus CB and the product sum operation is facilitated as shown by ⑤. Simultaneously, after delaying the signal period by a predetermined time period, CSO of ANP2 is added to ANP3 as shown by 6 and the output from ANP3 is fed back to ANPs1, 2 and 3 through analog bus CB to perform a product and sum operation at ⑥. As shown in FIGS. 34A and 34B, the feedback type network, and the output from 3ANPs, perform six product and sum operations which are output to analog output ports 0, 1, 2, 3 through sample/hold circuits 177, 178 and 178'. The output signals from the sample/hold circuit 177, 178 and 178' are selectively output by multianalog multiplexer 179 and are supplied to the digital control circuit comprising MPU182, memory 183, and communication interface 184 through A/D converter 180. MPU 182 determines whether the neuron output state at the present time is the same as the neuron output state of the previous time. If they are in the same time status, the system can be considered to have become stable. Therefore, the operation is carried out by using a single common analog bus CB through the feedback operation and is repeated to reach a stable resolution which is deemed as a final output.

Figure 35A:
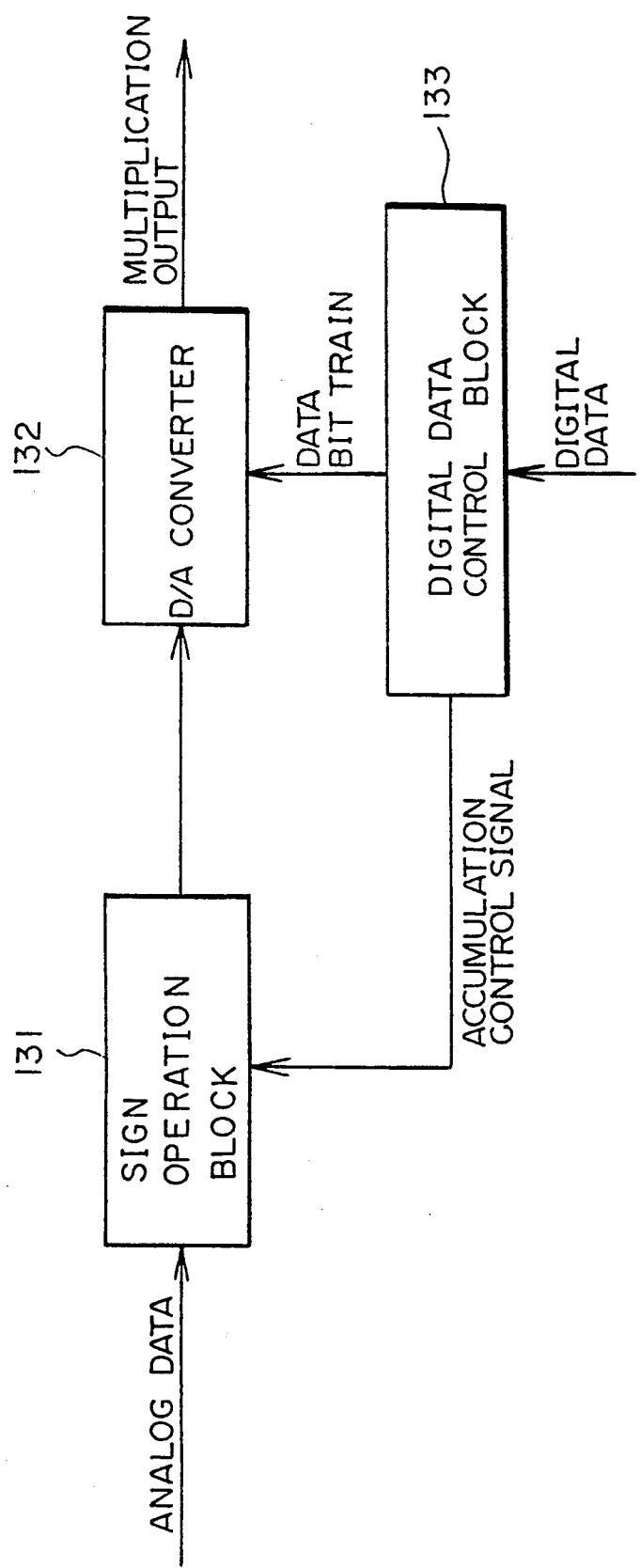
FIG. 35A is a block diagram of a still further embodiment of the neuron unit of the present invention.

FIG. 35A shows a block diagram of another embodiment of the present invention.

Sign operation block 131 is provided before D/A converter 132 and digital data control block 133 controls the sign operation block 131 and D/A converter 132 by applying an operation control signal and a data bit train to them, respectively.

Figure 35B:
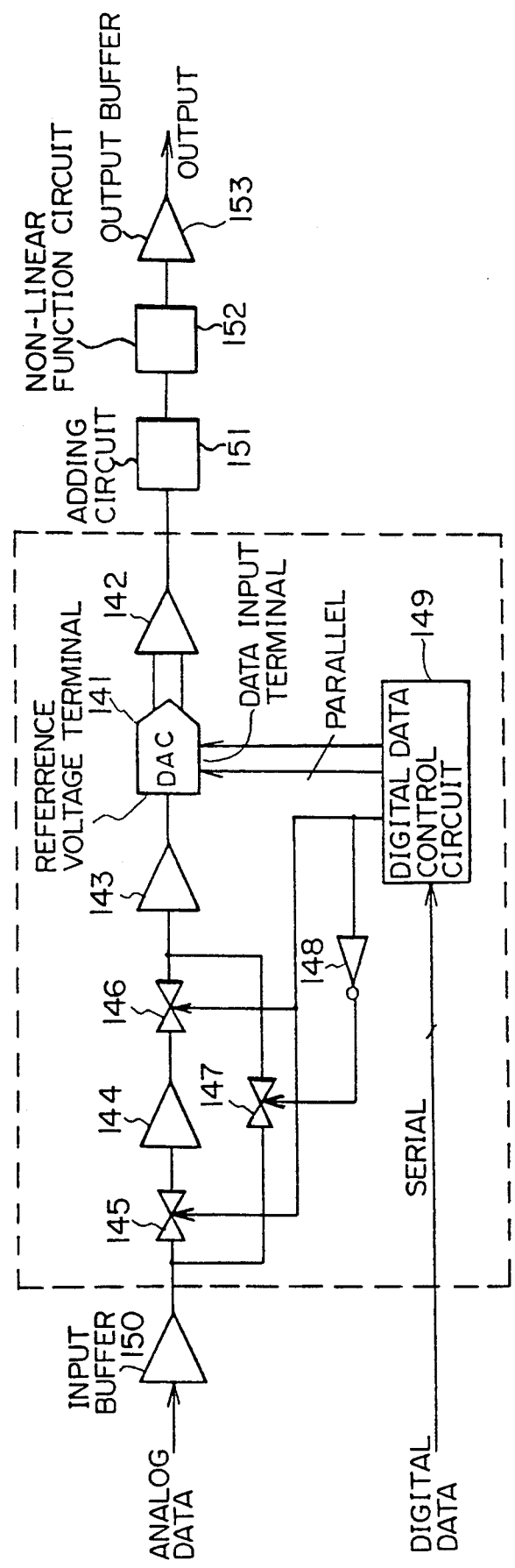
FIG. 35B is a detailed block diagram of the embodiment shown in FIG. 35A.

FIG. 35B is a block diagram of the analog neuron circuit. FIG. 35B shows DAC 141, operational amplifiers 142, 143, 144, analog switches 145, 146, 147, an inverter 148 and a digital data control circuit 149. This forms a multiplying circuit (within the dotted line). In addition, it shows an input buffer 150 for analog data, another circuit 151 comprising an integrator for obtaining a sum of the input and the weight data, a non-linear function circuit 152 for determining the output of the product sum from the integrator, and an output buffer 153.

In the embodiment as described above, the time division analog data which varies irregularly to have both positive and negative values, is serially multiplied by time division digital data which changes irregularly, and has positive and negative values. An operation of the multiplication will be explained by referring to the time chart shown in FIG. 36. The first clock DCLK determines the timing of one multiplication and the second clock WCLK determines the input timing of digital weight data input one bit at a time.

Figure 36:
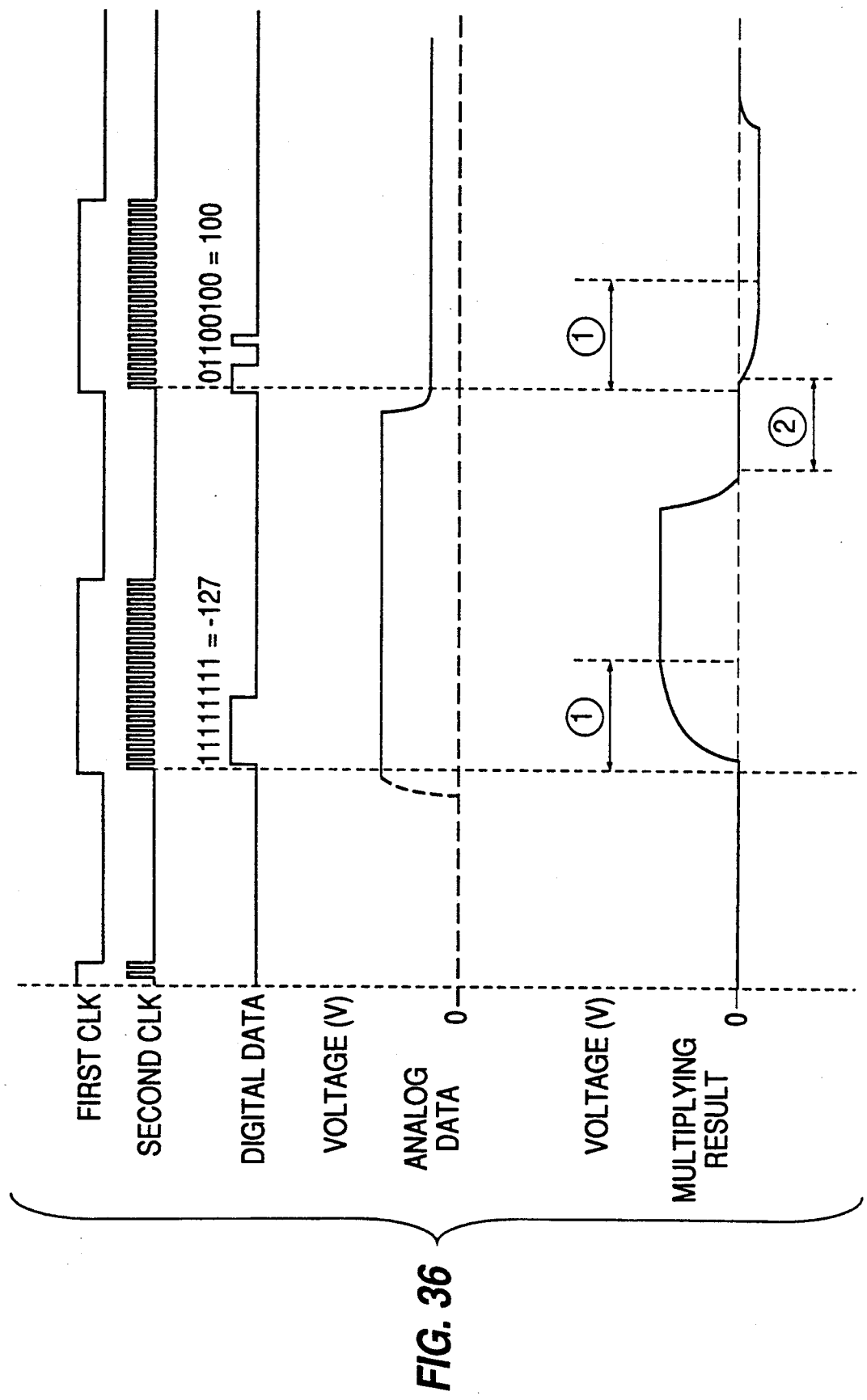
FIG. 36 is a timing chart of the embodiment shown in FIG. 35B.

In FIG. 35B, the input voltage to the data input terminal of DAC 141 is made 0 and the output voltage is also made 0, as shown in 2 in FIG. 36. For the first time, the MSB of the digital data is input to digital data control circuit 149 then the sign operation control signal(-SIGN) is provided to analog switches 145 and 146. Namely, if the digital data is negative, the analog switch 147 is turned on, and the switches 145 and 146 are turned off. Conversely if the sign of the digital data is positive, the analog switch 147 is turned off and analog switches 145 and 146 are turned on. When the operation control signal from digital data control circuit 149 is conducted, MSB of digital data is used and if the sign of the digital data is positive, the operation control signal becomes "" and if the sign of the digital data is negative, the sign of the operation control signal becomes "1" as an output from the digital data control circuit 149.

Input analog data flow through input buffer 150 is applied to the terminal of DAC 141 after it is determined whether or not the polarity is to be reversed based on the status of the analog signal switches. Namely, if the sign of the digital data is negative, the input analog data only passes through operational amplifier 143, and if the sign of the digital data is positive, the analog data passes through bus operational amplifiers 143 and 144. After the signal is output from DAC 141, the output from DAC 141 flows through operational amplifier 142, thereby reversing the polarity of the signal which is again reversed in an adder. If the sign of digital signal is positive, the input analog data goes through four operational amplifiers, thereby enabling the polarity of the input analog data to be unchanged. When the sign of the digital data is negative, the input analog data goes through three operational amplifiers, thereby enabling the polarity to be reversed. Analog input data flows through operational amplifier 143 or operational amplifiers 143 and 144, and therefore, due to the through rate of the operational amplifiers the input of the analog data to DAC 141 is delayed. However, during the delay time a serial input of all the digital bit data is input in parallel to the digital data control circuit 149. Thereafter, the output of DAC 141 is stable after the delay time corresponding to the setting time of DAC 141. This is shown by 1 in FIG. 36.

As described above, before analog data and digital data are input, the output of DAC 141 is made 0 and the maximum variation of the output is not six volts between the positive (maximum 3 volts) and negative (maximum negative 3 volts) voltages but half of six volts, namely, 3 volts. Thus, the settling time of DAC 141 can be reduced.

Figure 37:
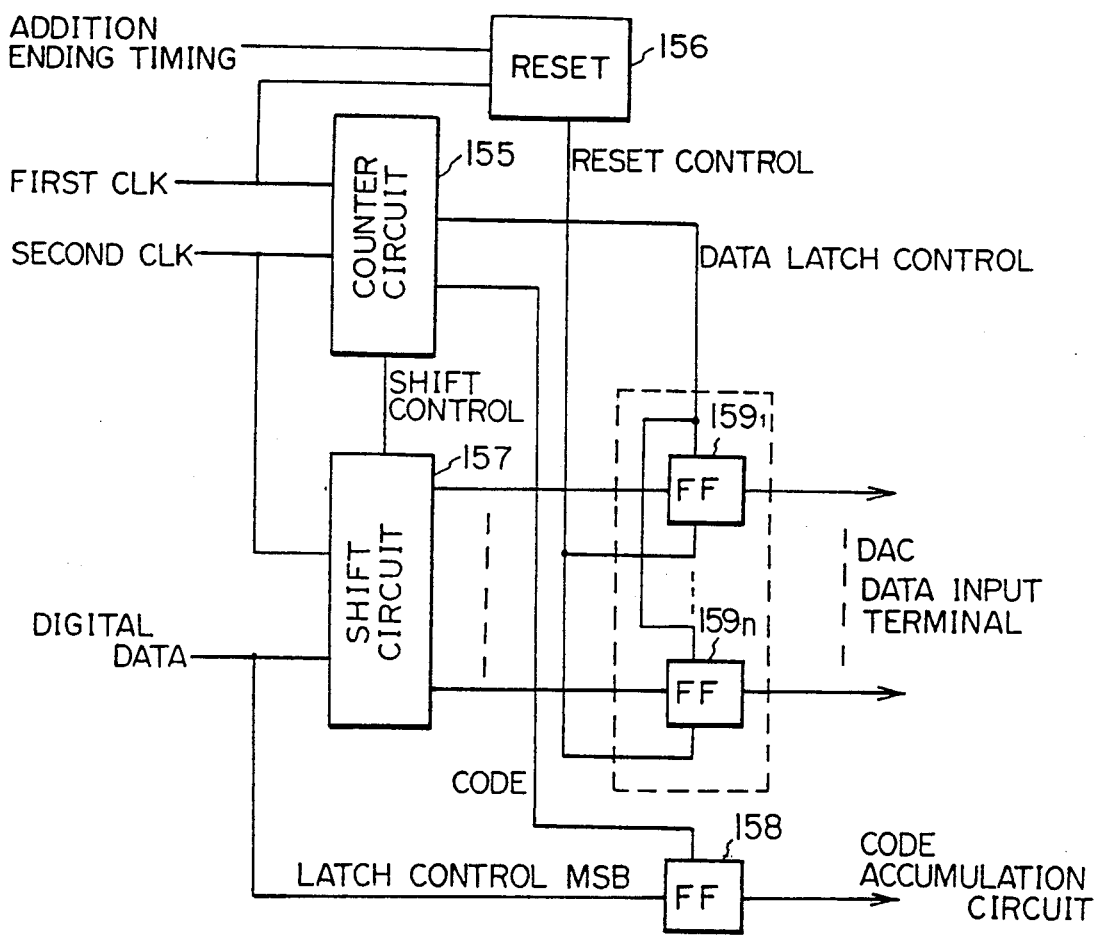
FIG. 37 is a block diagram of a digital data control circuit of the embodiment shown in FIG. 35B.

FIG. 37 is a block diagram of an embodiment of the digital data control circuit 149. This circuit is comprised of counter circuit 155 to which the first clock (CLK) and second clock are input, reset control circuit 156 to which the first clock and the timing signal designating compression of addition are input, shift circuit 157 to which the second clock digital data and the shift control signal from counter circuit 155, flip flop 158 to which MSB of the digital data and the sign latch control signal from counter 155 are input, flip flop 159a, 159b, ..., 159n to which signal from shift circuit 157 is input, data latch control signal from counter 155 and reset control signal from reset control circuit 156 are input. As shown in FIG. 37, before the digital data is input to digital data control circuit 149 for starting a multiplication, the first clock becomes 0 and the addition at the adding circuit in FIG. 36 ends and a timing signal for completing an addition becomes 0. Then, all the flip flops 159a to 159n are reset by a reset control signal from reset control circuit 156. This is input to the data input terminal of DAC 141 and the output of the DAC 141 becomes 0 as shown by 2 in FIG. 36.

Thereafter, the digital data is serially input bit by bit to digital data control circuit 149. When the MSB of the digital data is input, the data is latched by flip flop 158 by a signed latch control signal outputted from counter 155 in synchronization with the second clock and is provided to operational amplifiers 144, 143 and 142 for performing a sign operation. The digital data as bit MSB is sequentially shifted in shift circuit 157 in accordance with the shift control signal outputted from counter 155. This is done in synchronization with the second clock and is simultaneously latched by a plurality of flip flops 159a to 159n by the data latch control signal output from the counter 155 when all the bit are input and is outputted to the data input terminal at DAC 141.

Figure 38:
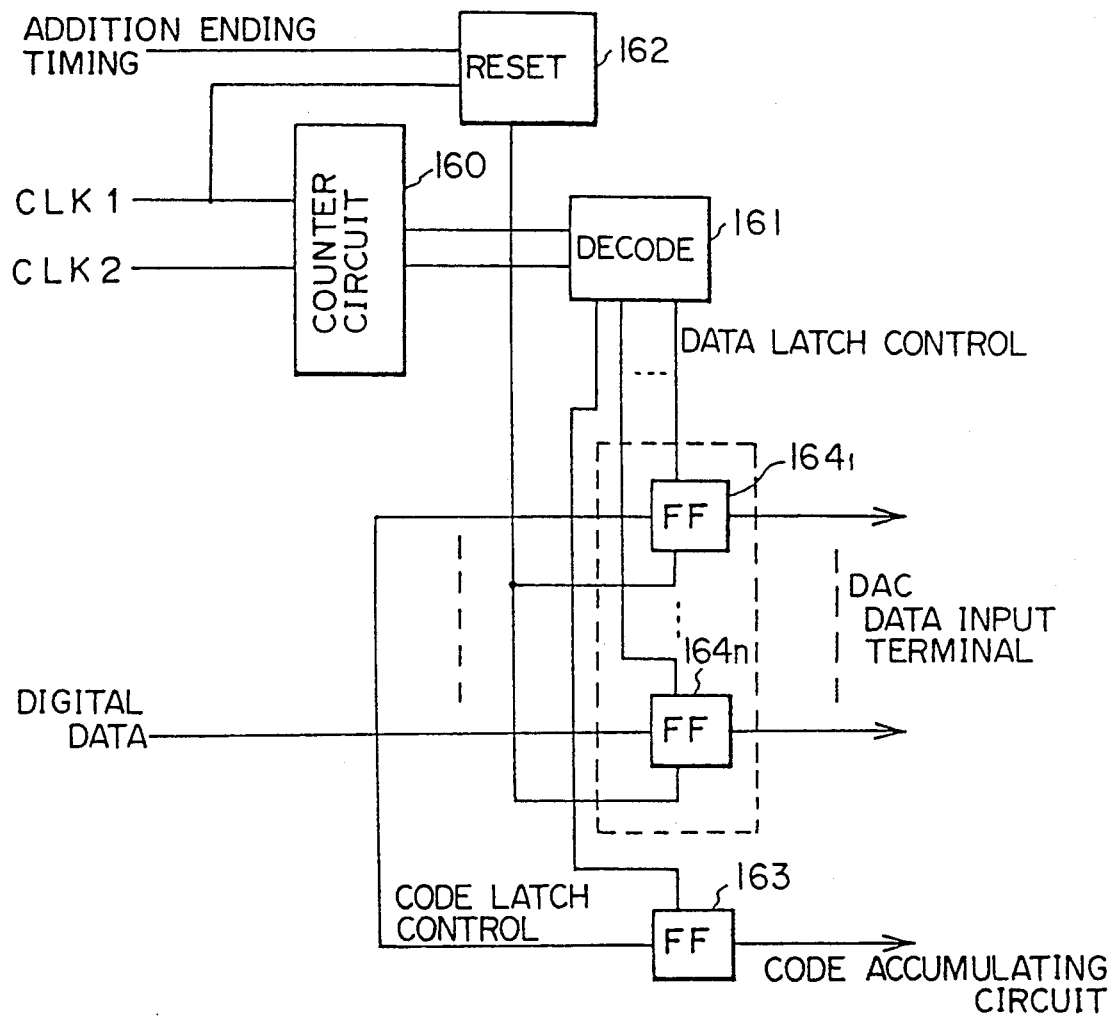
FIG. 38 is a block diagram of another digital data control circuit of the embodiment shown in FIG. 35B.

In order to shorten the settling time of DAC 141, all the data are not simultaneously latched by a plurality of flip flops 159a to 159f after a completion of the serial input of all the digital data. It is preferable to output the data at the data input terminal of a bit position corresponding to DAC 141 every time a bit of digital data is provided. A digital data control circuit for performing this operation is shown in a block diagram of this embodiment in FIG. 38. The structure of FIG. 38 is similar to that of FIG. 37 but it does not make use of a shift circuit. In addition, the signal from counter 160 does not directly produce a sign and a data latch control signal but rather is input to decoder circuit 161 to be latched by flip flop 163 and a plurality of flip flops 164a to 164n.

All the flip flop 164a to 164n are reset by a reset control circuit 162 as shown in FIG. 37 and all the flip flops 164a to 164n are reset after the output of DAC becomes 0, and the digital data is input. When the MSB of the data is input, the counter circuit 160 synchronized with the second clock enables the sign latch control signal to be outputted from the decoder circuit 161 to flip flop 163, thereby enabling flip flop 163 to latch the content of the sign bit and to provide both a sign and an operational control signal. The data bit train of the digital data is input sequentially one bit at a time and the output of the counter circuit 160 progresses at every input bit, and is decoded by decoder 161. This enables the data latch control signal to be sequentially input at one of the flip flops 164a to 164n, thereby latching the input data which is supplied to the corresponding input DAC 141.

Figure 39:
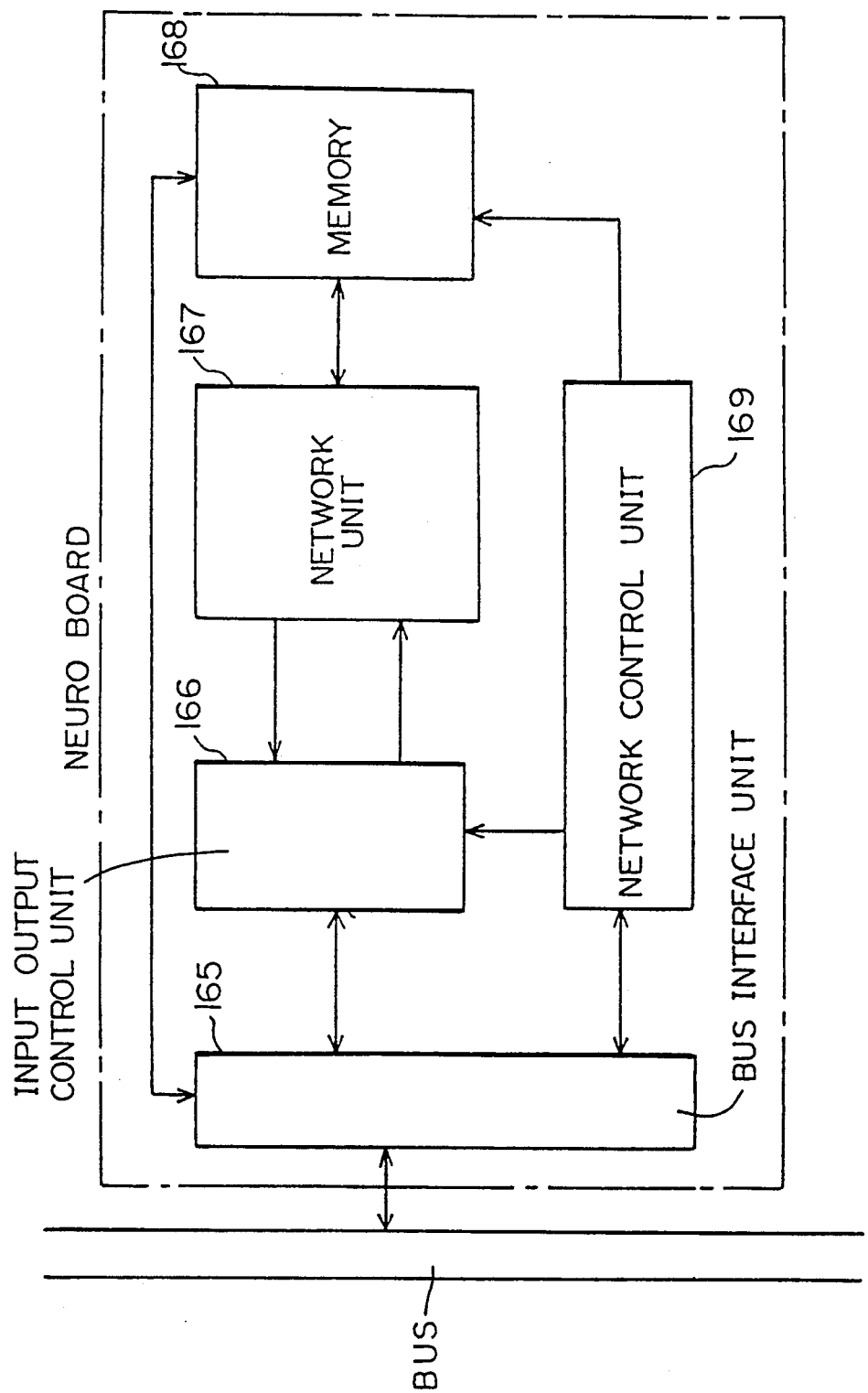
FIG. 39 is a block diagram of a total neural network.

FIG. 39 shows a block diagram of a neuron board according to another embodiment of the present invention. An interface unit 165 provides an interface between the neuron board and the system. An input and output control unit 166 controls input and output of data to and from the network unit. A neural network 167 uses a time division multiplexing signal by a set of units, memory 168 stores the digital weight data of the neural network and a control unit 169 outputs the synchronization control signal for performing a time division multiplexing operation for the network.

The neuron board according to the present embodiment determines a network structure by using all the units through network control unit 169, and the weight of the unit is output from memory 168. The weight between the units can be changed by changing the content of the memory. As a result, the data input and output from network 167 is carried out by the input and output control unit 169. The operation of the neuron computer can be executed by the this neuron board.

What is claimed is:

1. A neuron architecture, comprising:
   a plurality of first neuron units, arranged sequentially, for producing respective output signals in a time division manner;
   a common bus, connected to said first neuron units, for sequentially transferring said respective signal output of said first neuron units in a time division manner; and
   a second neuron unit, connected to said common bus, for receiving the output signals from said first neuron units in a time division manner,
   wherein each neuron unit comprises:
   receiving means for receiving input analog signals transmitted from a plurality of neuron units in a time division manner;
   means for multiplying the input analog signals by corresponding digital weight data to provide a plurality of products thereof;
   adding means for adding said products to provide a sum signal;
   nonlinear function means for producing a nonlinear function of said sum signal; and
   means for outputting the output of said nonlinear function means in a time division manner.

2. The neuron architecture according to claim 1 wherein said neuron unit further comprises:
   positive-negative switching means, connected to an input of said multiplying means, for determining a polarity of an output signal from the neuron unit in accordance with a sign of said digital weight data.

3. The neuron architecture according to claim 1, wherein said neuron unit further comprises:
- an operational amplifier operatively connected to said adding means and said nonlinear function means; and
- offset cancelling means for cancelling an offset voltage from said operational amplifier, said offset cancelling means comprising:
  - means for inputting an offset control signal to said operational amplifier to detect the offset voltage appearing in the output of said operational amplifier; and
  - means for applying said offset control signal to said adding means to cancel said offset voltage.

4. The neuron architecture according to claim 1, wherein said neuron unit further comprises:
- an amplifier operatively connected to said adding means and said nonlinear function means; and
- offset cancelling means for cancelling an offset voltage in the output of said amplifier, said offset cancelling means comprising:
  - means for reversing a polarity of said sum signal obtained by said adding means to produce a reversed polarity sum signal,
  - means for applying "0" input signal to said amplifier to detect the offset voltage in the output of said amplifier,
  - means for adding the offset voltage to the reversed polarity sum signal when "0" input signal is applied to said amplifier, so that the offset signal is subtracted from said sum signal,
  - means for reversing the polarity of the reversed polarity sum signal output by said offset voltage adding means.

5. The neuron architecture according to claim 1, wherein said neuron unit further comprises offset cancelling means for cancelling an offset voltage, comprising:
- a capacitor having first and second terminals,
- an amplifier having an input connected to the first terminal of said capacitor, for receiving a "0" input from said capacitor,
- means for feeding back an offset voltage output from said amplifier to the first terminal of said capacitor,
- means for applying an output of said adding means to the second terminal of said capacitor, and
- means for applying a signal obtained by subtracting the offset voltage from the sum signal output by said adding means to the input of said amplifier, thereby enabling the offset voltage to be cancelled at the output of said amplifier.

6. The neuron architecture according to claim 1, wherein said multiplying means comprises:
- a D/A converter having a reference voltage terminal for receiving the input analog signals from said receiving means; and
- a plurality of input terminals to which said digital weight data is applied.

7. The neuron architecture according to claim 1, wherein said adding means comprises:
- a capacitor; and
- means for carrying out a sum operation by adding to said capacitor a product of respective voltages of the output signals produced by said first neuron units and said digital weight data.

8. A neuron unit connected to an external circuit supplying digital weight data having a sign bit, comprising:
- input means for receiving time division multiplexed analog input signals from operating neuron units;
- multiplying means for performing positive and negative switching of said time division multiplexed analog input signals, by using the sign bit of said digital weight data supplied from the external circuit, for converting said time division multiplexed analog input signals into a weighted current, by using a numeric value of said digital weight data, for selecting a path for the weighted current and for producing a product of respective voltages of the time division multiplexed analog input signals and said digital weight data;
- adding means for carrying out an integration operation by adding respective products of respective analog voltages of the time division multiplexed analog input signals and said digital weight data to said capacitor in a time division manner to obtain a sum signal;
- sampling/holding means for performing sampling and holding operations on the sum signal output by said adding means to produce an output;
- non-linear function means for performing a non-linear function on the output from said sampling/holding means to obtain an error output signal;
- output means for outputting an analog output control signal, and for outputting the analog output signal to neuron units in a following stage; and
- offset cancelling means, for detecting an offset voltage appearing in said input means, said adding means, said sampling/holding means and said output means, when one of the time division multiplexed analog input signals is made 0, and for cancelling the offset voltage by affecting an input analog voltage using an offset output signal.

9. An analog parallel computer having a plurality of neuron units arranged to perform a parallel computing operation, each of said neuron units connected to an external circuit supplying digital weight data having a sign bit and comprising:
- input means for receiving time division multiplexed analog input signals from operating neuron units;
- multiplying means for performing positive and negative switching of said time division multiplexed analog input signals, by using the sign bit of said digital weight data supplied from the external circuit, for converting said time division multiplexed analog input signals into a weighted current, by using a numeric value of said digital weight data, for selecting a path for the weighted current and for producing a product of respective voltages of the time division multiplexed analog input signals and said digital weight data;
- adding means for carrying out an integration operation by adding respective products of respective analog voltages of the time division multiplexed analog input signals and said digital weight data to said capacitor in a time division manner to obtain a sum signal;
- sampling/holding means for performing sampling and holding operations on the sum signal output by said adding means to produce an output;
- non-linear function means for performing a non-linear function on the output from said sampling/holding means to obtain an analog output signal;
- output means for outputting an analog output control signal, and for outputting the analog output signal to neuron units in a following stage; and offset cancelling means for detecting an offset voltage appearing in said input means, said adding means, said sampling/holding means and said output means, when one of the time division multiplexed analog input signal is made 0, and for cancelling the offset voltage by affecting an input analog voltage using an offset output signal.

10. The neuron unit according to claim 8, further comprising an operational amplifier connected to said adding means and said nonlinear function means, and wherein said offset cancelling means comprises:
means for inputting an offset control signal to an operational amplifier to detect the offset voltage appearing in the output of said operational amplifier; and
means for applying the offset control signal to said adding means to cancel the offset signal.

11. The neuron unit according to claim 8, further comprising an operational amplifier connected to said adding means and said nonlinear function means, and wherein said offset cancelling means comprises:
means for reversing a polarity of said sum signal to obtain a reversed polarity sum signal;
means for applying a "0" input signal to the operational amplifier to detect the offset voltage of the operational amplifier;
means for adding the offset voltage to said sum signal when the "0" input signal is applied to said operational amplifier, so that the offset output signal is subtracted from the reversed polarity sum signal; and
means for reversing the polarity of the reversed polarity sum signal.

12. The neuron unit according to claim 8, wherein said adding means includes a capacitor having first and second terminals, and wherein said offset cancelling means comprises:
an amplifier having an output and an input connected to the first terminal of said capacitor for applying a "0" input to said amplifier,
means for feeding back an offset voltage of said amplifier to the first terminal of said capacitor,
means for applying an output of said adding means to the second terminal of said capacitor, and
means for applying the offset output signal obtained by subtracting the offset voltage from the sum signal output by said adding means to the input of said amplifier, thereby enabling the offset voltage to be cancelled at the output of said amplifier.

13. The neuron unit according to claim 8, wherein said multiplying means comprises:
positive and negative switching means for switching respective analog voltages of the time division multiplexed analog input signals from said input means to positive voltage for excitation and to negative voltage for suppression in accordance with a time bit of the digital weight data;
a D/A converter having resistors corresponding to said positive and negative switching means; and
means for flowing a weight current through the resistors in said D/A converter based on the voltage obtained from said positive and negative switching means and for selecting the weight current corresponding to a numeric bit of the digital weight data, thereby providing a product of the time division analog input signals and the digital weight data.

14. The neuron unit according to claim 8, wherein said adding means comprises:
a capacitor; and
an analog integrator which adds an analog signal obtained from said multiplying means to said capacitor upon input of a first sample hold signal output from said sampling/holding means and cancels the offset voltage occurring at said adding means in accordance with a "0" input signal voltage by reversing the polarity of said capacitor.

15. The neuron unit according to claim 8, wherein said non-linear function means comprises a plurality of amplifying units connected in cascade between said sampling/holding means and said output means to provide a non-linear output.

16. The neuron unit according to claim 8, wherein said non-linear function means comprises:
sigmoid means for performing a sigmoid function, having commonly connected outputs of a plurality of current switching type circuits, to produce the analog output at the commonly connected outputs, and
means for selecting whether the output from said sampling/holding means should be passed through said sigmoid means.

17. The neuron unit according to claim 8, wherein said output means transmits the analog output signal externally when a final offset output signal is fed back to the sampling/holding means and the analog output signal is produced after the analog output control signal is delayed by a predetermined time.

18. The neuron unit according to claim 8, wherein said sampling/holding means includes:
an operational amplifier; and
means for holding a resulting voltage obtained by subtracting the offset voltage from the sum signal, when a sample/hold signal is input to said sampling/holding means, and for indicating a final output signal from said adding means by supplying "0" as an input to said operational amplifier.

19. A chain control apparatus for use in a system having a plurality of processing blocks comprising:
means for transmitting a first chain control input signal CS0 to a first processing block
means for receiving a chain control input signal from a previous processing block and outputting a chain control output signal to the next processing block, and
means for receiving a chain control output signal CSn from a last processing block, whereby, when a processing unit receives a chain control input signal, the processing block operates and, after the output operation from said processing block is completed, said processing block produces a chain control output signal which, in turn, is input to the next processing block as an chain control input signal.

20. A chain control apparatus according to claim 19, wherein each of said processing blocks comprises a neuron unit comprising means for calculating products of the analog input data of the time division multiplexing and the weight data, means for adding said products, means for providing an addition result in a time division manner through a non-linear function, and means for outputting a result upon receiving said chain control unit signal and outputting said chain control signal after an output processing is completed.

21. The chain control apparatus according to claim 20, wherein
said outputting means comprises
a delay circuit for providing a predetermined amount of delay to the chain control output signal.

22. A neural architecture comprising a layered structure neural network including a plurality of analog neuron units comprising:
multiplying means for providing products of the input values and weight data corresponding to the input,
adding means for summing the output of said multiplying unit,
non-linear function operating means for performing a non-linear function value corresponding to the output from said adding means, and
first and second storing means obtained from the previous stage circuit in the input side, and a first intermediate value and a second intermediate value to be transmitted through the following stage circuit, whereby the output values of the plurality of units are calculated in parallel for respective inputs in a plurality of units in respective layers and during the time period when the result of the calculation is outputted to the next stage, the intermediate value of the input pattern is calculated simultaneously to provide an analog pipe line operation.

23. A neural architecture comprising a neural-network-one-layer structure, comprising:
means for multiplying an input signal by weight data corresponding to the input signal,
first voltage storing means for obtaining a total sum of outputs of said multiplying means and storing the result for the input signal, and
a second voltage storing means for storing a non-linear type function value corresponding to an output of said first voltage storing means, said first voltage storing means storing a sum of the products of the input signal and the weight data simultaneously with outputting of an analog output signal corresponding to the voltage stored in the second voltage storing means.

24. A neural architecture according to claim 23, wherein said first voltage storing means comprises a capacitor.

25. A neural architecture according to claim 23,
wherein said first voltage storing means comprises adding means for producing the total sum, and
wherein said second voltage storing means comprises a capacitor within a sample hold circuit connected to said adding means.

26. A neural network of a layer structure for connecting a plurality of neuron units to each other, comprising:
a single layer unit set means for forming a unit set of a single layer by providing:
a plurality of neuron units, including at least one input unit, for providing products of time division analog signals and digital weight data,
means for performing an integration by adding the products into a capacitor in a time division manner, and
means for providing an output voltage through a non-linear output function in a time division manner;

feedback means for feeding back the output voltage of said single layer unit set means to the input unit of said single layer set means; and
control means for performing a time division multiplexing of an analog signal from respective neuron units outputted from said single layer unit set means and executing a control for using said single layer unit set means through said feedback means in a time division multiplexing manner, whereby said single layer unit set means used in a time division multiplexing manner equivalently provides a layer-structure neural network.

27. The layer-structure neural network according to claim 26, wherein a weight for connecting the respective neuron units can be changed by changing the digital weight data.

28. A neuron network for connecting a plurality of neuron units to each other, comprising:
unit set means for producing a product of an input analog signal and digital weight data, and for performing an integration by adding the product to a capacitor in a time division manner and producing a voltage through a non-linear output function,
feedback means for feeding back the voltage output from said unit set means as the input analog signal for said unit set means, and
control means for providing the analog signal outputted from respective neuron units of said unit set means in a time division multiplexing manner and controlling said unit set means to be used in a time division multiplexing manner, through said feedback means.

29. The neural network according to claim 28, wherein
a weight for connecting the respective neuron units can be changed by changing the digital weight data.

30. An apparatus for speeding up a continuous multiplication, comprising:
means for multiplying time division analog data having an irregular positive and negative value by a time division serial digital data having irregular positive and negative values,
sign operating means for performing an inverse sign operation to selectively invert or non-invert the sign of the analog data to enable the operation result to be output at the reference volt terminal of a D/A converter, and
control means for outputting an operation control signal to said sign operation means by first using an input sign bit out of the digital data, and an inputting data bit sequence inputted after the sign bit from said digital data to the data terminal of said D/A converter.

31. An apparatus for speeding up a continuous multiplication for performing a multiplication of a time division analog data having irregular positive and negative values by time division serial digital data having an irregular positive and negative value by using a D/A converter, comprising:
sign operating means for performing a sign operation of a sign invert and non-invert of said analog data; and
digital data control means for producing an operation control signal to said sign operation means by a first sign bit inputted by said digital data and producing a data bit sequence input following said first sign bit of said digital data into said D/A converter in a sequence of every input of every bit constituting said bit train.

32. An apparatus for speeding up a continuous multiplication for use in a multiplying circuit for multiplying time division analog data with irregular positive and negative values by time division serial data with irregular positive and negative values, using a D/A converter, comprising
  sign operating means for performing a sign operation to invert or non-invert a sign of the analog data to produce a result of an operation to reference voltage terminal of a D/A converter, and
  digital data control means for producing an operational control signal to said sign operation means by using a sign bit first input among said digital data, producing the data bit train input following the sign bit among said digital data to the data input terminal of said D/A converter and producing a "0" to the data input terminal of said D/A converter before the output of the data bit sequence which are input following said sign bit.

33. A method of speeding up a continuous operation for use in a multiplying circuit for multiplying time division analog data with irregular positive and negative values by time division serial digital data with irregular positive and negative values, comprising:
  a sign operating means for performing an operation on a sign by inverting and non-inverting the sign of said analog data and producing an operation result to a reference voltage terminal of said D/A converter and digital data control means for outputting a sign bit first input among said digital data to produce an operational control signal to the sign operating means, means for sequentially producing data bit train input following the sign bit among said digital data to the data input terminal of said D/A converter input of said respective bit constituting said bit sequence and producing a "0" to the data input terminal of said D/A converter before the output of the data bit sequence input following said sign bit.

* * * * *